United States Patent
Golden et al.

(10) Patent No.: US 6,452,924 B1
(45) Date of Patent: Sep. 17, 2002

(54) METHOD AND APPARATUS FOR CONTROLLING BANDWIDTH IN A SWITCHED BROADBAND MULTIPOINT/MULTIMEDIA NETWORK

(75) Inventors: Michael E. Golden, Pleasanton; Richard E. Cobb, San Francisco; George R. Grenley, Pleasanton; William A. Rundquist, Fremont; Todd D. Chu, Los Altos; James H. Woodyatt, San Francisco; Jessica Dasha Jex, Oakland; Miguel J. DeAvila, San Francisco, all of CA (US)

(73) Assignee: Enron Warpspeed Services, Inc., Houston, TX (US)

( * ) Notice: Subject to any disclaimer, the term of this patent is extended or adjusted under 35 U.S.C. 154(b) by 0 days.

(21) Appl. No.: 09/440,524

(22) Filed: Nov. 15, 1999

Related U.S. Application Data

(62) Division of application No. 08/966,634, filed on Nov. 10, 1997, now Pat. No. 6,272,127.

(51) Int. Cl.[7] ............................................. H04L 12/66
(52) U.S. Cl. ....................................... 370/352; 370/254
(58) Field of Search ............................... 370/352, 354, 370/353, 356, 355, 254, 390, 389, 392, 401, 410, 408; 379/90.01, 93.07

(56) References Cited

U.S. PATENT DOCUMENTS

| | | |
|---|---|---|
| 4,872,157 A | 10/1989 | Hemmady |
| 5,280,477 A | 1/1994 | Trapp |
| 5,423,003 A | 6/1995 | Berteau |
| 5,477,542 A | 12/1995 | Takahara et al. |
| 5,546,379 A | 8/1996 | Moon et al. |
| 5,602,991 A | 2/1997 | Berteau |
| 5,729,544 A | 3/1998 | Lev et al. .................... 370/352 |
| 5,867,494 A | 2/1999 | Krishnaswamy |
| 5,867,495 A * | 2/1999 | Elliott ......................... 370/352 |
| 6,026,086 A | 2/2000 | Lancelot et al. ............ 370/353 |

FOREIGN PATENT DOCUMENTS

| | | |
|---|---|---|
| EP | 0336598 | 10/1989 |
| WO | WO 9427296 | 11/1994 |
| WO | WO 94/27296 | 11/1994 |
| WO | WO 9707625 | 2/1997 |

* cited by examiner

*Primary Examiner*—Douglas Olms
*Assistant Examiner*—Ricardo M. Pizarro

(57) ABSTRACT

The present invention provides broadband multimedia communication over the standard circuit-switched public switched telephone network infrastructure (PSTN) and other physical or virtual circuit-switched infrastructures while simultaneously and transparently interoperating with the public Internet packet-switched infrastructure to effectively merge the capabilities of the two types of infrastructures into a seamless capability that can bring the benefits of using both types of existing switching infrastructures to large groups of users under the control of the same common and simple interface tools such as web browsers. The invention enables users to establish both packet-switched connections for sending or receiving content for which low-latency and unpredictable response times are not a problem (i.e. text, small graphics, e-mail, small file transfers); and circuit-switched connections for sending or receiving content that benefits from streaming data at fixed data rates, without contention for bandwidth from other users during a communication session, (i.e. video, voice, complex graphics and animations, or large file transfers). The broadband network of the present invention thus mates the convenience of point-and-click on-demand Internet-type packet-switched connectivity with the continuity of a circuit-switch connection, and bundles B channels, or controls connections on virtual circuit switches such as ATM or RSVP for the required bandwidth on-demand for video conferencing and other high-bandwidth applications.

10 Claims, 55 Drawing Sheets

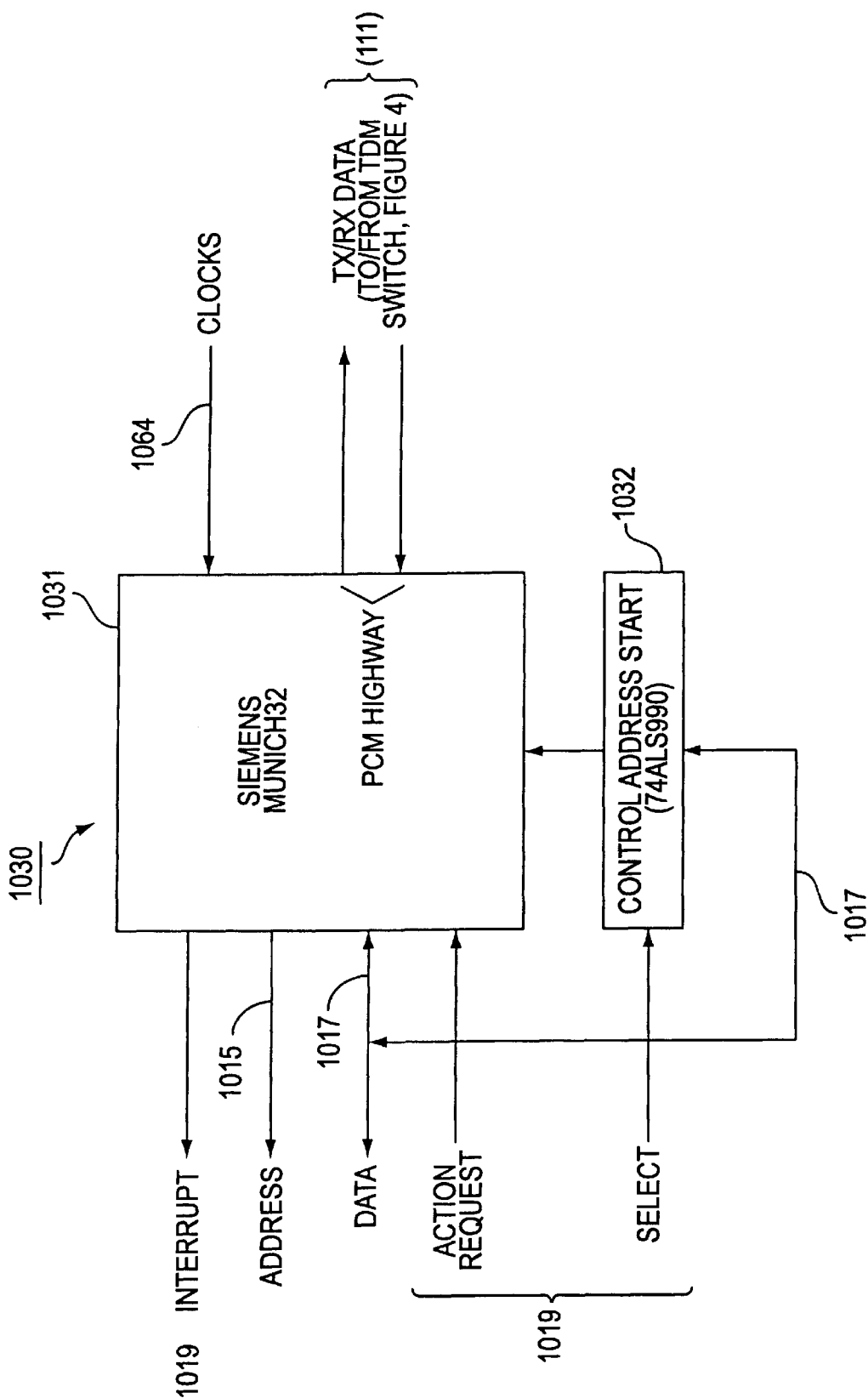

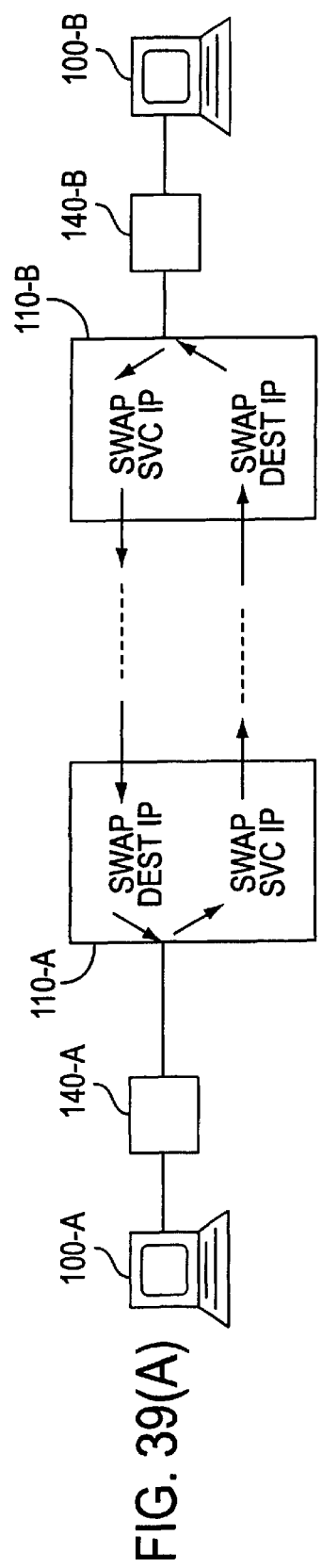
FIG. 39(A)
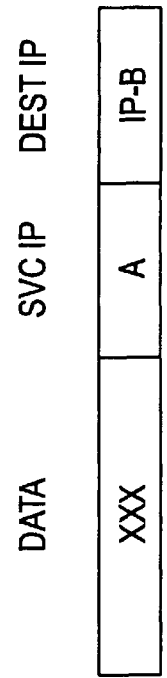
FIG. 39(B) FROM 100-A
FIG. 39(C) FROM 140-A
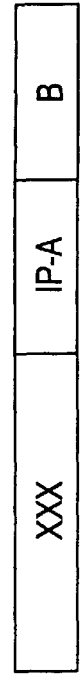
FIG. 39(D) FROM 110-B

METHOD AND APPARATUS FOR CONTROLLING BANDWIDTH IN A SWITCHED BROADBAND MULTIPOINT/MULTIMEDIA NETWORK

This is a division of application Ser. No. 08/966,634 filed Nov. 10, 1997, now U.S. Pat. No. 6,272,127.

BACKGROUND OF THE INVENTION

1. Field of the Invention

The present invention relates to multimedia communications, and more particularly, to a network that provides variable, on-demand, data bandwidth, for communication sessions between any two or more computers (and/or users) using the network; and even more particularly, a network that provides such variable, on-demand, bandwidth cost effectively not only between computers (and/or users) connected locally (in the same building) using the network, but also between computers (and/or users) across great distances. The present invention effectively combines the usefulness of public packet-switched network infrastructures, such as the Internet, with public circuit-switched network infrastructures such as the public switched telephone network (PSTN), in such a way that a user can benefit from access to and control of both types of switching infrastructures from a single computer using a single, common and standard interface tool such as a web browser.

2. Description of the Related Art

Multimedia communications, such as video communication or video information publication and distribution, require sustained data throughput rates above 300 kbps and up to 6 Mbps to achieve image size, quality and frame rates similar to that of television. Achieving such high quality multimedia connections on-demand, across wide areas, with the bandwidth required for this type high quality video or other multimedia communication is impossible using conventional digital telephone services, such as BRI ISDN, that provide connections of only one or two switched bearer channels, (each of which provides a capacity of 64 kbps), or using analog switched telephone service with modems that provide even less capacity on each connection (usually less than 36 kbps). Even when multiple bearer channels are used to achieve greater bandwidth capacity. on connections using services such as PRI ISDN, or by combining multiple BRI ISDN connections, such higher bandwidth connections are difficult to achieve on a consistent or reliable basis because of the lack of standardized network interfaces, network switching mechanisms, and/or consistent end-point addressing schemes. Although emerging technologies such as ATM might eventually support such services ubiquitously across wide areas, a lack of public standards and very high cost of deployment limit the availability of ATM as an effective solution.

Conventional video conferencing and multimedia information distribution systems often aim at solving this problem by leasing dedicated, direct, permanent, point-to-point trunk lines between users' computer sites, and by providing sophisticated proprietary hardware at each site. This requires substantial investment, requires users to schedule communication sessions carefully, and is not scalable to suit variable levels of on-demand use with consistent quality-of-service between individuals within arbitrary groups of users. Moreover, these systems often add new infrastructure requirements and large incremental traffic loads to a site's existing local computer network infrastructure, such as LANs, thereby compromising the quality and reliability of more traditional data services previously available to those users.

Accordingly, there is a need in the art for supplying multimedia communications over both local and wide areas using standard bearer channels with a system that provides scalable, variable bandwidth per session, and on-demand service while neither intruding upon, nor wastefully adding to, a site's existing LAN network infrastructure or LAN traffic load. The present invention satisfies this need.

SUMMARY OF THE INVENTION

The present invention aims at providing broadband multimedia communication over the standard circuit-switched public switched telephone network infrastructure (PSTN) while simultaneously and transparently interoperating with the public Internet packet-switched infrastructure to effectively merge the capabilities of the two infrastructures into a seamless capability that can bring the benefits of using both types of existing switching infrastructures to large groups of users under the control of the same common and simple interface tools such as web browsers. The invention enables users to establish both packet-switched connections for sending or receiving content for which low-latency and unpredictable response times are not a problem (i.e. text, small graphics, e-mail, small file transfers); and circuit-switched connections for sending or receiving content that benefits from streaming data at fixed data rates, without contention for bandwidth from other users during a communication session, (i.e. video, voice, complex graphics and animations, or large file transfers).

The present invention also aims at providing a network control infrastructure that handles routing and billing of multimedia communication, at arbitrary bandwidths, using both the standard worldwide public telephone standards and infrastructure, and the public Internet standards and infrastructure.

The present invention further aims at providing on-demand local and wide-area broadband multimedia communication without intruding on, or requiring replacement of, existing on-site data communication infrastructures, such as LANs, or unnecessarily replacing any of the standard switching or transport infrastructure already in place in the existing PSTN.

Yet another object of the present invention is to provide a network that combines access to the public Internet for access to packet-switched services such as a user's LAN and/or the Internet, and to the PSTN infrastructure for access to wide area point-to-point switched-circuit services, using a single physical access connection to an individual user, with seamless World Wide Web browser software control of both classes of service, and the use of Internet Protocol (IP) addressing to control circuit switching over the PSTN circuit switching and transport infrastructure.

Yet another object of the present invention is to provide network control and user software to allow users, and software applications run by users, to choose on a connection-by-connection basis whether to use packet-switched connections or circuit-switched connections; and in the case of circuit switched connections, how much bandwidth (typically, how many bearer channels) to allocate to each connection.

Yet another object of the present invention is to provide a method for intercepting, processing, and displaying, high-speed/high quality video content that is sent and/or received over broadband networks using a workstation interface that is fully external to the user's computer and that requires no additions or modifications of the user's existing computer hardware to allow users to process, send and/or receive, and display high quality video on the user's computer screen without requiring the aforementioned physical modifications or adaptations of the user's existing computer.

Yet another object of the present invention is to provide a multimedia capable network that is able to provide end-to-end switched broadband connections on-demand in which individual connections and/or segments of individual connections may be switched through and/or between different (and often historically incompatible types of switching and transport methodologies). For example, one leg of a connection might be carried as Ethernet packets on a pseudo-isochronous dedicated ethernet connection, another carried as virtual bearer channels over a switched virtual circuit ATM connection, and yet another carried as switched physical bearer channels over conventional telecommunication facilities. The present invention provides generic end-to-end control, signaling translation, and data traffic translation means to combine such historically incompatible heterogenous classes of switching and transport resources into seamless broadband local and wide area switched broadband network capability.

To achieve these and other objects, the present invention often includes, but does not always require, an external workstation interface to a user's existing computer workstation and/or multimedia information server, a premises switch, a city switch, and a network control system server and architecture.

BRIEF DESCRIPTION OF THE DRAWINGS

Those skilled in the art will be able to understand the details of the invention, as well as the best mode for practicing it, by reference to the following detailed description, in conjunction with the attached drawing figures, in which:

FIG. 30 illustrates a B-channel mux/demux in a bonder module such as that illustrated in FIG. 21;

FIGS. 39(A) through 39(D) illustrate the network address translation function in a premises switch such as that illustrated in FIG. 19;

DETAILED DESCRIPTION OF THE PREFERRED EMBODIMENTS

Figure 1:
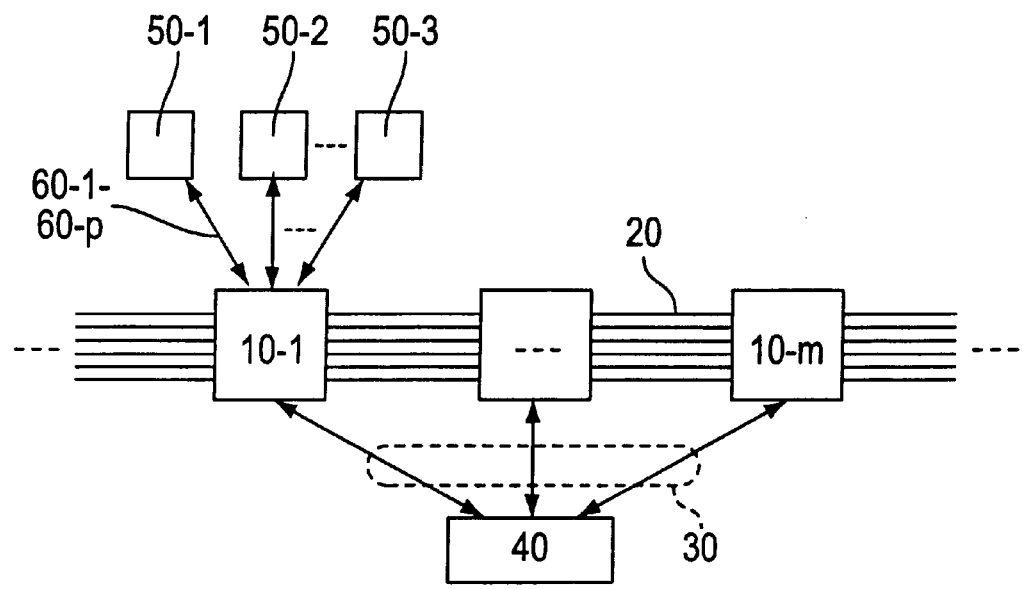
FIG. 1 is a toplevel functional diagram of a network in accordance with the principles of the invention.

As shown in FIG. 1, the broadband network according the present invention includes city nodes 10-1 . . . 10-m. One or more local nodes 50-1, 50-2 . . . 50-n are connected to each city node via a plurality of standard 64 kbps bearer channels 60-1 . . . 60-p using conventional telephone network transport facilities such as DS1, E1, DS3, or E3, etc. Each local node 50 supports one or more users which are capable of originating or receiving switched broadband network connections (not shown). In accordance with an object of the present invention, end users remain connected to their existing local area packet-switched network while simultaneously being able to establish other circuit-switched connections on the broadband network.

The city nodes 10 are connected to each other via the existing public switched telephone network (PSTN) 20. City nodes 10 include switch resources for reserving bandwidth in PSTN 20. City nodes 10 and local nodes 50 (preferably via city nodes 10) are also connected via a signaling network 30 under the control of a network control system server 40. Circuit-switched connections within the broadband network are typically established between two or more users of any two or more local nodes connected to the same or different city nodes. Network control system server 40 handles routing and billing of connections between network users. Signaling network 30 consists of packet-switched links and routers that are secured from intrusion by users outside the broadband network.

For clarity and ease of illustration, the invention will be described hereinbelow with particular reference to conventional PSTN transport infrastructures such as trunk lines and trunk and bearer channel switches. However, it should be noted that the present invention is not limited to these specific examples. Rather, it will be appreciated that the present invention is applicable to city node switch resources of different types and manufacture other than standard PSTN. These switch resources may actually switch physical or virtual channels, and may switch using TDM, ATM, SONET, ISDN or packets. It is one of the objects of the present invention, and new in the art, that a user's particular multimedia communication traffic can be carried transparently end-to-end using different types of underlying switching and data transport methodologies, even on different segments of a given connection between two or more users, under the common control of the network control system server 40. Accordingly, the only requirement of the particular circuit-switched infrastructures to used in a given connection is that they be comprised of aggregable and segregable amounts of bandwidth provided via switch resources accessible by the network control system server.

It should be further noted that the term "node" as used herein refers to a functional point in the broadband network connection topology. However, it is to be understood that a "node" does not necessarily refer to a singular hardware component or connection, but can represent a group or collection of components and connections.

Each of the above-listed broadband network components, their interconnections and operations will be described in more detail below.

I. Local Nodes

Figure 2:
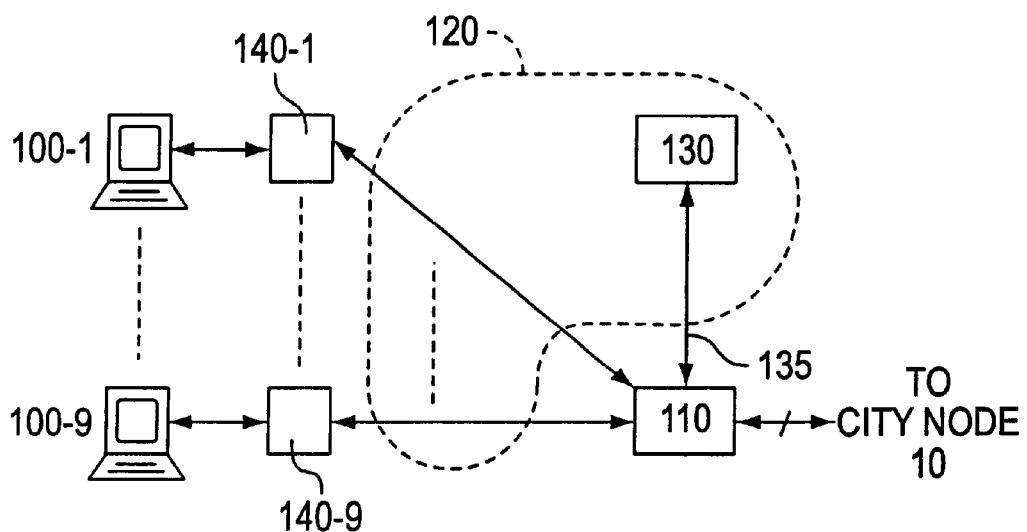
FIG. 2 is a top-level functional diagram of a local node in the network illustrated in FIG. 1.

One embodiment of a local node 50 according to the present invention is shown in FIG. 2. It includes user workstations 100-1 . . . 100-q connected to a premises switch 110 via existing local area network type wiring 120. The premises switch 110 is connected both to the users' existing LAN routing facilities 130, using a new connection 135, and to the city node of the broadband network. The connection between the premises switch and the existing LAN routing facilities 135 allows users of the broadband network to remain logically connected to their existing LAN resources while simultaneously having the ability to to establish connections over the broadband network. As will be explained later, this ability to simultaneously connect to two different networks is accomplished in such a way that neither the user, nor the LAN's management systems see any change in the users' LAN addresses or traffic load.

Workstation interfaces 140-1 . . . 140-q are connected to each user workstation 100-1 . . . 100-q, respectively, and communicate with the premises switch 110 via LAN type wiring 120 (usually re-using the existing wiring that had been previously used to connect a user directly to the LAN). It should be noted that certain ones or all of the users on the existing LAN system 120 can be re-connected through the premises switch, without requiring all LAN users to be re-connected through the premises switch. Furthermore, there may be more than one premises switch on site.

It should also be noted that in this embodiment, broadband network users are connected to the broadband network via their previously existing LAN wiring and user workstations. However, the use of existing LAN wiring merely provides an existing and useful connection topology, and is only one component of the network and the invention, and if not used, does not impact the other elements of the invention. Other broadband network users, both on and off site, need not be connected to the existing LAN. That is, network users may be directly coupled to a premises switch, whether or not the premises switch is physically located on site. Alternative local node connection topologies may include, for exam.ple, the use of broadband LAN capability in the local node such as ATM or Gigabit Ethernet. With this topology, broadband multimedia traffic may be passed through the user's existing LAN router/switch to ports connected over transport facilities directly to the city nodes of the broadband network. With this topological configuration, the user's LAN router/switch would also need to be configured to relay network signaling messages from user workstations and/or workstation interfaces to the network control system server 40.

Wiring 120 between each workstation 100 and premises switch 110 and between premises switch 110 and LAN router 130 can be implemented in many known ways, and as such the particular implementation is incidental to this invention. Preferably, however, the existing LAN wiring 120 is 10baseT or 100baseT Ethernet-capable, the LAN router 130 are Ethernet facilities, and the connection between premises switch 110 and LAN router connection is lOO-baseT Ethernet. This use of the existing LAN wiring to simultaneously connect a user via the premises switch allows the preexisting wiring to now carry completely independent classes of traffic on the original wires. Thus, a broadband network user now has direct access to switched broadband wide area connection services while remaining connected to existing local area network services, and this is accomplished without changing the network addresses of the user's workstation as seen by the LAN router or adding any additional traffic load to the existing LAN router.

I.A. User Workstation

Figure 3:
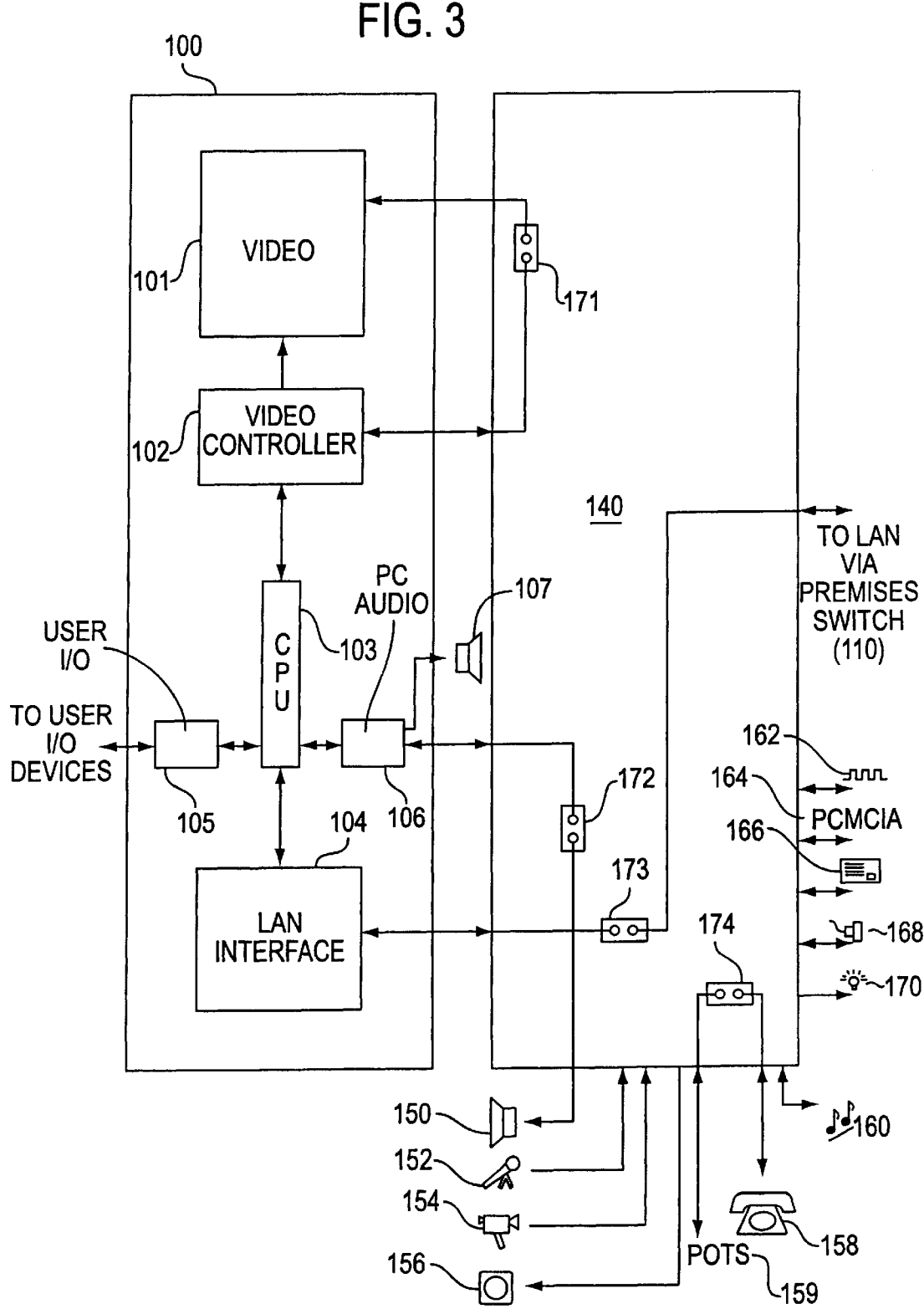
FIG. 3 illustrates an embodiment of a workstation configuration in a local node such as that illustrated in FIG. 2.

A typical user workstation configuration in accordance with the embodiment illustrated in FIG. 2 is illustrated in FIG. 3. As shown in FIG. 3, the user workstation 100 includes a video display 101, a video controller 102, a CPU 103, a LAN interface 104, a user I/O controller 105 that arbitrates user commands input by a user through I/O devices connected to the user workstation 100, and a PC audio section 106 that produces audio output to a speaker 107. As can be appreciated, the user workstation components can be implemented in many different known ways and with many different known architectures. As such, the particular components and architectures chosen are incidental to the invention. It is preferable, however, that the video device 101 is capable of providing VGA or "multisynch" performance, the CPU 103 is capable of supporting Java applications, and the LAN interface 104 is capable of supporting Ethernet.

1.A. 1. User Workstation Software

Figure 4:
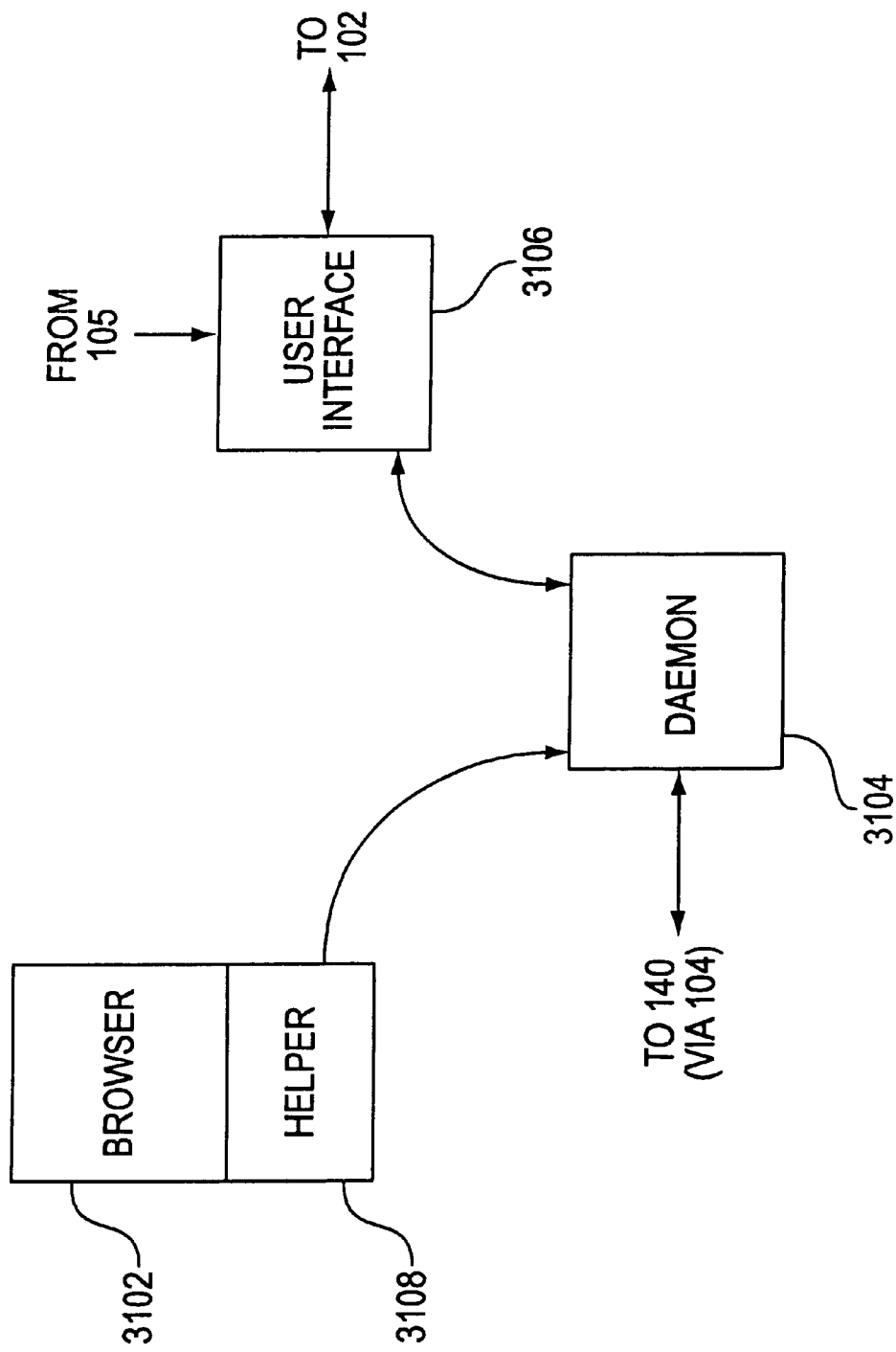
FIG. 4 is a block diagram of the software load on a workstation in a local node such as that illustrated in FIG. 2.

FIG. 4 is a block diagram of an example of the software load on user workstation 100. Initially, the only required software on user workstation 100 is a Java-capable web browser 3102. To provide necessary interaction with the workstation interface 140, however, a daemon process 3104 is instantiated on the user workstation 100. The software on user workstation 100 also includes a user interface process 3106 that is responsible for responding to user inputs from user I/O 105, and for drawing objects on video display 101 via video controller 102. To enable the browser 3102 to handle URLs unique to the broadband network, it is configured with a helper process 3108, whose main function is to notify daemon process 3104 when a broadband network connection is being requested from the browser.

When the workstation 100 is powered on, the daemon process is instantiated and listens for messages from either the browser 3102 (via helper process 3108), requesting to originate a connection, or from the workstation interface 140, indicating that another user is requesting a connection for workstation 100 to terrninate.

Figure 5:
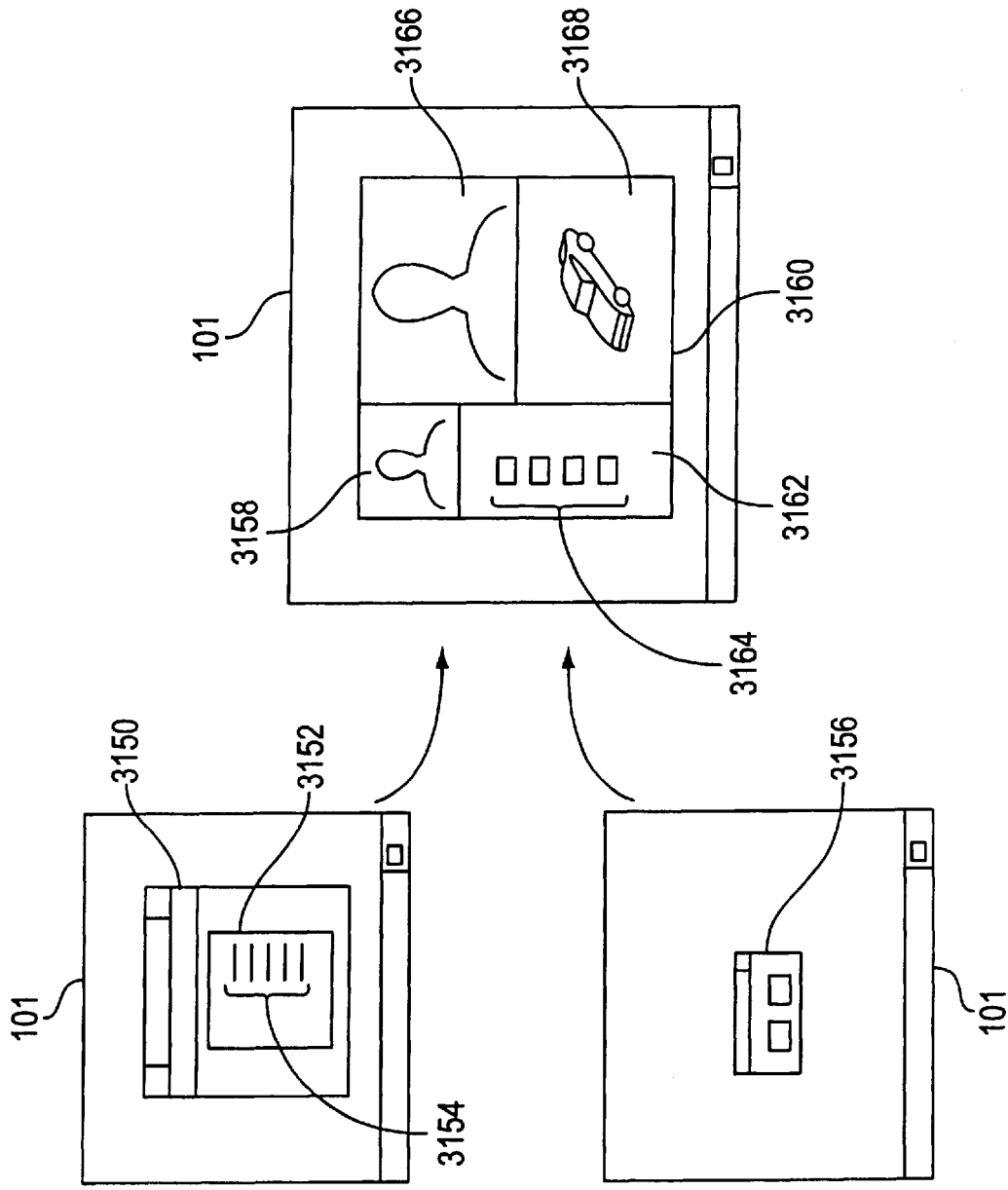
FIG. 5 illustrates the operational aspects of the workstation software load illustrated in FIG. 4.

FIG. 5 illustrates the sequence of operations performed by the software load on user workstation 100 according to the invention.

When a user is running browser 3102, the browser window 3150 is displayed on the video display 101. If the user desires to originate a broadband network connection, a web site that contains a directory of broadband network users is accessed and the directory viewer 3152 is displayed in the browser window. The directory viewer 3152 contains a list of broadband network users, whose names 3154 are preferably shown as hypertext with links having URLs that are unique to the broadband network. When the user selects a party or parties from the list, the browser 3102 invokes helper process 3108 to handle the request, and helper process 3108 in turn notifies daemon process 3104. Daemon process 3104 invokes user interface process 3106, which draws display window 3160 on video display 101. User interface process 3106 may also draw a dialog box (not shown) asking the user to specify what kind of connection is desired (e.g., audio only, data only, teleconference, etc.). This information is returned to daemon process 3104 and formatted into a connection request that is forwarded to workstation interface 140, which sends the request to network control system server 40 over the signaling network 30.

Meanwhile, for connection requests sent to workstation 100 from another broadband network user, these are received by daemon process 3104. When such requests are received, daemon process 3104 activates user interface process 3106, which in turn paints a dialog box 3156 on video display 101, querying the user whether she wishes to participate in the connection. The answer is collected by user interface process 3106 via user I/O 105, relayed to the daemon process 3104, and from thence to workstation interface 140. If the connection is agreed to and is made, user interface process 3106 draws display window 3160 on video display 101.

Display window 3160 can contain a number of sub-windows. These can include chroma-key sub-windows 3158 and 3166 that are used, for example, to display video camera images of the local user and remote user, respectively. These chroma-key subwindows are painted by user interface process 3106 and the coordinates and sizes of these sub-windows are reported to workstation interface 140 so the workstation interface can know where to locate the sub-windows in the video signals generated by video controller 102. If the window 3160 or sub-windows 3158 and 3166 are re-sized by the user via user I/O 105, user interface process 3106 updates the positions and sizes and reports them to the workstation interface 140. The sub-windows are painted either with a color that is specified by workstation interface 140, or that is reported to workstation interface 140. Display window can also contain a control window 3162 for permitting user controls 3164 (e.g. hang up), and display subwindow 3168 that can be used to display a graphics image, or can be another chroma-key window for display of a conference participant or other objects. It should be apparent that the number and size of the sub-windows displayed can be predetermined, or can vary depending on the type of connection, the number of participants, and the quantity of media streams employed.

Although the process of requesting a broadband network connection has been described above with reference to the example of a user interface process interacting with a user to select a connection, it should be apparent that many alternatives are possible. For example, additional layers of software can be built that automatically determine whether to use a packet-switched connection (e.g., low-latency applications such as text, small graphics, e-mail and small file transfers) or a circuit-switched connection (e.g., video, voice, complex graphics and animations, or large file transfers) for the particular type of communication desired, and how much bandwidth to request for each connection.

I.B. Workstation Interface

A typical workstation configuration in accordance with the embodiment illustrated in FIG. 2 is illustrated in FIG. 3. It includes user workstation 100 and workstation interface

140. As shown in FIG. 3, the workstation interface 140 includes two important connections to the user's workstation 100. The first connection is between the video controller 102 and the video display 101 so that the workstation interface is capable of intercepting and manipulating the signal that would normally be sent by the video controller 102 directly to the video display 101. As will be explained in more detail below, video display signals not relating to broadband network connections are passed through such connection without change, whereas video display signals relating to broadband network connections are altered to include additional video display information that is sent or received across broadband network connections. The second connection between the user workstation and the workstation interface is to the LAN interface 104 on the user workstation. This is so that the workstation interface 140 is capable of discriminating between data traffic that is intended to flow between the user workstation and the LAN routing facilities and that data traffic that is intended to flow between the user workstation and/or the workstation interface and the broadband network. As will be explained in more detail below in both this section and the premises switch section, normal data traffic between the user workstation and the LAN is simply passed through both the workstation interface 140 and the premises switch 110, while data traffic related to a broadband network connection triggers special handling within the local node. Workstation interface 140 may also include a third connection from a user workstation 100's PC audio section 106 so that workstation audio output can be included by the workstation interface in broadband network connection information.

The workstation interface 140 also supports connections to various peripheral devices usually placed on the user's desktop, including one or more of each of a speaker 150, microphone 152, camera 154, video monitor 156 (in addition to the user workstation video display monitor 101), telephone set 158, audio device 160, serial I/O device 162, PCMCIA card 164, user input device 166, test connector 168, and status indicator 170. These devices and the connections to them will be explained in more detail below.

For additional transparency and reliability in the event of power failure, for example, workstation interface 140 includes cutover relays 171, 172, 173, and 174. During normal operations, these relays are configured to cause signals from and to user workstation 100 to be processed by the workstation interface. However, in the event of power or other failure, the relays are caused to trip, thereby forcing the signals along their normal route, so that such failure does not disturb the 10 otherwise normal functions of the LAN and the workstation.

Figure 6:
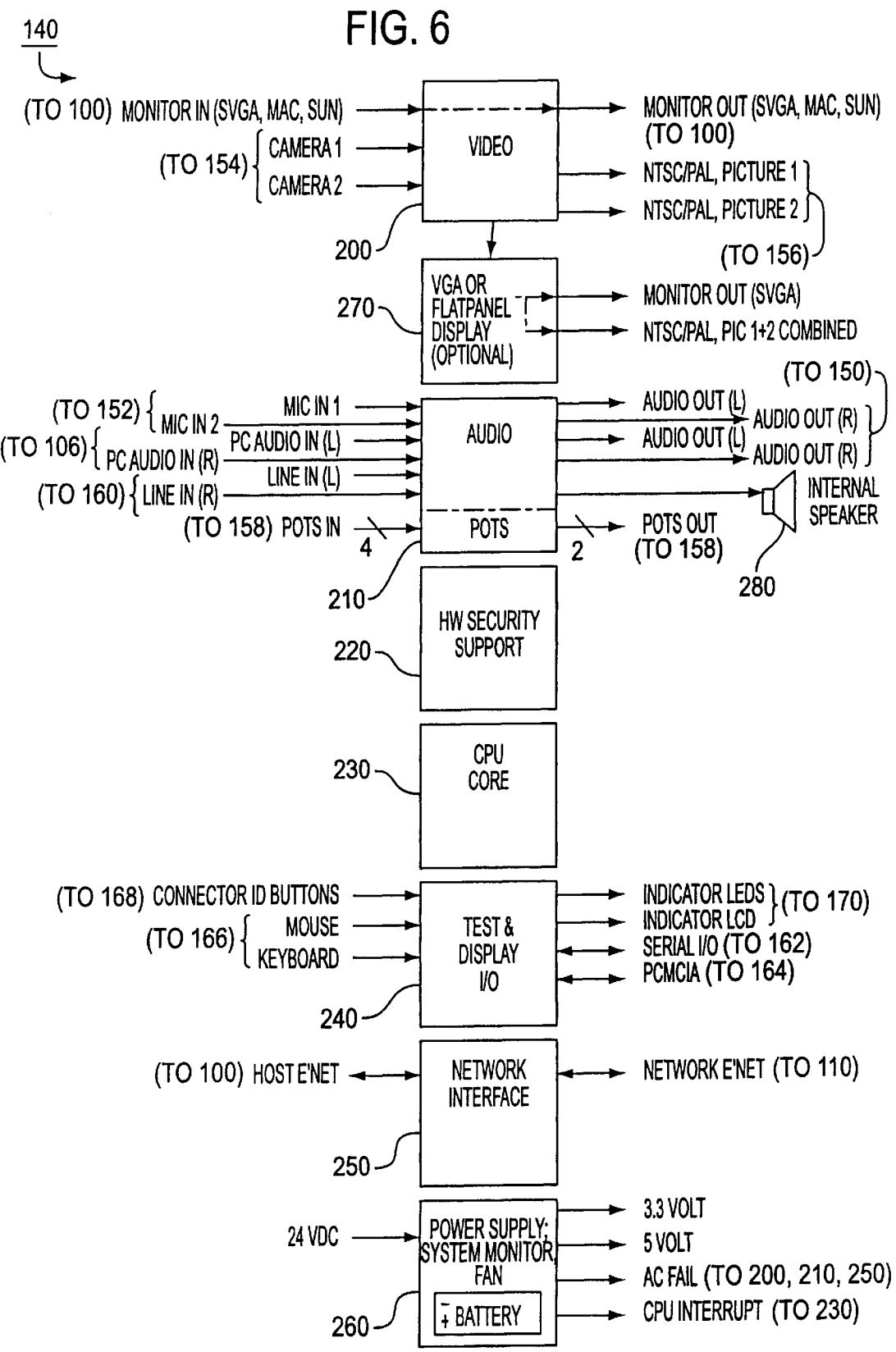
FIG. 6 is a top-level functional diagran of a workstation interface in a workstation configuration such as that illustrated in FIG. 3.

FIG. 6 is a top level functional block diagram of a workstation interface 140 in accordance with the embodiment illustrated in FIG. 3.

As shown in FIG. 6, workstation interface 140 includes a video block 200, an audio block 210, a hardware encryption/decryption and security block 220, a CPU core 230, a test and display I/O block 240, a network interface block 250, and a power supply and system monitor block 260. The workstation interface may also include a SVGA display monitor 270.

When display monitor 270 and associated user input device 166 is provided, the workstation interface becomes capable of supporting communication and computer services directly for a user without the need for attaching an existing workstation computer to the workstation interface. In this mode of use the workstation interface becomes a standalone network computer that is capable of communicating simultaneously over both the facilities of the user's existing LAN and over the facilities of the broadband network.

In normal use, video block 200 receives video inputs from the user workstation video controller 102, via a VGA or similar type cable, and a camera(s) 154 connected to the workstation interface. The video block 200 outputs video signals to the user workstation video display 101 and (optionally) to a second video display or television monitor 156. Video block 200 also outputs video signals to an additional optional display monitor 270 (normally used only when the workstation interface is used as a standalone network computer as described above).

Preferably, inputs from two cameras 154 and outputs to two video monitors 156 are supported. The video output signals may be either analog (RGB)/digital (VGA/multisync) or television type (NTSC/PAL), depending on the type of display monitor. The display monitor may include passthrough jacks to feed these video signals to additional display monitors (not shown). The cameras 154 may include real-time video pickups such as a CCD or the like or may include video playback devices such as VCRs, laser discs or DVDs.

Audio block 210 receives audio inputs from a microphone 152, user workstation 100's PC audio section 106, and audio device 160, and from a telephone set 158. Audio block 210 also outputs audio signals to speakers 150, to an internal speaker 280 mounted in the workstation interface, and to telephone set 158. Preferably, stereo outputs to four speakers 150 are supported.

Test and display I/O block 240 receives inputs from connector 168, user input device (such as a mouse and/or keyboard) 166, a generic serial I/O device 162 and PCMCIA card 164. Test and I/O display I/O block 240 also produces outputs to serial I/O device 162, PCMCIA card 164 and status indicators 170.

Network interface block 250 is connected to the user workstation 100's LAN interface 104 and is also connected LAN via premises switch 110 usually over re-used LAN wiring 120.

It is important to note that should the workstation interface 140 fail for any reason whatsoever, (whether due to loss of power, failure of any internal hardware or software component, etc.) the functionality of user workstation 100 and its data connection to the existing LAN router 130 via the premises switch 110 will not be adversely impacted (i.e., the user workstation will still work and can still communicate with the existing LAN router 130). This is possible because in the event of any hardware or software failure in the workstation interface, bypass relays are released causing the user workstation LAN interface 140 to be directly connected to the LAN wire 120 that connects the workstation interface 140 to the premises switch 110.

It should be noted from the configuration of the workstation interface 140 as described above that its installation together with user workstation 100 can be a straightforward process of exchanging wires to existing jacks on workstation 100, such as those connecting the LAN cable to the workstation 100's network interface card, and display monitor cable to the workstation 100's video controller card. It should be further apparent from the above descriptions that these replaced connections have no effect on the operation of the user workstation except in cases of a broadband network connection. That is, workstation interface 140 merely serves to extend the existing functionality of workstation 100 to be operable with the broadband network of the present invention without changing or limiting its existing functionality.

I.B.1. CPU Core

Figure 7:
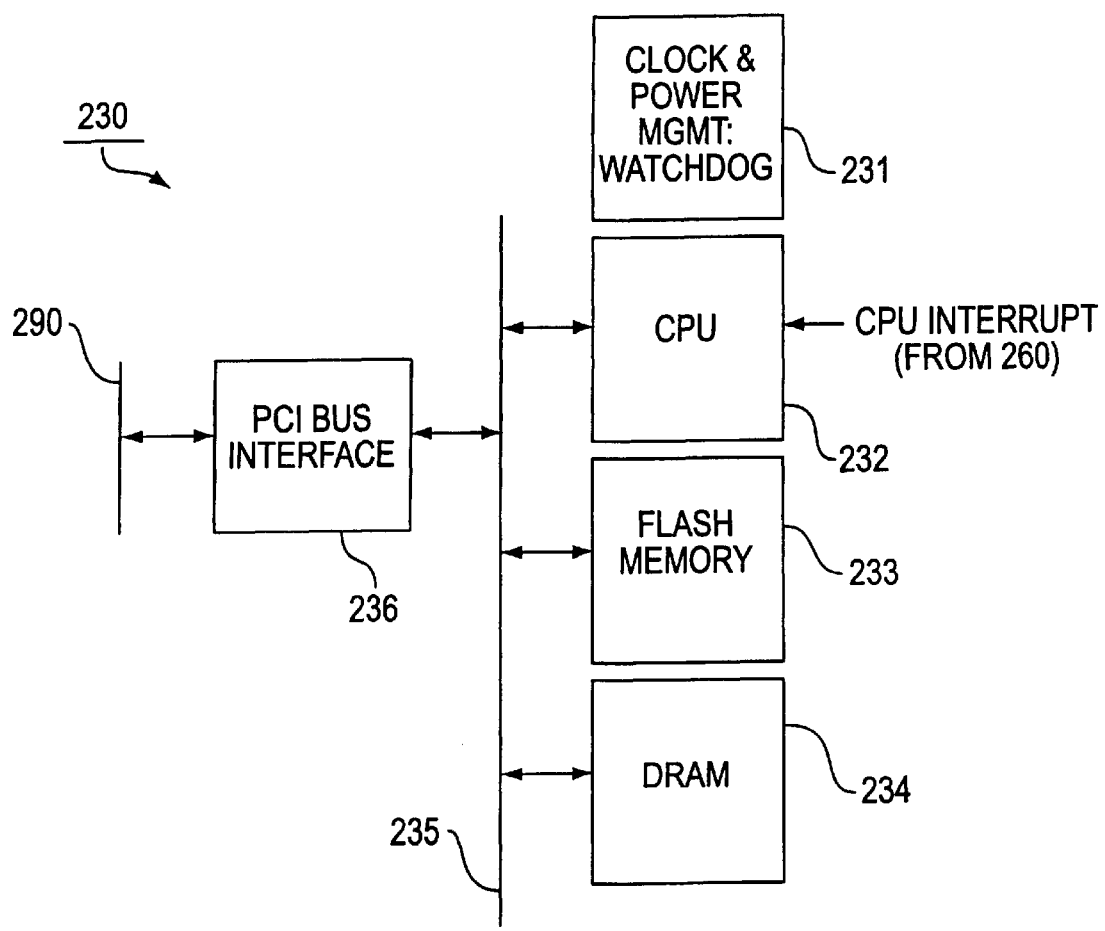
FIG. 7 illustrates a CPU core functional block in a workstation interface such as that illustrated in FIG. 6.

FIG. 7 illustrates a CPU core 230 in accordance with the embodiment of the invention illustrated in FIG. 6. It includes a clock and power management block 231, a CPU 232, (such as a SPARC, a MIPS, an Am486/K5/K6, etc.), a flash memory 233, a DRAM memory 234, and a PCI bus interface 236, all of which communicate via a local bus 235. PCI bus interface 236 arbitrates communication between the CPU core and other functional components in workstation interface 140 via PCI bus 290. It should be appreciated that although a PCI bus is preferably used in this embodiment, other bus architectures are equally possible. The construction and operation of the above components are well known.

CPU core 230 receives CPU interrupt from power supply and system monitor block 260 via PCI bus 290. In the event of power failure or other workstation interface failure, the CPU interrupt causes shutdown processing to be activated by CPU 232.

I.B.2. Video Block

Figure 8:
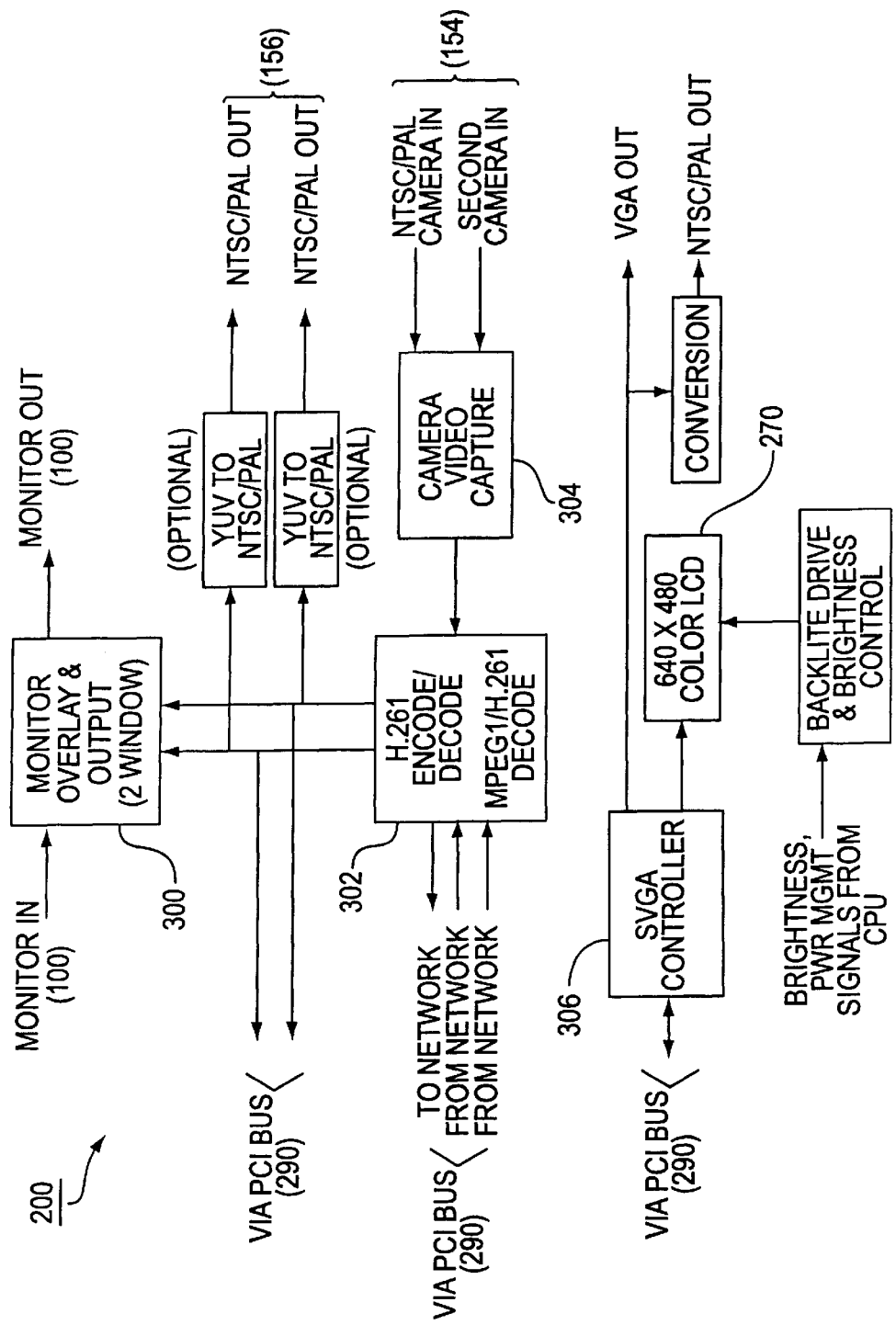
FIG. 8 illustrates a video functional block in a workstation interface such as that illustrated in FIG. 6.
Figure 9:
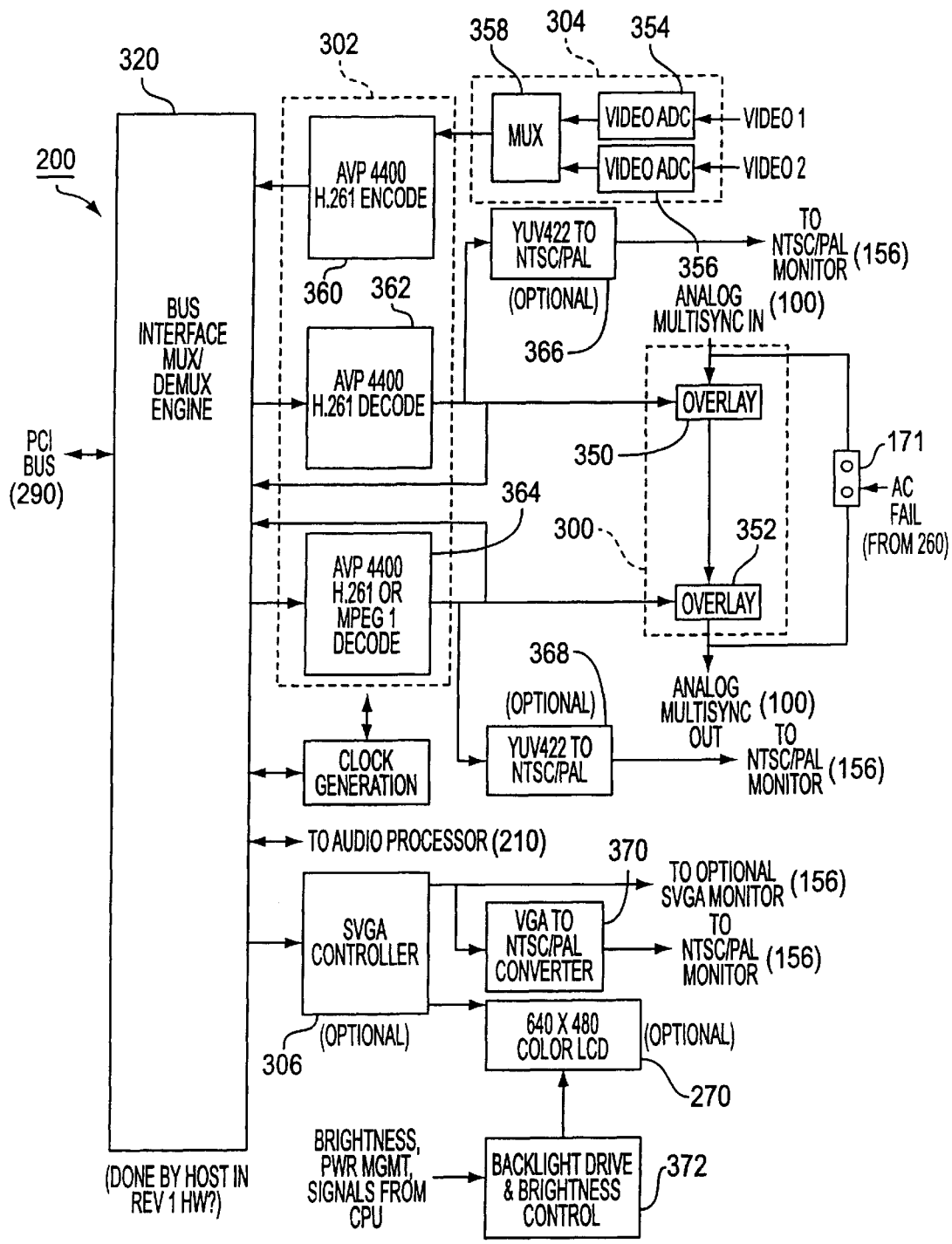
FIG. 9 further illustrates a video functional block such as that illustrated in FIG. 8.

FIGS. 8 and 9 illustrate an example of a video block 200 in accordance with the embodiment of workstation interface 140 illustrated in FIG. 6. It includes a monitor overlay and output block 300, an encode/decode block 302, a video capture block 304, and a video graphics controller 306.

Monitor overlay and output block 300 receives the video display signal from user workstation 100 and outputs a video display signal to the user workstation 100 display monitor 101. During a broadband network connection, monitor overlay and output block 300 also may receive video signals from the network, or locally connected cameras 154, via encode/decode block 302. Monitor overlay and output block 300 overlays these signals onto the workstation video display signal in a manner that will be described in more detail below. It should be appreciated at this time, however, that because the workstation interface 140 of this system performs all broadband network data sending, receiving, video encoding/decoding, and video overlay display tasks, that the user workstation 100 is not so burdened. Further, because workstation interface 140 operates independently of the user workstation to process and present broadband network data, it is able to provide its functionality without regard of the particular type, processing speed, or software operating system of user workstation 100. Additionally, and equally important, all of the network connection management and video processing functionality required to support useful multimedia broadband network services can be provided to a user's workstation without the need for performing any physical modifications or adding any additional components inside the user workstation. The workstation interface need only be connected to the user workstation using the Ethernet (or similar) and VGA (or similar) types of connections that are already available on most existing user workstations.

Preferably, however, the workstation's video display 101 is a type of display supported by the workstation interface 140 and the user workstation's video controller 102 outputs a video format that is supported by the workstation interface 140. Preferably, the video display is analog RGB (the vast majority are) and the analog video format is compatible with red/green/blue encoding with separate synchronization as used in VGA, SVGA, and other multisync monitors. Macintosh and Sun systems are also analog RGB, they are therefore supported by the monitor overlay and output block 300 for further platform independence. By simple extension, other types of monitor display formats could be supported if necessary. In some cases a simple mechanical adapter for different connector styles may be required.

As further illustrated in FIG. 9, monitor overlay and output block 300 includes overlay modules 350 and 352 that receive the decoded video data from local cameras 154 or broadband network connections and overlay it onto the video display signals from the user workstation's video controller 102 for output onto the user workstation's video display 101. Otherwise, the overlay modules 350 and 352 pass the workstation's video display signal without change. It should be noted that two overlay modules are shown only as an example. One can have as many overlay modules as desired. Nine is a preferred number, for example to because nine overlaid video windows of reasonable size can be nicely arranged to fill a typical video display monitor screen.

In parallel with monitor overlay and output block 300 is cutover relay 171, that forces the video signals to be passed directly to the workstation video display in the event of power failure, for example, as indicated by the failure signal from power supply and system monitor block 260.

The overlay modules 350 and 352, using techniques well known in the art, automatically switch between the workstation's RGB video signal and the new picture elements supplied by the workstation interface's decode blocks 362 and 364, rapidly and repetitively, thus giving the appearance on the workstation display screen of one picture overlaid on another. The overlay module 350 and 352 know when to switch by examining the analog RGB signal for special "keying" signals. These can be either analog or digital. The current implementation uses an analog system wherein the overlay module 350 is told by software (through a driver, for example) to look for chroma-key color A (defined as certain proportions of red, green, and blue); overlay module 352 is told to look for chroma-key color B (different proportions of red, green, blue). When the key colors are found, the switching occurs. This technique permits software running on the user workstation to control the location of the workstation interface's video window overlay by drawing arectangle of the appropriate key color(s) wherever desired. It is also possible to perform the overlay task in a digital way, by watching the sync signals and counting the (x,y) display screen co-ordinates. The signals are then switched at the desired values of x, y.

Video capture block 304 receives the video signals video 1 and video 2 from the cameras 154. As illustrated in FIG. 9, video analog-to-digital converters (ADCs) 354 and 356 respectively digitize the video signals for input into video multiplexer 358, which selectively outputs the digitized video signals to compressor/decompressor block 302.

Compressor/decompressor block 302 receives video data streams from over the network via PCI bus 290 and receives video data from cameras 154 via the video capture block 304. It decompresses the data from the network and outputs video data streams to monitor overlay and output block 300. Conversely, it compresses the video data from the cameras and outputs compressed data to the network. The compressed data is preferably in known formats such as H.261, MPEG1 and MPEG2. The video data is preferably in the YUV422 format, a known industry standard.

As illustrated in FIG. 9, compressor/decompressor block 302 includes compressor/decompressor modules 360, 362 and 364. The compressor modules are preferably AVP4400s, (a video compressor/decompressor product made by Lucent Technologies). However many similar products known in the art could be used instead. In the preferred embodiment, the compressor/decompressor block compresses/decompresses video data using the H.261 or MPEG1 and/or MPEG2 formats. Compressor module 360 compresses the digitized video signals from the video capture block. The compressed video signals from compressor module 360 are sent to muxidemux engine 320 for transmission over broadband network connections via PCI bus 290. Decompressor module 362 decompresses H.261 data received from broadband network connections via PCI bus 290 and mux/demux engine 320 and outputs the decompressed data to monitor overlay and output block 300. Similarly, decompressor module 364 also decompresses H.261 data received from broadband network connections via PCI bus 290 and mux/demux engine 320 and outputs the decompressed data to monitor overlay and output block 300. By providing a plurality of decompressor modules, multiple party video connections can be supported by establishing multiple simultaneous connections over the broadband network.

Preferably, the decompressed data that is output to monitor overlay and output block 300 is in the YUV422 format.

As illustrated in FIGS. 8 and 9, video block 200 may include video converters 366 and 368 that convert the decompressed video data output from decompressor modules 362 and 364, respectively, into standard television video signals such as NTSC or PAL for display on standard television monitors 156.

SVGA controller 306 receives video signals from PCI bus 290 via mux/demux engine 320. These signals are the decompressed video signals from the Network or local cameras 156; as described above. This SVGA controller block 306 provides an alternate display mechanism, thereby allowing a user to direct received video pictures onto a separate display device, such as a television set, as an alterative to overlaying the received video on the user workstation video display monitor 101. In addition to (or instead of) overlaying video images on the workstation display monitor 101, the workstation interface can feed the video streams to a separate analog RGB monitor, an LCD screen, or an NTSC television display. Items 306, 370, 270, 372 perform these functions. VGA controller 306 outputs video signals to external video monitor 156, either directly or through television converter 370, and also to SVGA monitor 270. Backlight and brightness controls for SVGA monitor 270 are sent by SVGA display control module 372 under control of CPU core 230. The functions of this module are typically accessed via the PCI bus of the workstation interface.

Mux/demux engine 320 receives and outputs network data to and from the network via PCI bus 290. It also receives and outputs network data to and from compressor/decompressor block 302. Video information from broadband network data streams is fed to VGA controller for optional display on SVGA monitor 270 or television monitor 156. Moreover, sent or received audio information contained within separate data streams on broadband network connections or audio information that is muxed/de-muxed from/into combined audio/video streams by the encode/decode blocks 360, 362, and 364 is sent to audio block 210 via mux/demux engine 320 and PCI bus 290 for secondary audio processing. As will be described in more detail below, audio block 210 is responsible for analog-to-digital conversion of audio, audio level control, mixing of audio streams, compression/decompression of audio streams, cancellation of echo caused by acoustic effects, cancellation of echo caused by network transmission delays, and the interfacing of audio to/from plain old telephone service (POTS) telephone lines and POTS telephone sets.

As illustrated in FIG. 9, video block 200 includes a clock generator used to synchronize operations of the above-described components of the video block. Likewise, all video clocks and audio clocks must be synchronized in order to preserve video quality and audio lip synchronization. When used with appropriate standard network transmission protocols, synchronized audio and video information can be transmitted as separate asynchronous packet streams on broadband network connections. Using the synchronized clocks described above, the originating workstation interface can "time-stamp" packets containing audio and packets containing video so that even if the packets do not arrive at the receiving workstation interface at exactly the same time, software in the receiving workstation interface can re-synchronize the received audio and video based on these time-stamps.

I.B.3. Audio Block

Figure 10:
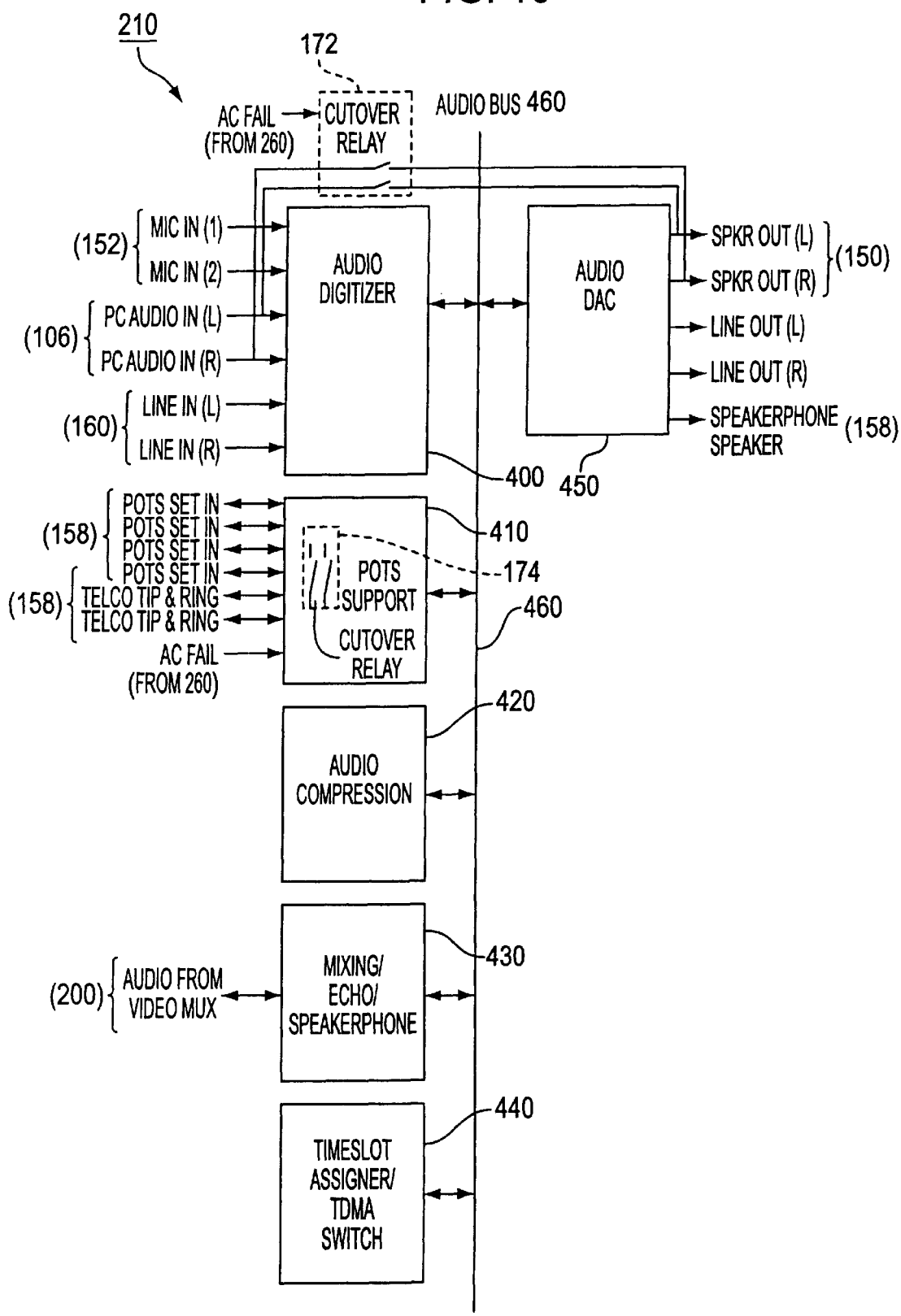
FIG. 10 illustrates an audio functional block in a workstation interface such as that illustrated in FIG. 6.

FIG. 10 illustrates an example of an audio block 210 in accordance with the embodiment of the workstation interface 140 illustrated in FIG. 6. It includes an audio digitizer 400, a POTS support module 410, an audio compression module 420, an audio mixer 430, a TDMA switch 440 and an audio digital to analog converter (DAC) 450, all connected to each other via an audio bus 460.

Audio DAC 450 receives digitized audio signals via audio bus 460, converts them into analog signals, and outputs them via speaker 150, the speaker phone of telephone 158, or audio device 161, typically a VCR. As explained above in the workstation software description, a user through software applications running on the workstation can choose which audio inputs and outputs to use. Such choices are communicated from this software to workstation interface over the Ethernet connection between the user workstation and the workstation interface. Software in the workstation interface receives these commands and controls audio switching (by an audio driver, for example) in the audio block 210 to select the requested audio inputs and outputs.

Audio mixer 430 sends and receives audio data signals to and from the network via mux/demux module 320 in video block 200. Audio mixer 430 also sends, and receives audio data signals to and from audio bus 460. Audio mixer 430 examines and modifies the digital audio from audio digitizer 400 delivered to the network in order to remove room noise and "echo" caused by the same audio delivered to the speakers via the DAC 450. Any audio delivered from the network to any speaker and from any microphones to the network may be "echo-canceled" in this fashion using audio mixer 430.

Audio digitizer 400 receives audio signals from microphone 152, from the user workstation 100 audio module 106, and from audio device 160, digitizes the audio signals and outputs them either to audio DAC 450 via audio bus 460 and/or to the network via audio mixer 430, and audio bus 460 as is appropriate for the particular audio signal in question. Moreover, audio signals from a user workstation 100 may be passed through directly to speakers 150 via cutover relay 172 in the event of the failure of the workstation interface or its loss of power, as indicated by the failure signal received from power supply and system monitor block 260.

POTS support module 410 receives telephone signals from telephone set 158 and directly outputs such telephone signals to the POTS telephone line interface 159 when cutover relay 174 is released as the result of a power failure or other failure of workstation interface 140, as indicated by the failure signal from power supply and system monitor block 260. This allows the telephone set to always be connected to "life-line" services over an ordinary telephone line in the event of a power failure or other failure of the workstation interface itself. In normal use, the cut-over relay 174 is activated, thereby connecting both the telephone line interface(s) 159 and the telephone set(s) 158 to the POTS support module 410.

POTS support module 410 responds to incoming ringing signals on connected POTS telephone lines and generates signals necessary to ring telephone set 158 connected to workstation interface 140. It also can detect and generate DTMF dialing signals and detect and generate hook switch signals, thereby providing full POTS telephony support to workstation 100. Moreover, it can switch analog telephone audio signals between telephone line interface(s) 159 and telephone set interface(s) and onto and off of the audio bus for eventual conversion and connection to and or mixing with audio streams occurring on broadband network connections.

Audio compression module 420 compresses digitized audio data from audio digitizer 400 via audio bus 460 according to known telephone audio compression standards (such as A-law or µ-law) for sending over the network via audio mixer 430 and audio bus 460. Similarly, received digital audio is decompressed by audio compression block 420 before being converted into analog signals.

TDMA switch 440 is a digital switching circuit which connects various sources of digital audio data to various destinations for that data on the audio bus using time division multiplexing. The preferred embodiment of this TDMA switch uses an industry standard method, known to those familiar with the art as Multi-Vendor Interface Protocol (MVIP), for switching data such as digitized audio; this approach has been adopted to provide a flexible, software controlled method for connecting many possible audio inputs to many possible audio outputs.

I.B.4. Hardware Security Block

Figure 11:
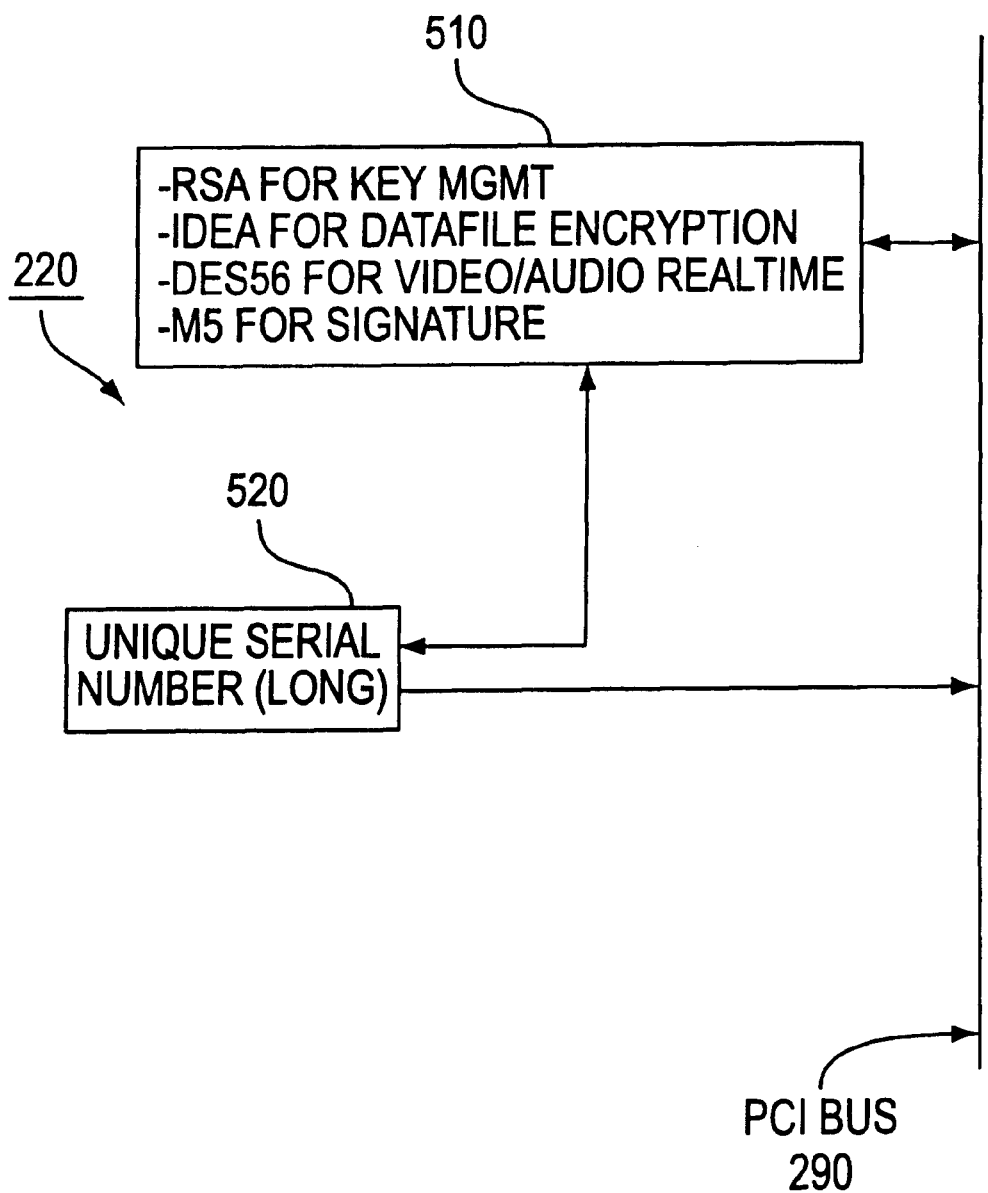
FIG. 11 illustrates the hardware security functional block in a workstation interface such as that illustrated in FIG. 6.

FIG. 11 illustrates a hardware security block 220 in accordance with the embodiment of the invention illustrated in FIG. 6.

Encryption/key management function 510 includes the functions needed for system security, data security, and authentication including but not limited to key management, data encryption/decryption, video/audio real-time encryption/decryption, and end-to-end authentication. For the purposes of the present invention, the above functions are implemented using hardware and software encryption methodologies well known in the art, such as RSA public key encryption and key management hardware and software, such as that provided by Wave Systems, Inc. These commercially available hardware and software modules are conventionally located on plug-in cards in a workstation or executed as software installed on the workstation. This well known method for using such security modules has created significant difficulties for users because of the need to physically modify the workstation and/or because of the additional computing load that software based encryption modules require. A novel implementation of such encryption and key management functions that is part of the present invention is to implement these functions in the workstation interface such that the desired encryption and key management functions are provided between users of the network in a manner that does not require physical installation in or modification of the user workstation and/or additional computing load by the user workstation. For clarity, encryption/key management function 510 is shown as a component of hardware security block 220. However, it should be appreciated that this function can be implemented in software located in block 220, or in CPU block 230 or elsewhere.

Hardware security block 220 also includes a unique serial number 520, preferably including a 48 bit MAC address. Each workstation interface, prior to shipment from the factory, has a machine-readable device permanently installed which contains one (or more) unique identifier numbers. The numbers contained in this device cannot be altered, and so provides a fingerprint for the each unit that can be used as an additional element of data in the creation and management of encryption keys to provide yet another element of security for users.

I.B.5. Test and I/O Display Block

Figure 12:
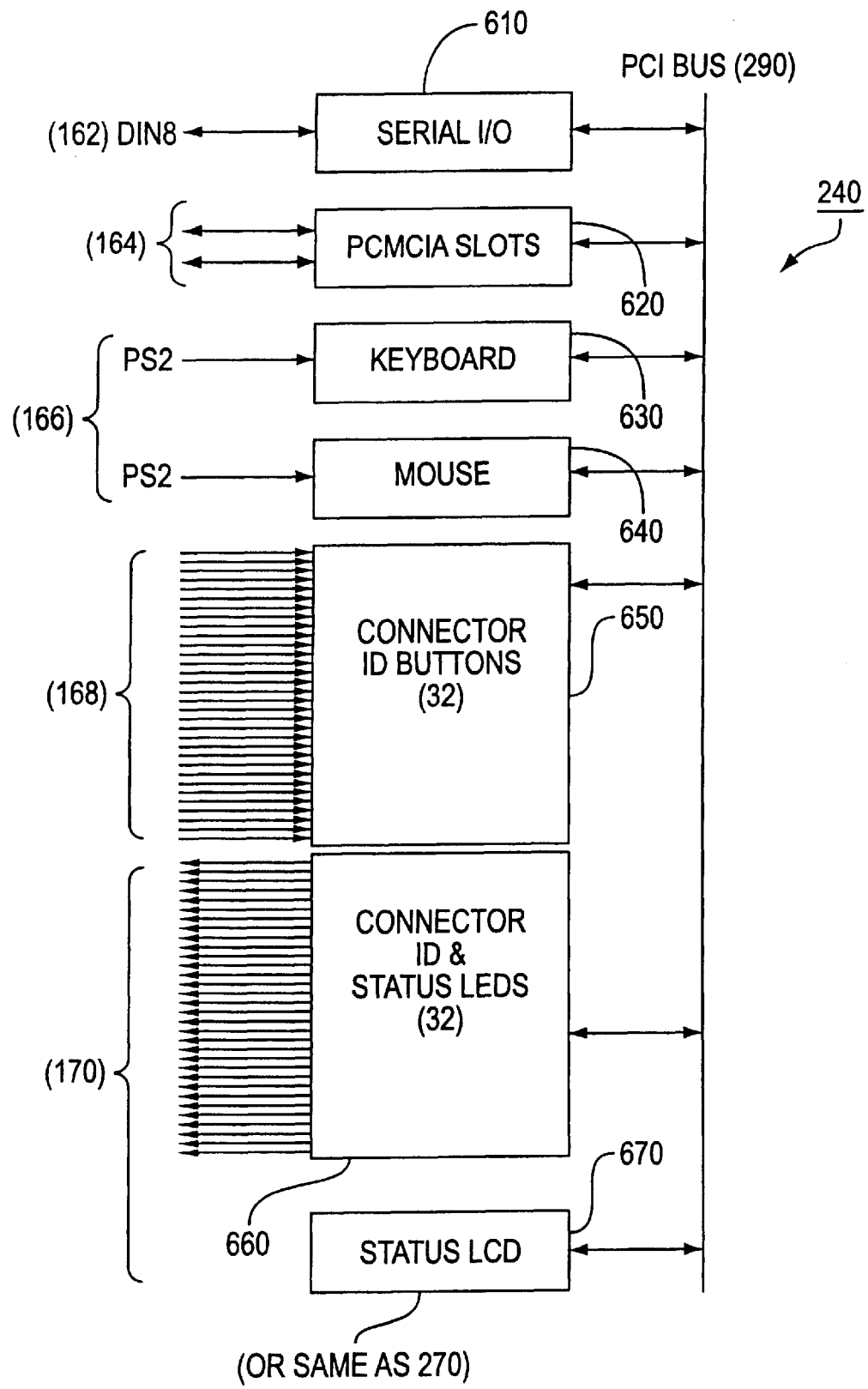
FIG. 12 illustrates a test and I/O display functional block in a workstation interface such as that illustrated in FIG. 6.

FIG. 12 illustrates a test and I/O display block 240 in accordance with the embodiment of the invention illustrated in FIG. 6. It includes a serial input/output interface module 610, a PCMCIA interface module 620, a keyboard interface module 630, a mouse interface module 640, a connector ID module 650, a connector status module 660, and a status display 670. All the above modules arbitrate communications between respective external devices and CPU core 230 via PCI bus 290. These functions are provided mainly for handling diagnostics or service operations, and are not necessarily useful for establishing network connections or other real-time operations. Rather, these functions are included to simplify users' installations. For example, the connector ID module 650 includes buttons which, when pushed, trigger visual or audio prompting of what to do with the connectors next to the button. The LEDs can be flashed to call the user's attention to a specific connector.

I.B.6. Network Interface Block

Figure 13:
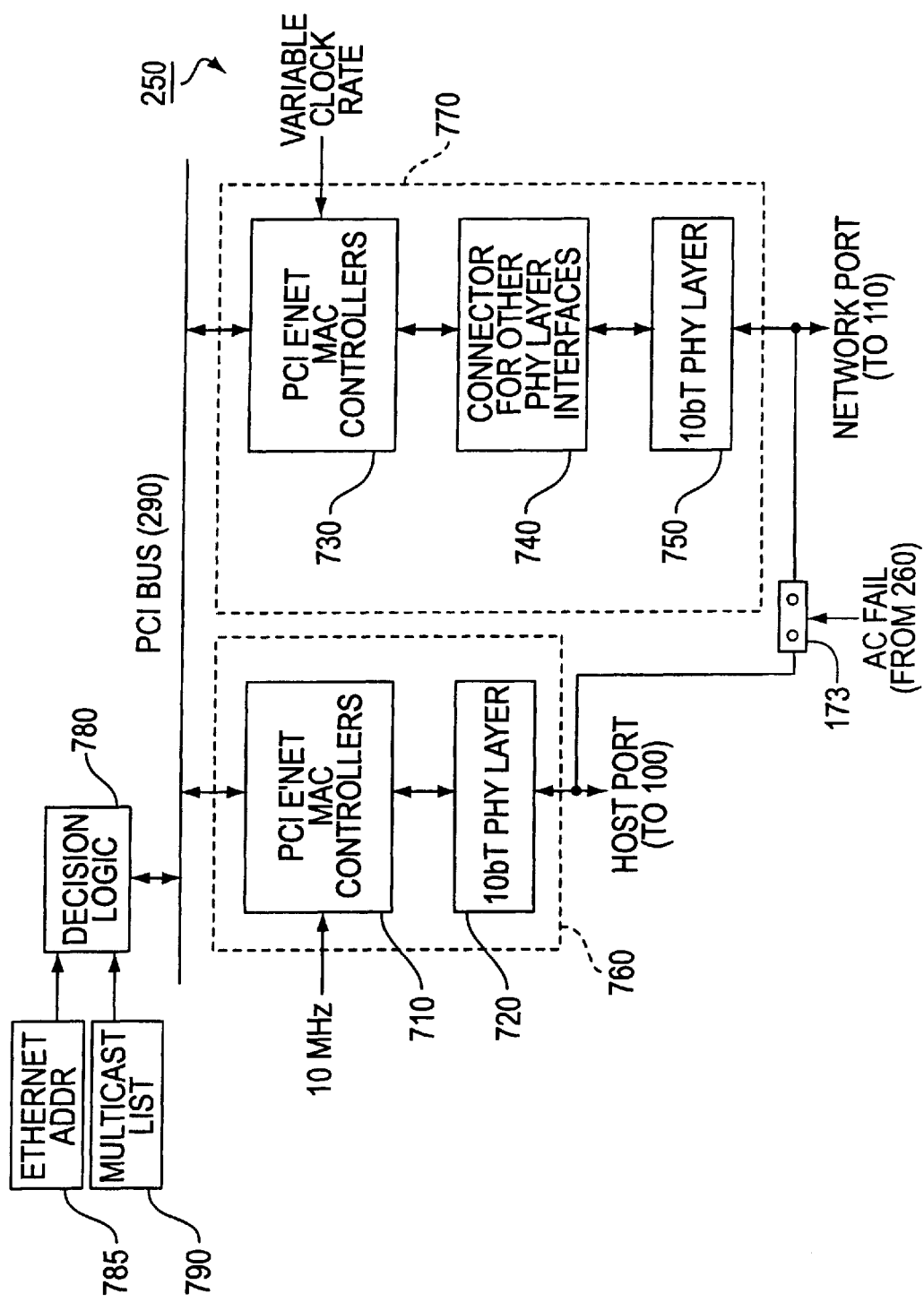
FIG. 13 illustrates a network interface functional block in a workstation interface such as that illustrated in FIG. 6.

FIG. 13 illustrates a network interface block 250 in accordance with the embodiment of the invention illustrated in FIG. 6. It includes an Ethernet (or similar) interface 760 for connection to the user workstation's Ethernet (or similar) LAN data port; and a second Ethernet or similar interface 770 for connection to the premises switch 110 using (where available) existing Ethernet wiring. It should be noted that this is only one preferred embodiment, and that other local area networking formats such as ATM and token-ring could be implemented instead.

In this embodiment, standard Ethernet network LAN controllers 710 and 730, respectively, host and network 1ObT layers 720 and 750, respectively, and a network interface connector 740 serve to provide the two interfaces 760 and 770 described above. The two LAN controllers each receive traffic on their respective ports. Each packet received from each of the two interfaces 760 and 770 is examined by decision logic 780 for forwarding to the other interface or for further processing by the workstation interface 140.

Decision logic 780 for examining and forwarding packets can be implemented as software running in CPU core 230. However, it should be noted that the decision logic can be implemented as a gate array or similar device located in network interface block 250 (as illustrated in FIG. 13 for clarity) or elsewhere in the system. Decision logic uses for comparison the workstation interface's Ethernet address 785, and multicast list 790. Addresses in multicast list 790 are assigned by network control system server 40 during network connection set up. Certain data flows, such as audio and video and transmitted with multicast IP addresses rather than unicast addresses, so as to ease the overhead processing for connections with multiple participants, for example. When the connection is set up, network control system server defines a multicast group consisting of all participants in the connection, and assigns multicast IP addresses for certain data flows in the connection. These addresses are transmitted to the participants. Workstation interface saves these addresses in multicast list 790.

Each received packet is handled according to the following algorithm:

1. If it is a unicast packet, and arrives on either port, and is addressed to the workstation interface 140, keep the packet. Otherwise, forward the unicast packet out the other port.

2. If it is a broadcast packet, keep it and forward it out the other port.
3. If it is a multicast packet, compare it to a list of multicast addresses. If it matches any address on the list, keep it and forward it out the other port. If it doesn't match, forward it out the other port.

Again, it is important to note that any failure of any component in network block 250 will not result if loss of connectivity between the user workstation 100 and the existing LAN router resources 130. For this purpose, cutover relay 173 is provided, which is configured in accordance with the failure signal from power supply and system monitor block 260.

Data traffic handled by interface 770 can be intended for delivery to the workstation interface 140 itself, or intended for delivery to the user workstation 100 via workstation interface 140. Similarly, interface 760 handles data traffic originating from user workstation 100 that is intended for delivery to the existing LAN router 130, for delivery to the workstation interface 140, or for delivery to other destinations to be reached over broadband network connections. Software running in the workstation interface 140 examines each packet as it arrives on the PCI bus 290 via either interface 760 or 770 respectively connected to either communication port of the workstation interface 140, and deciding to which network or device it should be sent.

Moreover, data traffic can originate in the workstation interface 140 itself. For example, analog audio and video signals converted into data streams by audio block 210 and video block 200 can require transmission outside workstation interface 140. This class of traffic is usually intended for delivery as part of a broadband network connection, and accordingly is handled by interface 770.

An important element of the present invention is the ability of the workstation interface 140 to essentially assume the network identity and address of the associated user workstation 100, as seen by the existing LAN router 130, and to relay packets to and from the existing LAN router 130 without the workstation interface 140 appearing to the existing LAN router 130 as an intermediate router or bridge device, and thereby without requiring address or configuration changes by the manager of the existing LAN router 130. However, as will be explained in more detail in the premises switch description, when packets are directed between the workstation interface 140 or the associated user workstation 100, and broadband network destinations, premises switch 110 swaps the workstation interface or user workstation addresses of these packets with temporarily assigned network addresses. These temporary address assignments are generated by the network control system server 40 at the time a broadband network connection is being set up and are known only to the workstations, workstation interfaces and premises switches involved in the connection. The use of these temporary addresses that change on a connection-by-connection basis is new in the art and is another aspect of the present invention. This capability provides additional network security by making it difficult for someone trying to monitor the repeated communications between two parties over the broadband network to know for any particular communication what packet addresses are being used.

Figure 14:
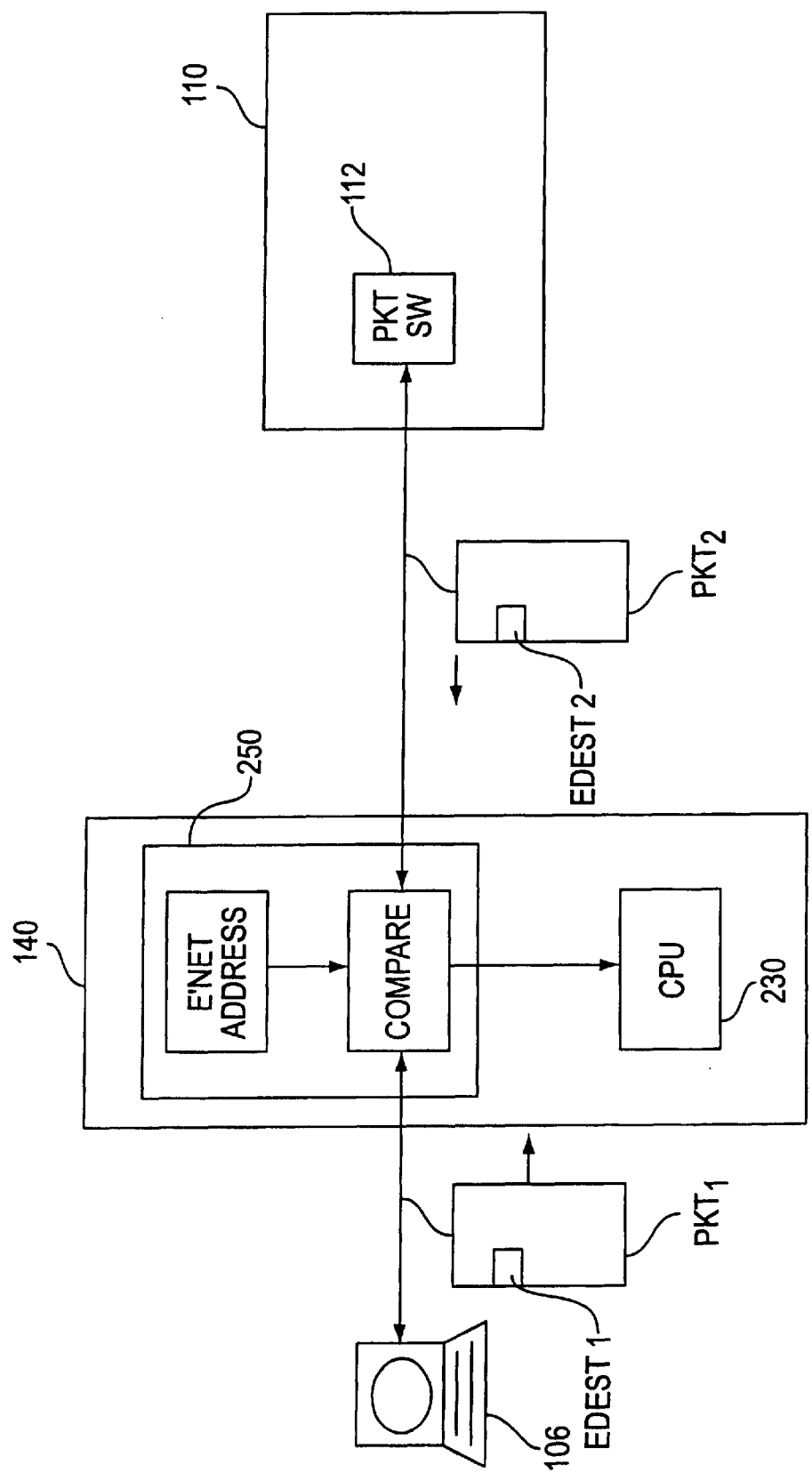
FIG. 14 illustrates the flow of LAN packet data through a workstation interface in a local node such as that illustrated in FIG. 2.

FIG. 14 illustrates the flow of local node 50 LAN data traffic associated with user workstation 100 and workstation interface 140 of local node 50. All packets for such traffic traverse workstation interface 140 at some point. For clarity, an example of the flow of unicast packets is illustrated. Handling of broadcast and multicast packets is handled according to the algorithm described above. Workstation interface 140 examines each packet pkt, and, for traffic received from user workstation 100, the destination Ethernet address Edest1 is compared against workstation interface 140's own Ethernet address. If the packet is actually addressed to the workstation interface, it is passed to the workstation interface's CPU core 230 for processing. Otherwise, the packet is forwarded to packet switch 112 of premises switch 110. Similarly, workstation interface 140 examines the destination addresses Edest2 of packets pkt, received from packet switch 112 of premises switch 110 that have been received from the network and forwarded from bonder 114. Workstation interface 140 forwards to CPU core 230 for processing such packets that are addressed specifically to the workstation interface, and forwards non-matching packets without further processing.

I.B.7. Power Supple and System Monitor Block

Figure 15:
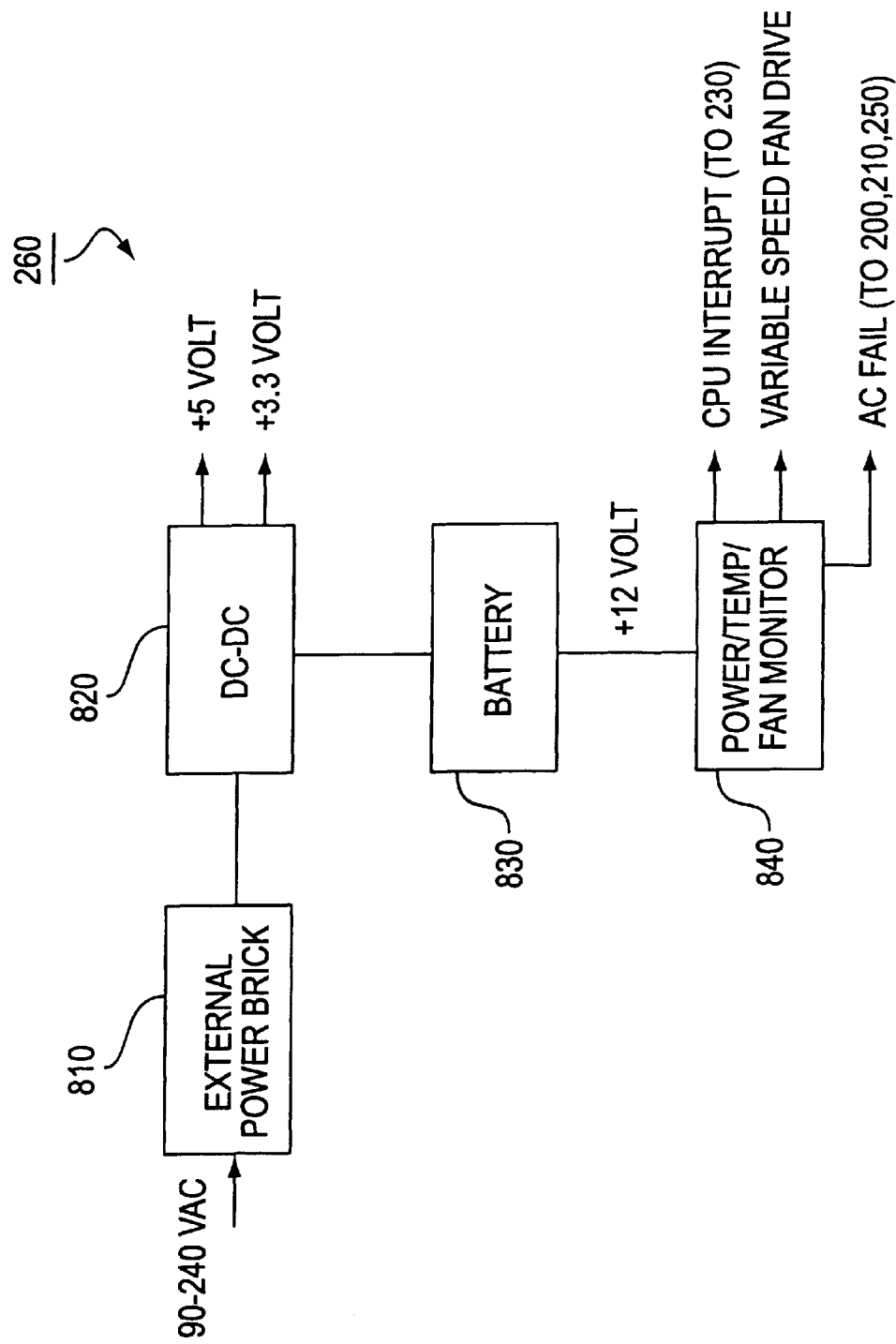
FIG. 15 illustrates a power supply and system monitor functional block in a workstation interface such as that illustrated in FIG. 6.

FIG. 15 illustrates a power supply and system monitor block 260 in accordance with the embodiment of the invention illustrated in FIG. 6. It includes an external power interface 810, a DC-DC converter 820, a battery 830, and a system monitor module 840.

External power interface 810 receives AC power from an external source (not shown), typically a 120 volt AC wall outlet, and transforms it to a 24 volt DC supply. DC-DC converter 820 receives the 24 volt DC supply output by external power interface 810 and produces regulated DC voltages such as a 5 volt DC supply and a 3.3 volt DC supply needed for operations of the various components of workstation interface 140. DC-DC converter 820 also supplies charging current to rechargeable battery 830, and receives a 12 volt DC voltage from battery 830 when AC power is not supplied by the external source. The purpose of this arrangement is so that the workstation interface 140 does not require an on/off switch. That is, by so equipping the workstation interface, it can be "rung" (like a phone) whenever needed, and network maintenance and test procedures can be invoked across the broadband network regardless of whether a user is actually using the device.

System monitor 840 monitors the status of the external power supply and battery 830, as well as other conditions such as temperature, and generates a CPU interrupt to CPU core 230 when a failure occurs. In addition to generating a CPU interrupt, system monitor 840, upon power failure or other failure of workstation interface 140, generates a failure signal so that cutover relays can be activated in other workstation interface components, thereby assuring that such failure does not adversely affect the normal operations of workstation 100.

System monitor 840 also controls operation of a fan (not shown) for cooling the system when necessary.

I.B.8. Workstation Interface Software

Figure 16:
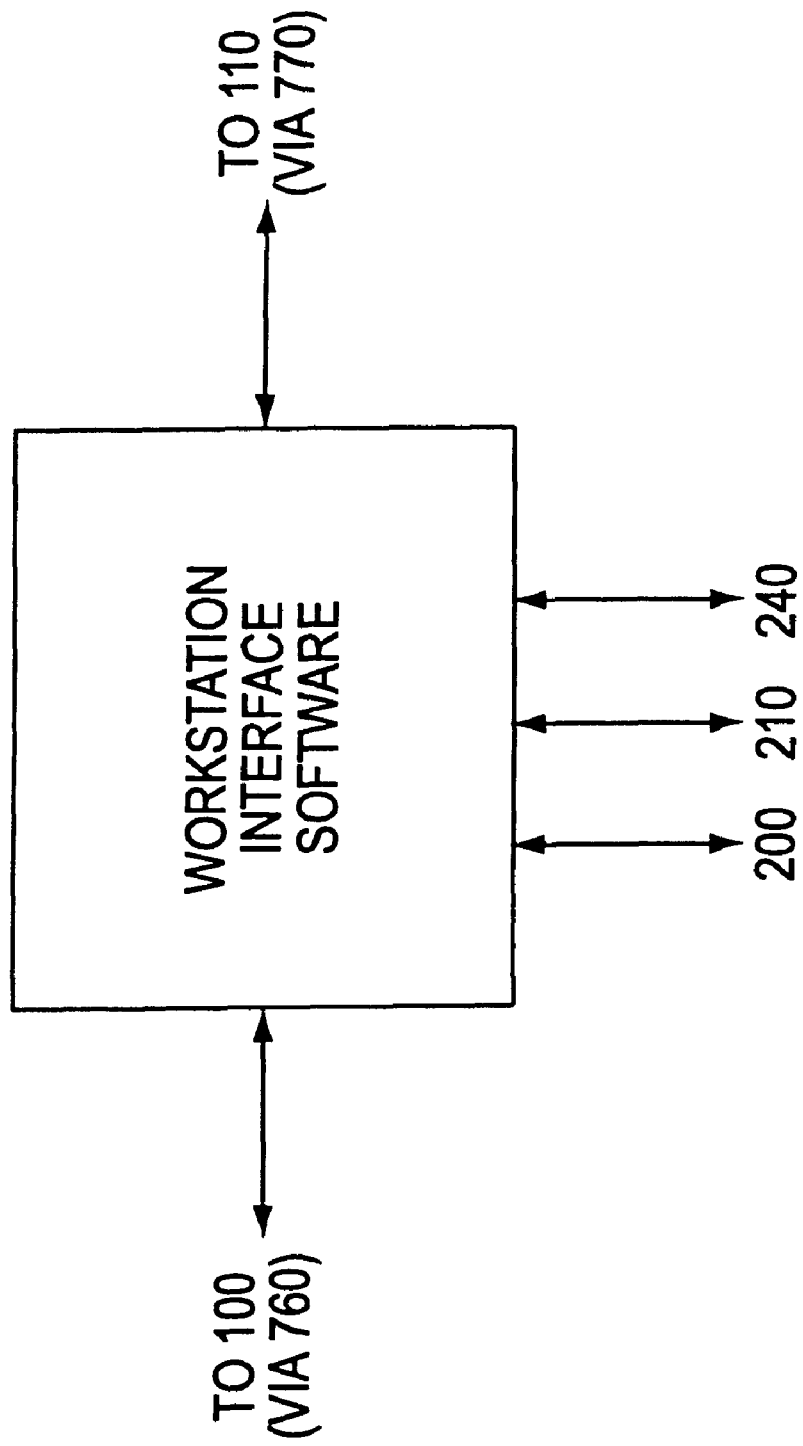
FIG. 16 is a block diagram illustrating the interfaces of the software load on a workstation interface in a local node such as that illustrated in FIG. 2.

FIG. 16 is a diagram illustrating the workstation interface software. Its main function is to coordinate the sending of broadband network connection data collected from one or more devices attached to the workstation interface via video block 200, audio block 21, and test and display I/O block 240, or devices attached to the workstation, the receiving of broadband network connection data, and the display of broadband network connection data on one or more media devices via video block 200, audio block 210, and test and display I/O block 240, or workstation 100. Some devices may have drivers that have more than one entry point. That is, a driver associated with a camera such as 154 can provide output in forms of H.261, MPEG1, MPEG2, etc., depending on the parameters supplied to the driver by the workstation interface software.

Figure 17:
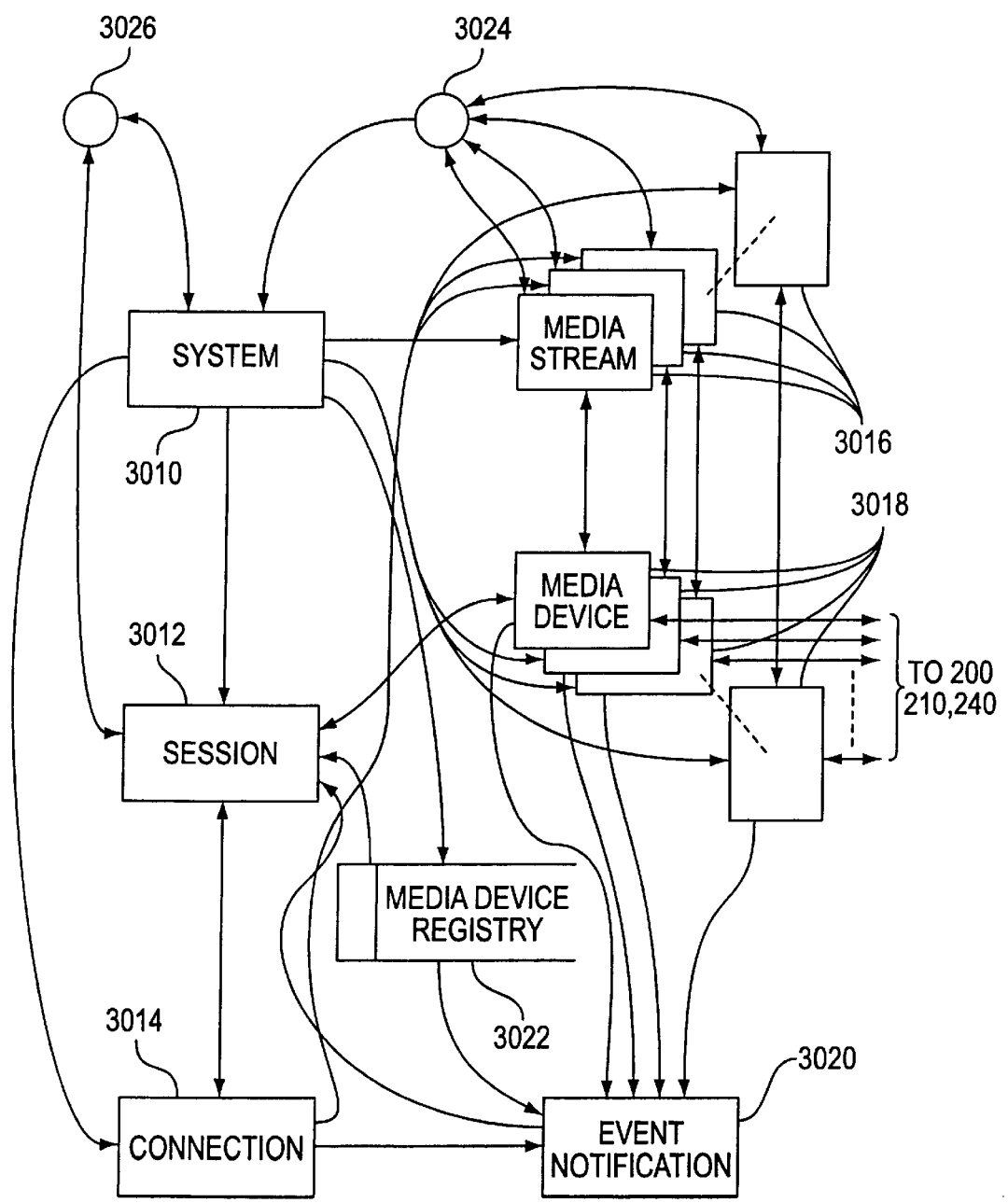
FIG. 17 is an object-level diagram of a software load of a workstation interface in a local node such as that illustrated in FIG. 2.

FIG. 17 is a block diagram of the software on the workstation interface for controlling the various connections, viewers and media streams associated with the workstation interface. The interfaces to these controls are preferably built according to object-oriented design to facilitate easy expansion to additional devices, connection types and media streams. To achieve this, the interfaces are defined in terms of objects, each derived from a single rooted hierarchy. The base class of each object preferably supports the creation of an instance of the object with no parameters and provides for a copy constructor, assignment operation and destructor. Exception handling is introduced at the base class level. The interfaces are also preferably platform independent; to support this requirement, the Java programming language is used.

As shown in FIG. 17, the architecture of the workstation interface software includes a system object 3010, a session object 3012, a connection object 3014, media stream objects 3016, media device objects 3018, and an event notification object 3020, each of which are described in more detail below.

The system object 3010 is instantiated when the workstation interface 140 is turned on and initialized. It contains functions that must be performed at start-up and shut-down, when no connection or session exists. When instantiated, the system creates and starts the event notification object 3020. It initializes the media device objects 3018 in the workstation interface and registers them in media device registry 3022. The media device registry 3022 is exposed so that event notification and session objects can be aware of them.

The system object 3010 contains functions for listening in on network traffic coming from premise switch interface 770 and for detecting connection requests via port 3024. The connection requests are based on Session Descriptor Protocol (SDP), an industry standard specification. The SDP specification focuses on the use of IP Multicast and various protocols over IP for the delivery of actual audio and video data. This specification has been modified to handle other transport and network protocols such as H.320, and ISDN as the data link and physical layer. The major modifications are to the "c=" and "m=" fields of the SDP specification. Some minor additions are also made to the "a=" field.

In SDP, the "c=" field looks like:

c=<protocol family><address type><address>[/<address modifier>]*

To support H.320 connections to ISDN or ordinary PSTN telephone numbers, two new "protocol families" are defined, "ISDN" and "PSTN". Within the protocol families, address-type discriminators delineate address spaces; e.g., in IP, the protocol family is "IN", and the Version 4 address type is "IP4"; when the Internet supports Version 6, address type "IP6" becomes available.

The <address type> field is used to discriminate between various third party networks that can be accessed through gateways. For example, an <address type> of "MCI", would mean MCI's ISDN and an <address type> of "PSTN" would mean that in theory the network is global and a broadband network could connect with one bearer channel to any telephone in the PSTN.

The <address> field is the full E.163 address of the endpoint. That is, it is the full telephone number, including country code. Thus, adestination address for a workstation interface attached to the broadband network would look like:

c=ISDN MCI+1.510.737.1500

Similarly, one for connecting to a phone using a PSTN gateway would look like c=ISDN PSTN+1.510.737.1500

The "m=" record of an SDP defines one medium which is available within the session. This looks like:

m=<media type> <media discriminator> <protocol> <format> where <mediatype> in SDP is a single medium like "audio", "video", "data", "text", or "whiteboard", <media discriminator> is usually a UDP/IP or TCP/IP port, <protocol> is the highest layer protocol required (e.g., "RTP/AVP" and "UDP" are both known values), and <format> is specific to the <protocol> and determines subformats; combinations of formats are formed by around "/" characters, and options are listed between commas. Formats are numeric, because that's what RTP expects.

Since broadband network audio/video connections represent multiplexed audio and video, SDP's single-medium approach to "audio" or "video" is inadequate. Accordingly, a new <mediatype>, "audiovideo," is defined.

The <media discriminator> is not necessary in H.320, however, the field can be useful for other information, so it is filled with the word "X". The <protocol> can be, for example, H.320 for broadband network connections and POTS for "audio" connections through PSTN gateways.

The formats are spelled out with the audio format to the left of the "/" and the video format to the right in an "audiovideo" media type, for example:

m=audiovideoxH320 g711/h261

The number of bearer channels for the connection are specified with the "b=" clause using the "AS:" class of values ("AS" refers to "application specific", the right hand side is the bit rate in Kbits, so b=768 implies 768000 bits per second).

Frame rate is already an accepted attribute of the a=field. In addition, the "x-res:" field is supported, which takes as its value "CIF" or "QCIF".

When the system object 3010 detects a connection request, it creates the connection object 3014. Following this, the system object determines from the connection request the required media stream objects 3016 and attaches them to the appropriate media device objects 3018. If these steps are successful, the session object 3012 is created.

When the system object 3010 receives a request for a broadband network connection from a user operating workstation 100, it builds a SDP-type message to request connection to that broadband network user.

Finally, the system object 3010 can perform some housekeeping tasks such as, for example, maintaining a watchdog function that pings the user workstation 100 via port 3026 to know whether the user workstation is on or off. For some connections, the preferred media device may reside on the user workstation 100, but there may be a media device residing on the workstation interface 140 that can fulfill the role required to establish the connection if the user workstation is off. For example, a phone call could ring the handset 158 rather than the user workstation's telephony device.

The session object 3012 associates together the connection, media stream and media device objects and acts as an agent to create, initialize and bind these elements together. The session object 3012 can also interface with user applications built on top of the system (not shown).

The session object 3012 responds to events generated by any of the elements in use by the session, and also notifies the signaling element if it has handled the event or not.

The session object 3012 may be typed. This allows for general session templates to be created to simplify development of workstation interface 140 applications. Session object templates for multiunit conferencing, standard POTS telephone calls, software maintenance updates (e.g., a session for transferring data to/from the workstation interface and/or the user workstation) and other types of standard arrangements can be created in session derived classes. Moreover, using the event notification object 3020 described below, a user attached to the workstation interface from a remote site could request that one or more sessions of any type be established.

The session object 3012 also creates a signaling channel over user workstation interface 760 for communicating with the software running on the user workstation 100 via port 3026 to coordinate interaction between the user workstation 100 and the workstation interface 140.

The connection object 3014 represents the control architecture for the data path over which one or more media streams 3016 are carried. It provides information on what media streams 3016 are supported by the connection, that is, what media stream types the connection can support as well as what media streams can be generated or received by the remote system at the other end of the connection.

Connection objects have various types. These types could include TCP/IP compatible socket connections, variable bandwidth synchronous data channels, multiplex asynchronous/synchronous data channels, point to point analog connections and other types of connections.

The connection object 3014 preferably provides functionality for dialing (connect to a specific network location/user), hanging up (request to disconnect), ringing (request for connection from another network location/user), signaling busy (connection refused) and signaling connected.

Connections generate events. These events can occur in relationship to the required signaling indicated above, or can indicate the addition or removal of a media stream from the connection. Connections are aware of the media streams they contain and can enumerate them to the session. They also have a reference to the session that they are a member of. Connections can only be associated with one session; however, one session can support multiple connections.

The media stream object 3016 represents the data content of the broadband network traffic associated with a connection. One or more media streams can exist on the same connection. Media streams can be unidirectional or bi-directional. Media streams have an associated data format indicator. To support the control of the media streams, each media stream has a bidirectional communications capability in addition to data communications. Through this capability, for example, media streams can provide information about one or more "suggested" media devices for the playback of their content. This capability can be expanded upon in derived classes to offer additional functionality.

Types of media streams that are preferably supported include audio, video, MIDI, T.120, H.320 and other types of data. A media stream will also be typed for the exchange of capabilities and information between various platforms and workstation interface devices. This media stream will exist for the duration of a broadband network connection established between two or more workstation interfaces and their user workstations.

As described above, media devices 3018 are attached to media streams 3016. Conversely, media streams have references back to the devices currently supplying or sinking data on the stream. Accordingly, orphaned media streams are supported, which is useful for multisession teleconferencing capabilities.

Media device objects 3018 represent the physical device capable of presenting or sourcing information on one or more media streams. These physical devices can be as simple as a standard analog phone and as complex as compound video devices, and preferably are capable of generating or presenting media streams (or in some cases both simultaneously). Hardware is treated as resources by the media device. If hardware belongs to a media device, it could be encapsulated by that media device class.

The media device object 3018 contains functionality for notifying sessions whether it is available ("ready") to be used. Some devices may support concurrent use by one or more media streams. Such devices report how many media steams (incoming and outgoing) they can support: the value of 0 indicating none, 1-N the number of supported media streams, and −1 indicating that any number can be supported. This device sharing is necessary for the purpose of transmitting video and providing a self-view at the same time, for example.

Media devices are also capable of generating events. These events are sent to all sessions that are currently associated with the device. It is up to the session to handle the event and report back to the device that the event was handled. If no session is associated with the device (or no session handles the event) then the event is forwarded to the system level event handling mechanism. The event may also be discarded if no part of the system wishes to respond to it.

The following types of media devices are preferably supported, at a minimum:

1. Standard analog phone with the ability to dial, ring, answer, hang-up, and mute. This device will generate an event to indicate ring.
2. Standard SoundBlaster (trademark of Creative Labs, Inc.) compatible device, with the ability to control microphone, line in, line out, speaker out and wave file playback.
3. Video capture device at least capable of capturing monochrome or color video. This device will be able to provide blank (black) or still frame output. It may also be capable of providing data at multiple frame rates and in multiple formats.
4. Video display device at least capable of displaying monochrome or color video. This device will be able to display data at multiple frame rates and in multiple formats. The device may also be able to alter the size of the presentation, as well as provide "freeze frame" and capture capabilities.
5. Combination audio-video device capable of both video and audio playback. Ability of the above video and audio devices can be combined into one device.
6. A control device type. At least one of these devices exists for workstation interface control. This is an abstraction of hardware and software controls used to coordinate the actions of one or more workstation interfaces. This device will be used to exchange capability information of the systems not related to any particular media device or media stream. The control device will also provide for service enhancements beyond the media driven capabilities, for example, call blocking and do not disturb features, and the implementation of a private voice and/or video mail system.

Additional media device types that may also be supported include the following:

1. Remote RS-232 port connection. This device may be useful for controlling remote cameras, control systems or any other device that can connect to an RS-232 port.
2. COM Port/Modem emulation. This is useful for applications that do not currently support the T.120 standard for application sharing, whiteboarding, file transfer and chat.

Some types of media devices can include helper classes for various viewers. For example, a helper class is needed to control the viewing and placement of video data streams on the chroma-keyed window on the user workstation screen. Such internal implementations are encapsulated within the media device and not exposed to other objects. The application communicates to the media device, and the media device communicates with the helper class as needed. This shields the external interface from exposing two different types of media devices (those with and without helper classes).

The event notification object 3020 contains functionality for responding to events. Events can be generated by devices within the user workstation 100 or by devices associated with the workstation interface 140, or by the system object. As described above, events can also be generated by sessions, connections and media streams when these objects exist. It may also be desirable to have a user object that can generate an event as well. This could be a useful mechanism for responding to events generated by software objects not represented by one of the abstractions covered here. Events generated by any item associated with a session are forwarded to that session for handling. When a session is not present, the event notification system provides for a mechanism to respond to the event.

The event notification object 3020 supports default event handling; however, for events requiring more control over functionality, the event notification object merely forwards incoming events to the appropriate destinations.

The information conveyed in an event is relatively straightforward. This includes a reference back to the element that created the event, the event content, such as a combination of a coded value and ASCII string, and an urgency code. The event class can provide indications of such events as:

1. An audio device generates an overload indication by providing a coded value that indicates level overload and a NULL string.
2. A media stream provides notification of a temporary suspension of transmission by providing the appropriate code and the ASCH string "Please stand by . . . "

Although the workstation interface software can reside only on the workstation interface, it should be apparent that some functionality may be duplicated on workstation 100, with interprocess communication established via TCP/IP.

The operation of the workstation interface software will now be described.

When workstation interface 140 is initially turned on, an installer configures it with the premise switch 110's Ethernet address, as well as the IP address of the signaling network 30, and the IP address of Internet access provided by the broadband network.

The sequence of software events in workstation interface turn-on are as follows:

1. Workstation interface 140 is turned on and initialized.
2. The system object 3010 is created and initialized.
3. The event notification thread 3020 is created and started.
4. The media devices resident on the workstation interface are determined, and corresponding media device objects 3018 are created and initialized.
5. The media devices are registered in media device registry 3022.
6. The media device registry 3022 is made available to the event notification object 3020.

The sequence of events in user workstation 100 turn-on are as follows:

1. User workstation 100 is turned on and daemon process 3104 is initialized.
2. Media devices resident on the user workstation 100 are determined and corresponding media device objects 3018 are created and initialized.
3. User workstation 100/workstation interface 140 hybrid media devices 3018 creation is attempted. These are implemented as distributed devices with some parts local to the user workstation 100 and some parts local to the workstation interface 140.
4. The media devices are registered in media device registry 3022.
5. The media. devices registry 3022 is made available to the event notification object 3020.

The steps performed by workstation interface software to place a broadband network connection are as follows:

1. A connection request is received from workstation 100.
2. System object 3010 builds an SDP request. In a POTS call, for example, this is just the phone number.
3. System object 3010 creates connection object 3014.
4. System object 3010 creates media streams objects 3016 needed for the connection.
5. System object 3010 attaches corresponding media devices 3018 M5 to media streams 3016.
6. System object 3010 adds media streams 3016 to connection object 3014.
7. If the above steps are successful, system object 3010 creates session object 3012.
8. Session object 3012 starts media streams 3016.
9. Session object 3012 and system object 3010 process events forwarded by event notification object 3020.
10. When the connection is ended, session object 3012 shuts down all connection objects 3014.

The sequence of events in receiving an incoming broadband network connection are as follows:

1. System object 3010 detects an incoming connection.
2. System object 3010 realizes that a connection has been requested.
3. System object 3010 accepts the connection and creates connection object 3014.
4. System object 3010 creates media streams 3016 corresponding to resources requested for the connection.
5. System object 3010 attaches media devices 3018 to media streams 3016.
6. System object 3010 adds media streams 3016 to connection object 3014.
7. System object 3010 creates session object 3012.
8. Session object 3012 starts media stream 3016 in response to a media stream started from caller.
9. Ring workstation 100.
10. System object 3010 and session object 3012 process events forwarded by event notification object 3020.
11. When the connection is ended, session object 3012 shuts down all connections 3014.

Figure 18:
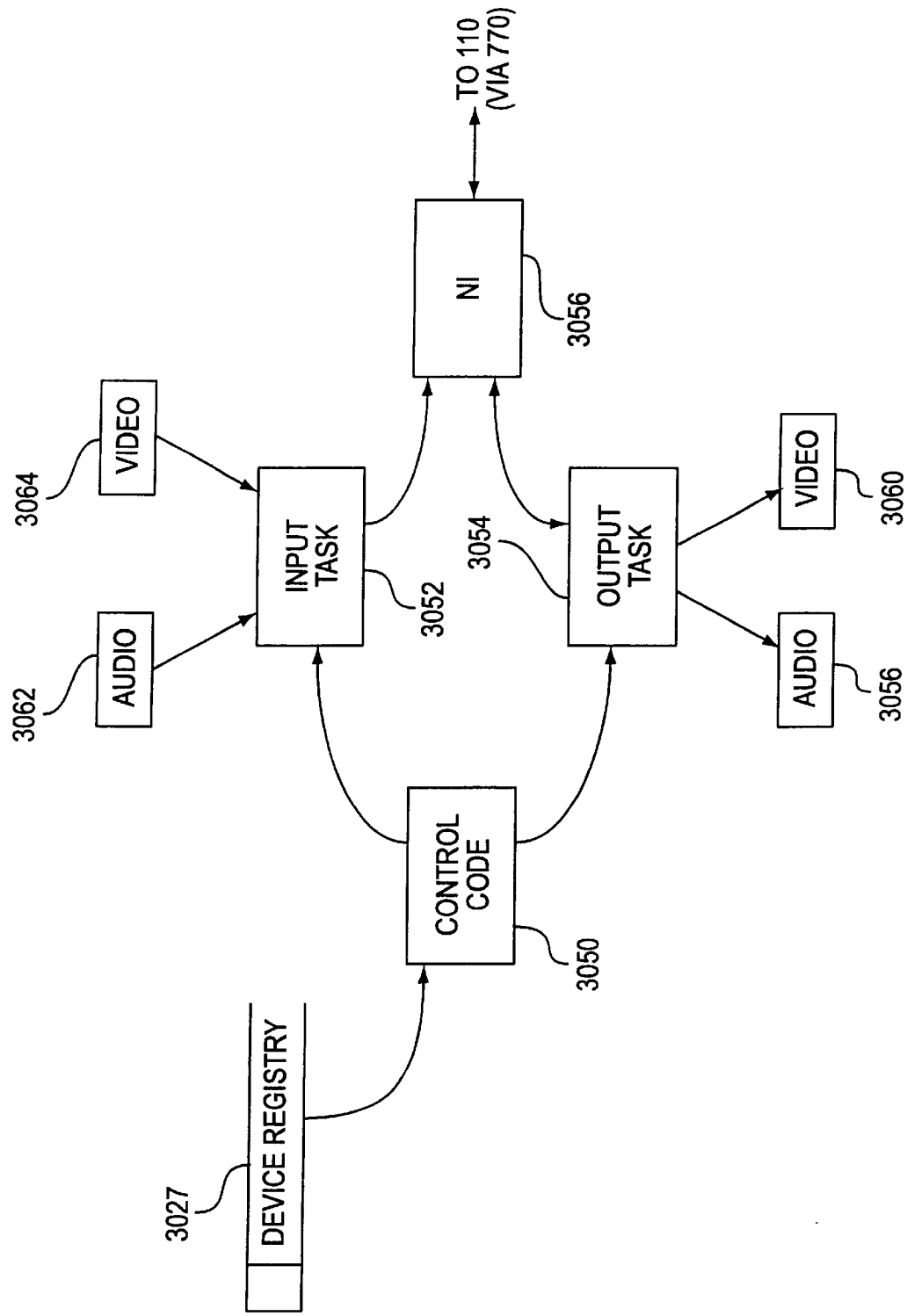
FIG. 18 is a block diagram illustrating the operation of workstation interface software such as that illustrated in FIG. 16 for processing broadband network connection data.

FIG. 18 further illustrates the operation of workstation interface software to process data during a broadband network connection.

When the connection is set-up, and the number and types of media streams that are required during the connection are identified, control code 3050 spawns input and output tasks 3052 and 3054, respectively, to handle each synchronized stream. A synchronized stream can consist of any type of multiple stream that is desirably time aligned. For example, an audio stream and a video stream should be time-aligned during a videoconference.to insure lip synching. Since these two streams are independently generated and presented, processing is required to time-align them. Input and output tasks 3052 and 3054 perform this function.

Network interface function 3056 performs the task of sending and receiving data from the premises switch 110 via network interface 770 in accordance with TCP/IP protocol, for example.

During the broadband network connection, accordingly, network interface 3056 receives audio and video data from premises switch 110 and forwards them to output task 3054. Output task 3054 converts them to audio and video streams and time-aligns them according to their packet time stamps before outputting them to audio and video stream devices 3058 and 3060, respectively. Meanwhile, input task 3052 receives audio and video streams from audio and video stream devices 3062 and 3064, respectively, and time-aligns them before packetizing them and time-stamping the packets for transmission to the premises switch via network interface function 3056.

I.C. Premises Switch

Figure 19:
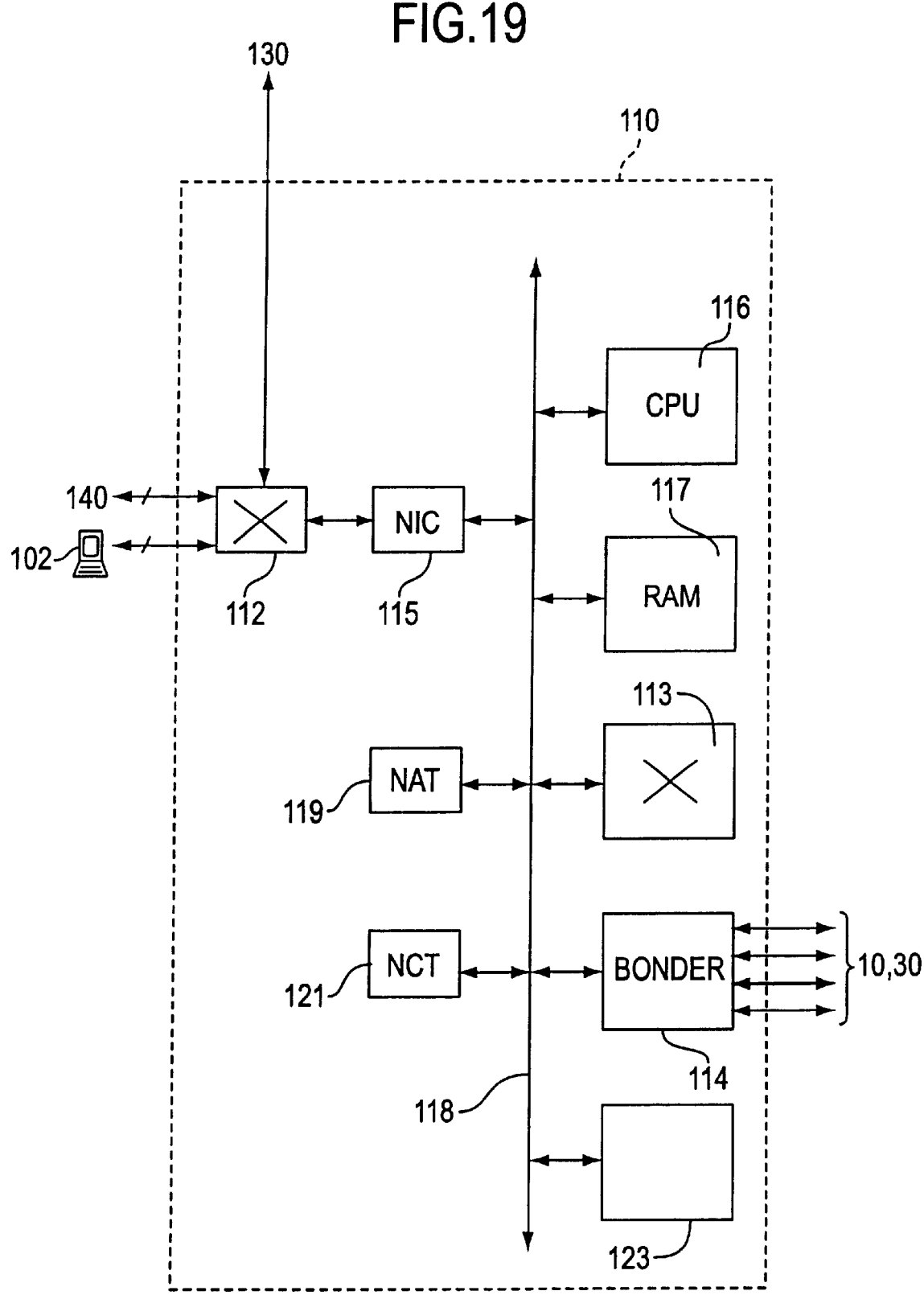
FIG. 19 illustrates an embodiment of a premises switch in a local node such as that illustrated in FIG. 2.

A typical premises switch configuration in accordance with the embodiment of the invention illustrated in FIG. 2 is illustrated in further detail in FIG. 19. As shown in FIG. 19, premises switch 110 includes a routing function 113, bonder 114, network interface card 115, CPU 116, RAM 117, ID network address translation function 119, network command translation function 121, and bonding function 123 that communicate via bus 118. Packet switch 112 communicates with network interface card 115 via an Ethernet link.

Packet switch 112 receives LAN packet traffic from workstation interfaces 140 and (optionally) from other LAN workstations 102 not served by the broadband network. By reading their destination Ethernet addresses, packet switch 112 passes packets not associated with broadband network connections through to the existing LAN router 130, while packets associated with broadband network connections are routed via routing function 113 to bonder 114 for transmission to city node 10 or, if the broadband network connection is between two or more local users, directly to the addressed workstation interfaces 140. Likewise, LAN traffic from existing LAN router 130 is dispatched via packet switch 112 to workstation interfaces 140 and through the workstation interfaces to workstations 100. Those skilled in the art will appreciate that packet switch 112 can be implemented in many known ways, and such a design choice is incidental to this invention. Preferably, however, packet switch 112 is an EtherSwitch SuperStack model 1000 made by 3Com, Inc. of San Jose, Calif. or similar device that supports IGMP.

Although such switches are common in the art, the manner in which packet switch 112 is used in the present invention provides transparent-to-the-LAN broadband network connections to wide area broadband networks, as will be described in more detail below. This use of the combination of an Ethernet switch, the dual MAC and IP addressing functions of the workstation interface 140, and the specialized routing, switching, and address translation functions of the premises switch 110 and the network control system server 40 provide a network capability that is new in the art.

CPU 116 controls the operations of routing function 113, bonder 114, network interface card 115 and RAM 117. It coordinates the conversion of circuit-switched traffic data on broadband network connections, possibly spread between many bearer channels, into LAN type packet-switched data packets, and vice-versa. It should be noted that CPU 116 and bus 118 can be implemented in many ways. A preferred implementation of CPU 116, for ease of maintenance and low cost, is a CPU capable of running a Unix-like operating system. A multi-processor version can be used to insure adequate computer power for larger installations. A number of major semiconductor companies make such devices, and x86 family devices are currently the most cost-effective. For reason of low cost, the preferred implementation of bus 118 is a Peripheral Component Interconnect (PCI) bus.

Network interface card 115 is a standard PCI Ethernet card for transmitting and receiving LAN data packets to/from workstation interfaces 140 via packet switch 112.

Routing function 113 is shown separately for clarity, but may be implemented as software running on CPU 116 or other processor. It is responsible for screening data packets received via packet switch 112 and directing them to the appropriate output port of bonder 114. It also performs security functions that provide additional safeguards against unauthorized use of the broadband network by, for example, further screening the destination and source addresses of the packets.

Bonder 114 receives broadband network connection data from workstation interfaces 140 via packet switch 112 and transmits the data to city node 10. Conversely, broadband network traffic data is received from city node 10 and bonder 114 relays the traffic data to workstation interfaces 140 via packet switch 112.

Network address translation function 119 is shown separately for clarity, but may be implemented as software running on CPU 116 or other processor. It is responsible for performing address translation of data packets received from workstation, interfaces 140 via packet switch 112 for forwarding on the broadband network and for performing address translation of data packets received over the broadband network via bonder 114 and destined for workstation interfaces 140 and workstations 100.

Network command translation function 121 is shown separately for clarity, but may be implemented as software running on CPU 116 or other processor. It is responsible for translating and handling network commands received over the signaling network 30 via bonder 114.

Bonding function 123 is shown separately for clarity, but may be implemented as software running on CPU 116 or other processor. It is responsible for maintaining a list of ports that are used for different broadband network connections, including signaling network traffic, circuit-switched traffic, and Internet access. A port can consist of one or more bearer channels 60. For example, a 6 Mbps circuit-switched connection can consist of 96 bearer channels, not necessarily multiplexed on the same T1 lines. The port for this connection is configured as a list of these channels, over which bonder 114 relays broadband data destined for and arriving from the broadband network and city node 10. This list can be updated in accordance with channel reassignments ordered by the network control system server 40.

It should be apparent from the above descriptions, and even more apparent from the descriptions that follow, that the installation of premises switch 110 in the existing local area network of local node 50 is totally transparent to the LAN router 130 and other workstations operating on the LAN 120. Moreover, the process of installing premises switch 110 merely requires splicing into the connections of workstations 100 to LAN router 130.

I.C.1. Bonder Configuration

Figure 20:
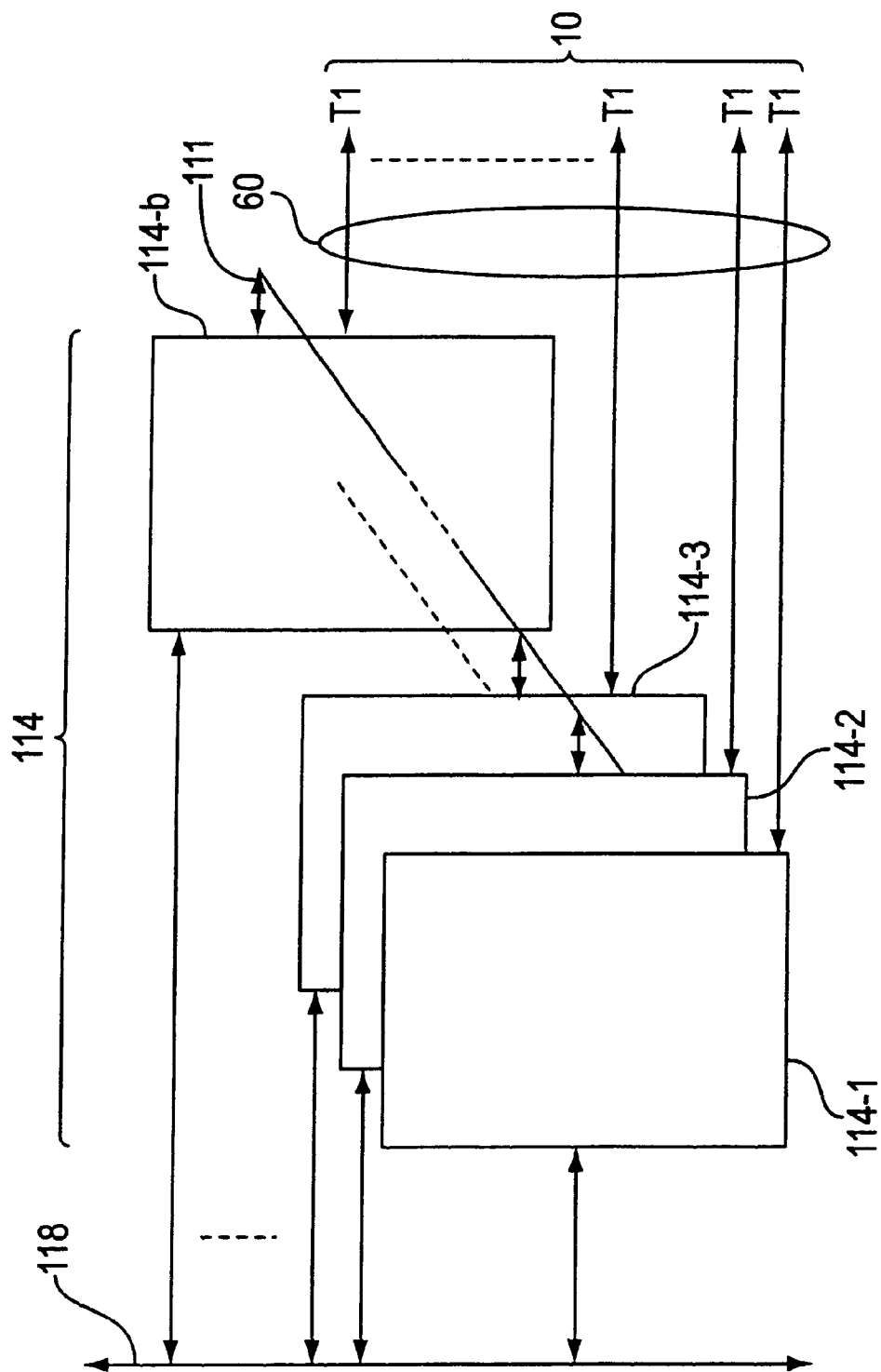
FIG. 20 illustrates an embodiment of a bearer channel bonder in such a premises switch as that illustrated in FIG. 19.

A typical bonder is illustrated in FIG. 20. As can be seen, it can include bonder modules 114-1 to 114-b. Each bonder module handles communications between PCI bus 118 and one T1 line connected to city node 10. As is well known, a T1 line multiplexes 24 64 kbps bearer channels onto a single physical connection. The total number of bearer channels 60 provided in this example of the invention is therefore 24 times the number of T1 lines provided between the premises switch of the local node and the city node 10. The bonder further includes a PCM highway 111 among which serial data is time-division multiplexed (TDM) between each bonder module. This is to provide flexibility and redundancy. Although an important task of bonder 114 is to transfer data between the packet switch 112 and the broadband network, it is occasionally desirable to interface to other systems such as, for example, a voice-telephony network such as a PBX. The preferred method of such interconnect is a TDM highway. Redundancy is provided in that, should one of the T1 lines go out of service, the traffic can be re-assigned over the TDM highway to bearer channels on another T1 circuit.

Preferably, PCM highway 111 employs Multi-Vendor Integration Protocol (MVIP) and has a capacity of at least 96 full-duplex 64 kbps channels. It should be noted that the preferred embodiment described herein is based on the use of T1 multiplexing, however it would be equally feasible for those familiar with the art to use E1 multiplexing standards popular in Europe and other countries. It is equally feasible to connect directly to any other type of telephony trunk facility, such as DS-3, OC-1 or others.

Figure 21:
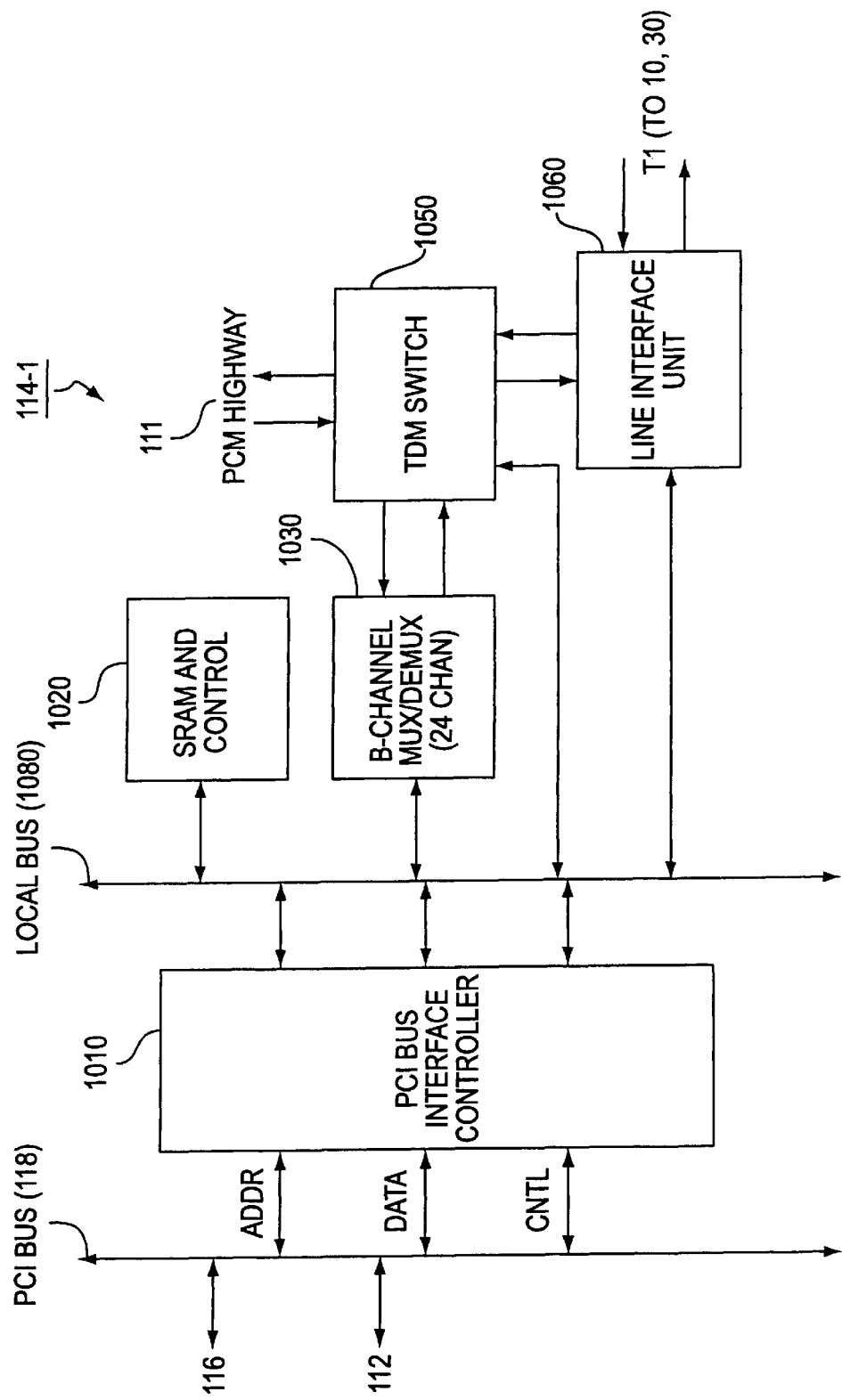
FIG. 21 is a top-level functional block diagram of a bonder module in a bearer channel bonder such as that illustrated in FIG. 20.
Figure 22:
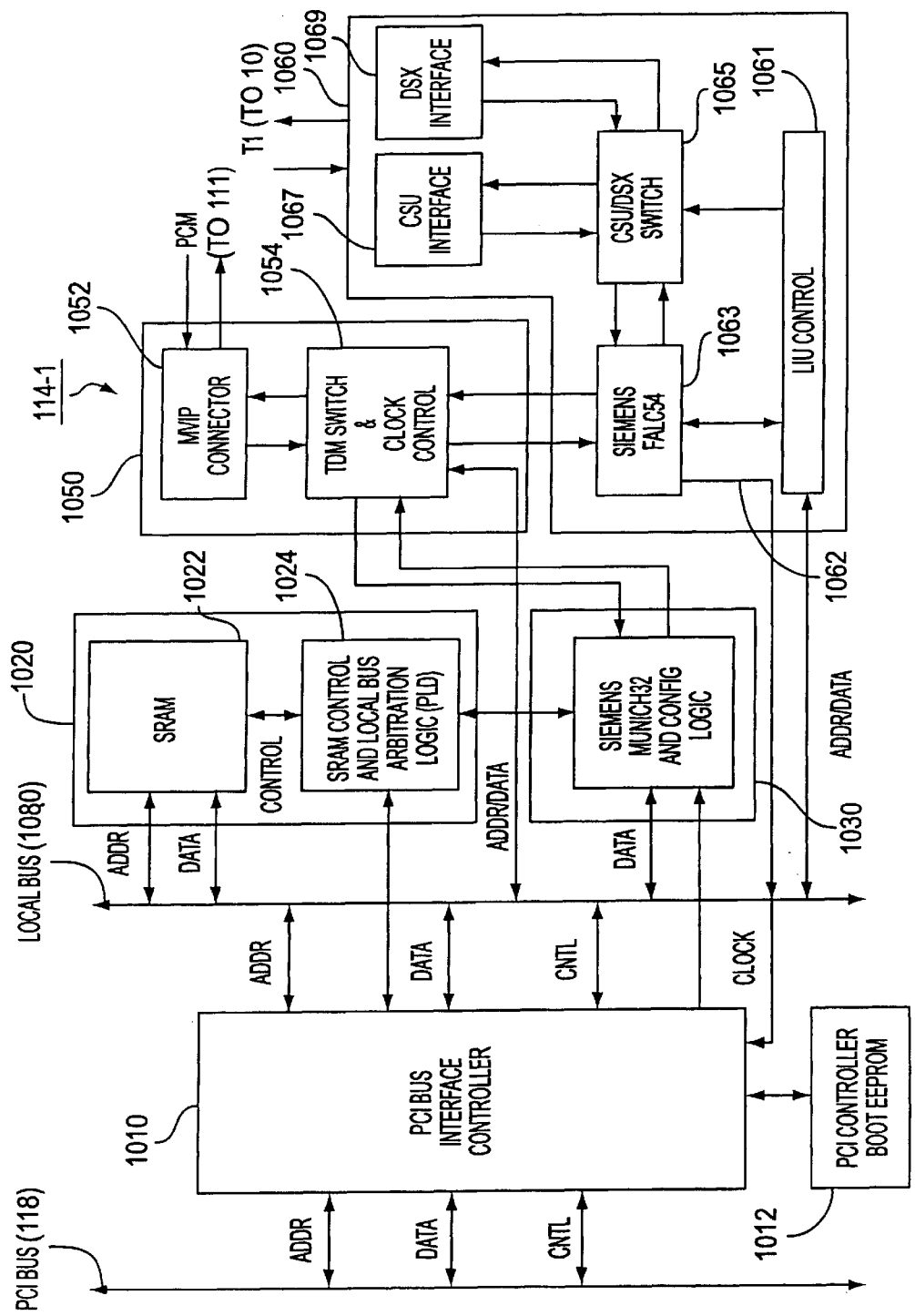
FIG. 22 further illustrates a bonder module such as that illustrated in FIG. 21.

FIGS. 21 and 22 further illustrate a typical bonder module such as 114-1 in a premises switch 110 such as that illustrated in FIG. 19. As can be seen, it includes a PCI bus interface 1010 that arbitrates communications between local bus 1080 and CPU 116 and packet switch 112 via PCI bus 118. It further includes SRAM and control module 1020, a B-channel mux/demux module 1030, a TDM switch 1050, and a line interface unit 1060.

As shown in FIG. 22, bonder module 114-1 further includes a PCI controller boot EEPROM 1012 for storing firmware that enables PCI bus operations upon system startup. SRAM and control module 1020 includes a SRAM module 1022 and a SRAM control and local bus arbitration logic (PLD) module 1024. TDM switch 1050 includes highway connector 1052 and TDM switch & clock controller 1054. Line interface unit 1060 includes LIU controller 1061, frame controller 1063, CSU/DSX switch 1065. CSX interface 1067 and DSX interface 1069 are standard interfaces for T1 circuits well known in the art. Frame controller 1063 generates frame synchronization clocks 1062 for use by other bonder components. Interfaces 1067 and 1069 directly interface the premises switch 110 with the T1 line connected to the city node.

In a receiving operation, framed broadband network connection traffic data is received through line interface unit 1060 via CSU or DSX interfaces 1067 and 1069, as controlled by CSU/DSX switch 1065. Under control of LIU controller 1061, framed network connection data is serially received through frame controller 1063 from TDM switch module 1050. TDM switch module 1050 handles the time division multiplexing of network connection data on PCM highway 111. B-channel mux/demux 1030 receives network connection data from PCM highway 111 and converts between the serial data of individual bearer channels and buffered LAN data. SRAM and control module 1020 buffers broadband network traffic data from the LAN as it is de-fragmented by CPU 116 and mux/demux 1030. PCI bus interface controller 1010 arbitrates the flow of data between the bonder components and the PCI bus of the premises switch 110. The reassembled data is packetized for transmission by CPU 116 with information provided by bonding function 123, and sent to appropriate destination by network address translation function 119 and routing function 113.

Conversely, in a sending operation, LAN data packets destined for the broadband network are routed to bonder 114 by routing function 113. Information from bonding function 123 is used to determine on what bearer channel or channels the data is to be transmitted. The data packets for transmission are supplied to bonder 114 via PCI bus 118. PCI bus interface controller 1010 arbitrates the flow of data between the bonder components and the PCI bus of the premises switch 110. SRAM and control module 1020 buffers broadband network data from the LAN as it is fragmented by CPU 116 and mux/demux 1030. B-channel mux/demux 1030 thus converts the buffered LAN data into serial data for transmission on the assigned individual bearer channels and sends the data to PCM highway 111. TDM switch module 1050 handles the time division multiplexing of network the data on PCM highway 111. Under control of LIU controller 1061, framed network connection data is serially sent through frame controller 1063 from TDM switch module 1050, and the framed broadband network data is transmitted through line interface unit 1060 via CSU or DSX interfaces 1067 and 1069, as controlled by CSU/DSX switch 1065.

As will be explained in more detail below, before any packets are transmitted over a switched circuit broadband network connection, routing function 113 compares their source MAC addresses with information provided to the premises switch at the time the switched circuit connection is set up by the network control system server. Should the arriving packet not be from a user workstation or workstation interface that is authorized to send traffic on the specific broadband network switched connection, the packet is discarded by the premises switch.

Moreover, it should be noted that when sending data to the LIU (which came from the LAN via PCI bus 118), mux/demux 1030 and CPU 116 together preferably fragment the data received from workstations or workstation interfaces, which are typically large, into smaller pieces, so that transmission of each piece can occur simultaneously, and therefore more quickly. That is, the outgoing network data is fragmented among the assigned bearer channels for that connection (as maintained by bonding function 123). For example, a 1500-byte Ethernet packet is split up into ten 150-byte fragments and multiplexed among ten bearer channels, assuming that the number of bearer channels assigned for the connection is ten. Alternatively to this linear division of bandwidth, a load-balancing algorithm can be used to divide the data. Each fragment is sent via a separate path within TDM switch 1050 to the LIU. When receiving data from the LIU, mux/demux 1030 assembles the fragments back into a large block, for transmission on the LAN.

To further illustrate the above processing, upon initiation of a network connection, network control system server 40 determines the amount of bandwidth required and assigns bearer channels to the user workstation 100 establishing/ receiving a broadband network connection. Preferably, the number of bearer channels is linearly related to the total bandwidth required. That is, for example, a 1 Mbps connection requires 16 bearer channels, while a 6 Mbps connection requires 96 bearer channels (each having a capacity of 64 kbps). The assigned bearer channels are kept in a list and associated with a port by bonding function 123 so data packets relayed over the broadband network are properly routed between the broadband network and user workstations 100 and workstation interfaces 140 by routing function 113 and bonder 114.

Framed broadband network connection traffic data relating to the connection is received over the assigned bearer channels for that connection (possibly spread over many T1 lines) via city node 10. Line interface unit 1060 associated with each T1 line de-frames the data (formatted according to primary rate interface (PRI) standards, for example) and supplies it to TDM switch 1054. CPU 116 controls the time slot channels (preferably, one time slot channel per bearer channel) in which each TDM switch 1054 of each of the bonder modules associated with the designated T1 lines places the data on PCM highway 111 and also controls the de-muxing of the individual channels via B-channel mux/demux 1030 and buffering of the data in SRAM module 1020 of each associated bonder module 114. CPU 116 formats the buffered data into LAN packets for transmission through packet switch 112 to the appropriate workstation interface 140, and/or on through to user workstation 100 (depending on the addresses assigned to the packets). Packets are forwarded from bonder module 114 to packet switch 112 with the Ethernet destination address placed on the packets by network address translation function 119. Packet switch 112 then forwards the packets to the appropriate workstation interface 140. The workstation interface examines the destination address on each packet and either consumes the packet itself or forwards the packet to its associated user workstation 100. The converse operation takes place for broadband network traffic data sent from a user workstation 100 or a workstation interface 140.

I.C.2. Bonder PCI Bus Interface Controller

Figure 23:
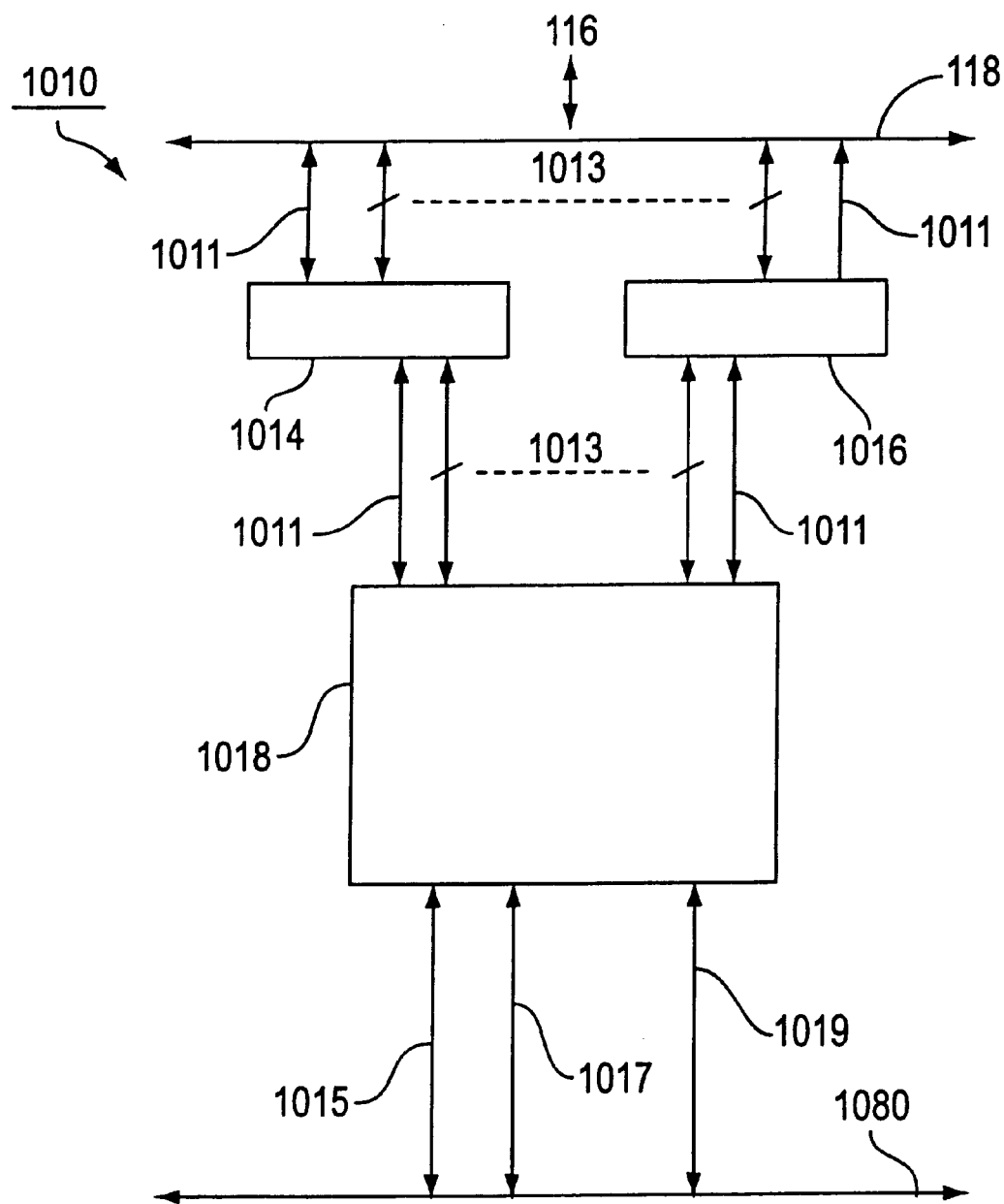
FIG. 23 illustrates a PCI bus interface controller in a bonder module such as that illustrated in FIG. 21.

FIG. 23 illustrates a PCI bus interface controller 1010 in a bonder module such as that illustrated in FIG. 21. It includes bus connectors 1014 and 1016 that communicate PCI bus addresses/data 1013 and control information 1011 between CPU 116 and PCI bus controller 1018 via PCI bus 118. PCI bus controller arbitrates the flow of local bus address 1015, data 1017 and control information 1019 along local bus 1080.

Figure 24A:
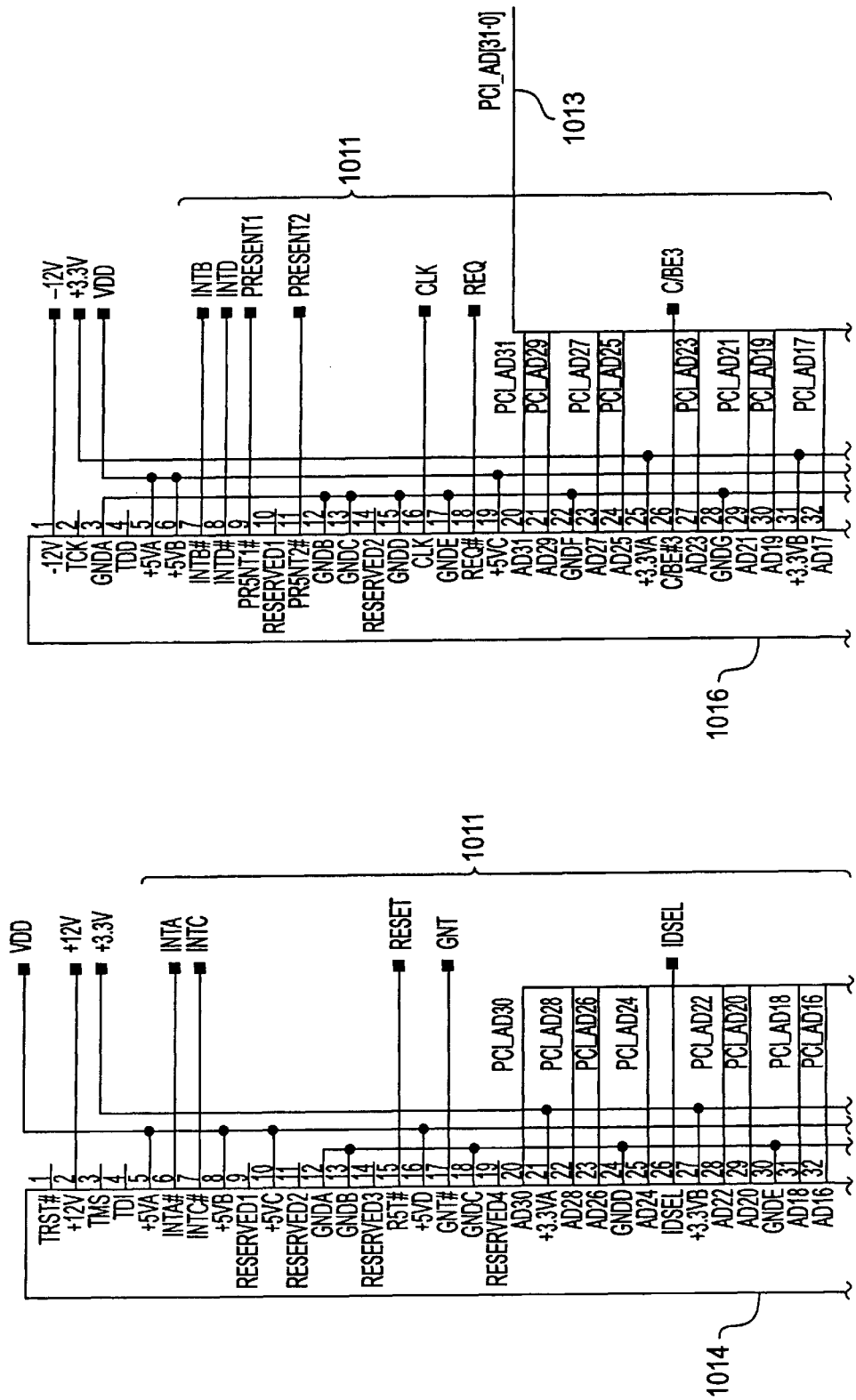
FIG. 24 illustrates a PCI bus connector in a PCI bus interface controller such as that illustrated in FIG. 23.
Figure 24B:
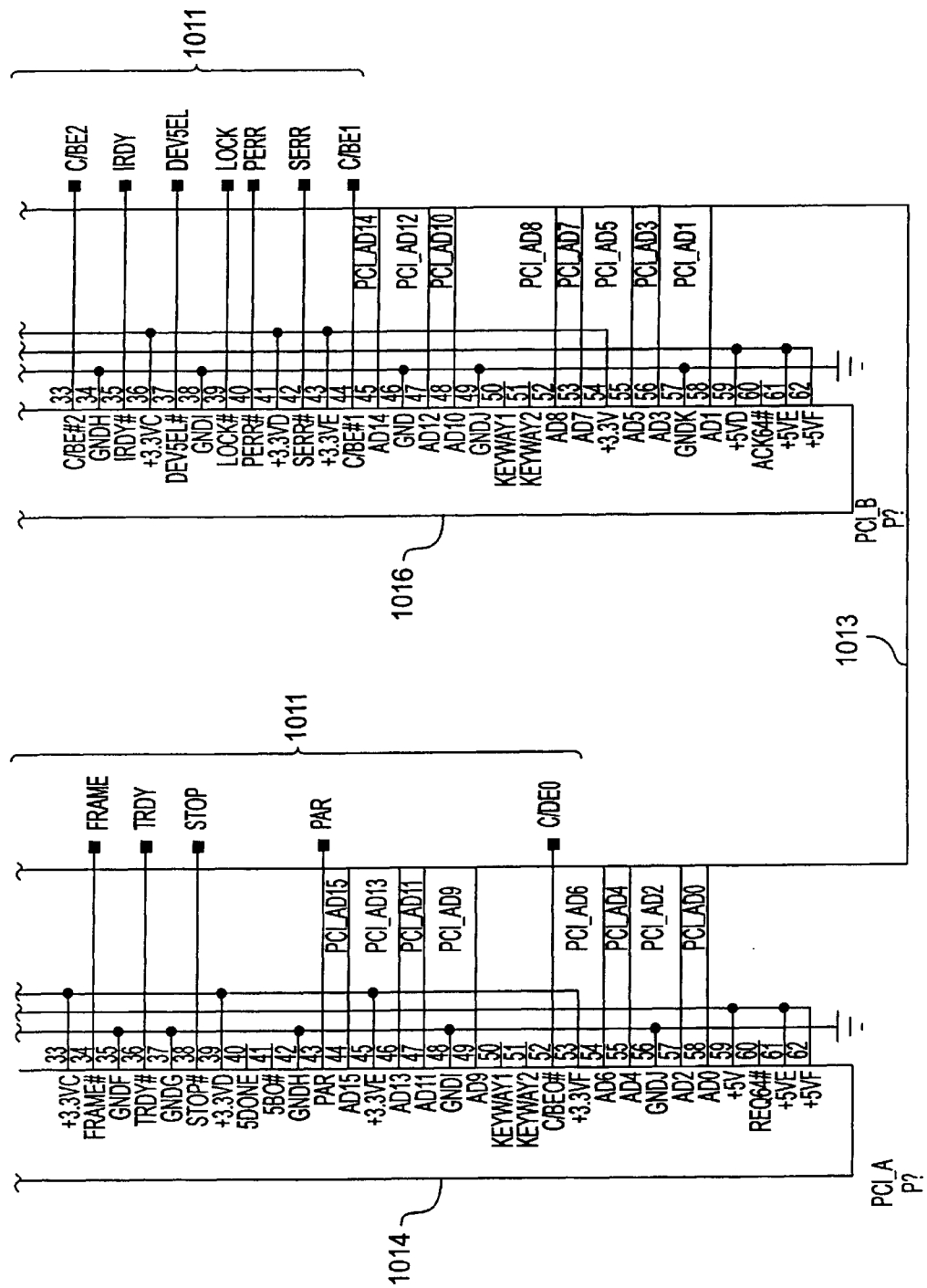

FIG. 24 illustrates bus connectors 1014 and 1016 in a PCI bus interface controller 1010 such as that illustrated in FIG. 23. The connectors together transmit./receive 32 bits (PCI_AD[31 . . . 0]) of address/data information 1013 via PCI bus 118. They also provide for an exchange of control signal information between the bonder components and CPU 116. The signals and protocols are according to the well-known PCI standards.

Figure 25A:
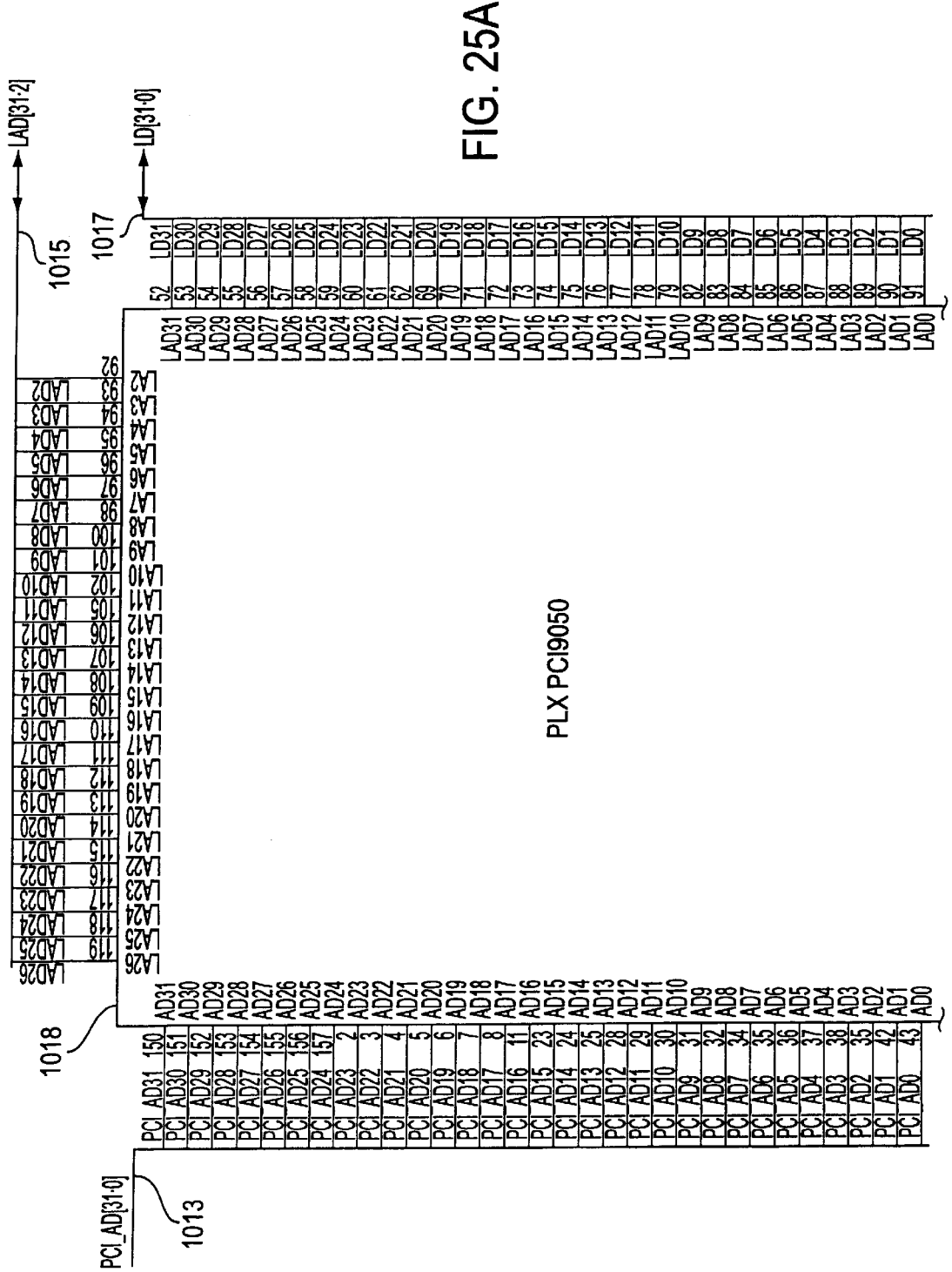
FIG. 25 illustrates a PCI bus controller in a PCI bus interface controller such as that illustrated in FIG. 23.
Figure 25B:
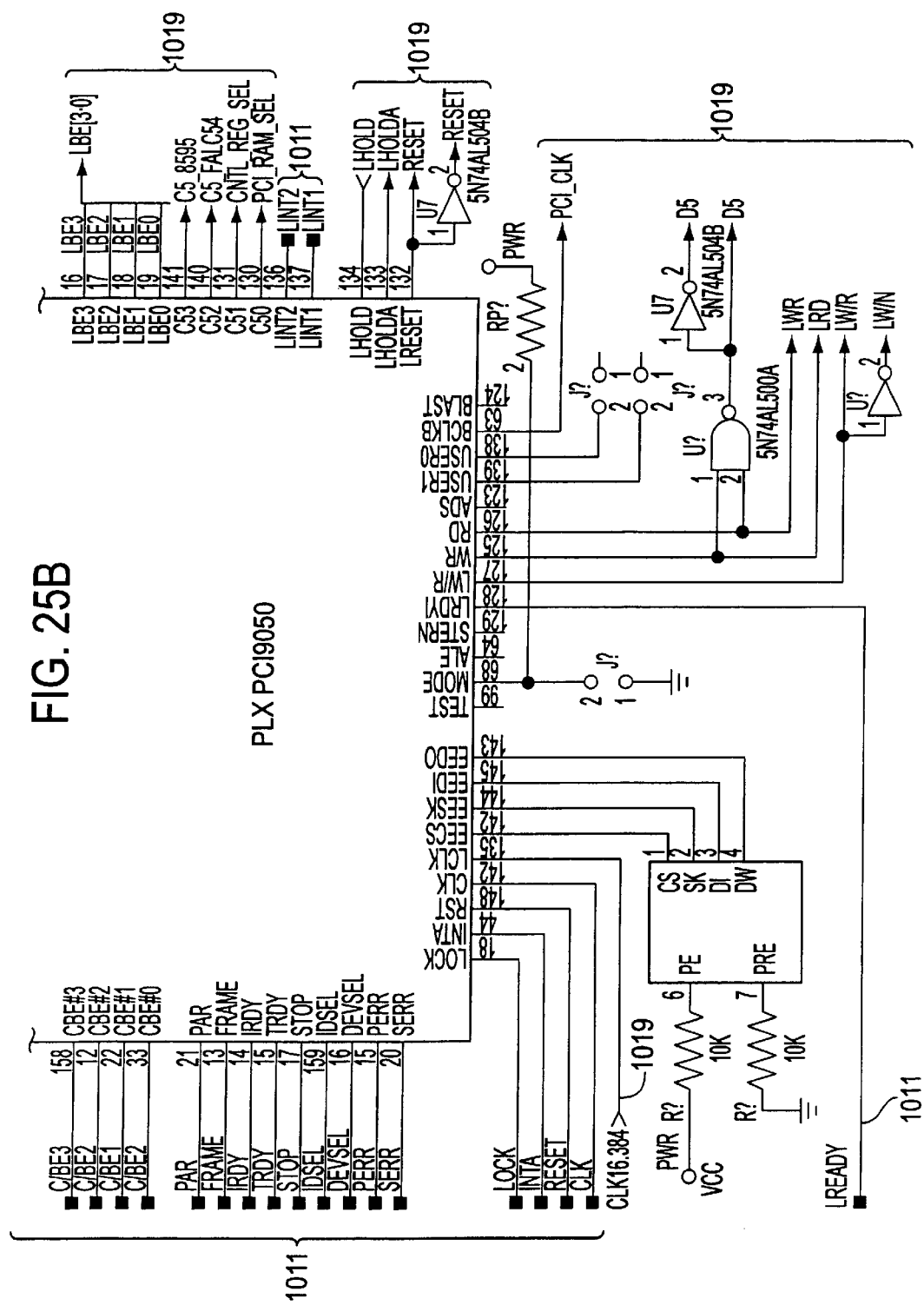

FIG. 25 illustrates a PCI bus controller 1018 in a PCI bus interface controller 1010 such as that illustrated in FIG. 23. It receives/transmits PCI bus addresses 1013 and control information 1011. It also transmits/receives local bus address 1015, data 1017 and control information 1019.

Figure 26:
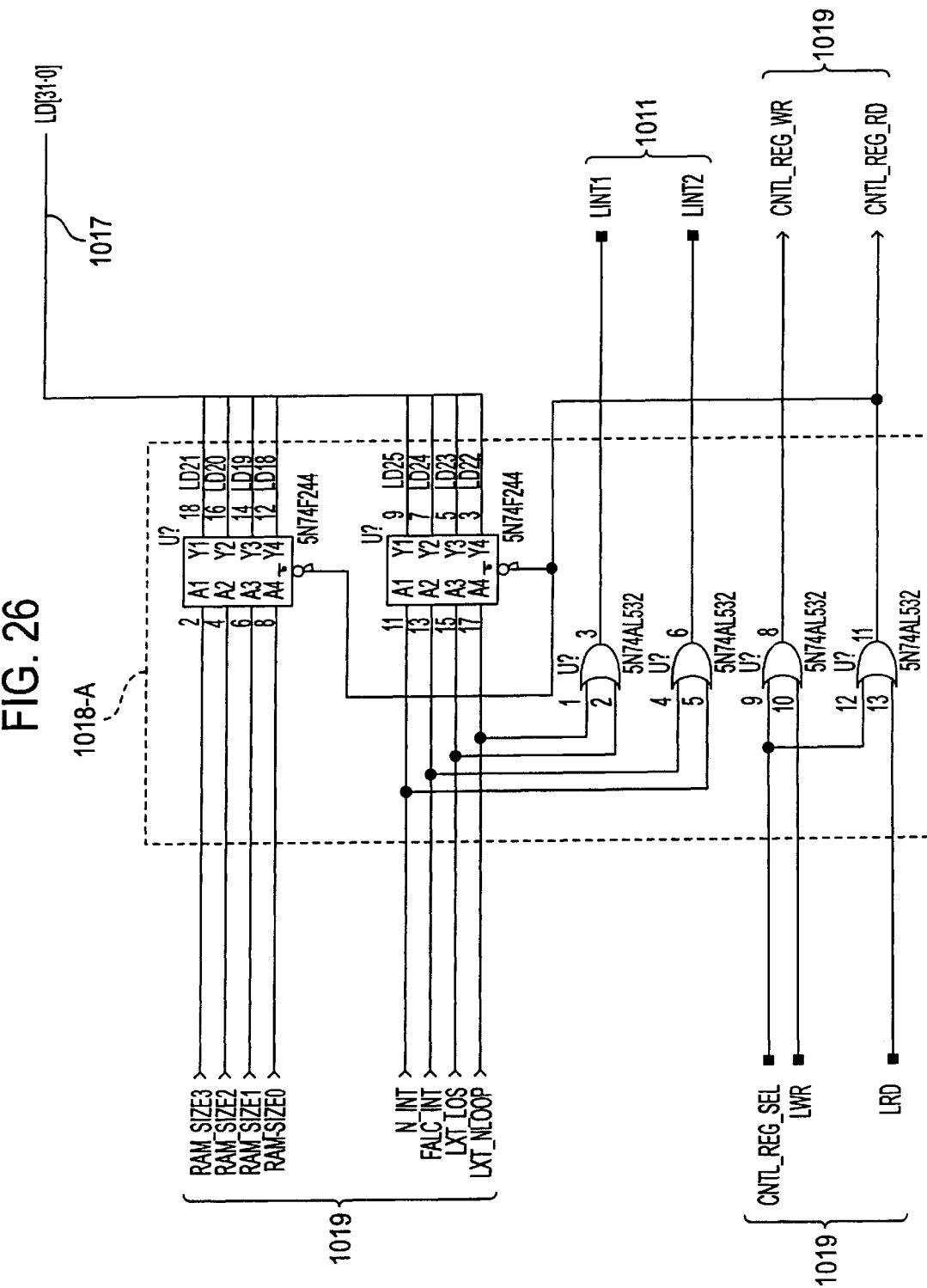
FIG. 26 further illustrates a PCI bus controller in a PCI bus interface controller such as that illustrated in FIG. 23.

FIG. 26 further illustrates a PCI bus controller 1018 in a bus interface controller 1010 such as that illustrated in FIG. 23. In this example, PCI bus controller 1018 is primarily implemented by a PCI 9050 manufactured by PLX Technology, Inc. of. San Jose, Calif. As can be seen, it further includes logic circuitry 1018-A, that is responsive to PCI bus control signals 1011 that select a control register read/write operation, to provide control data corresponding to the control registers on local data bus 1017. Refer to PCI specification version 2.1 for a complete description of this bus. As is known, the PCI controller is programmed at startup by PCI boot controller 1012. This tells the PCI controller which bus addresses the CPU will use when it wishes to access devices on the PCI bus. The PCI controller will, when it detects such addresses, generate control signals to select (or activate) the chosen device, and to indicate whether a read or a write is to be performed.

I.C.3. Bonder SRAM and Control Module

Figure 27:
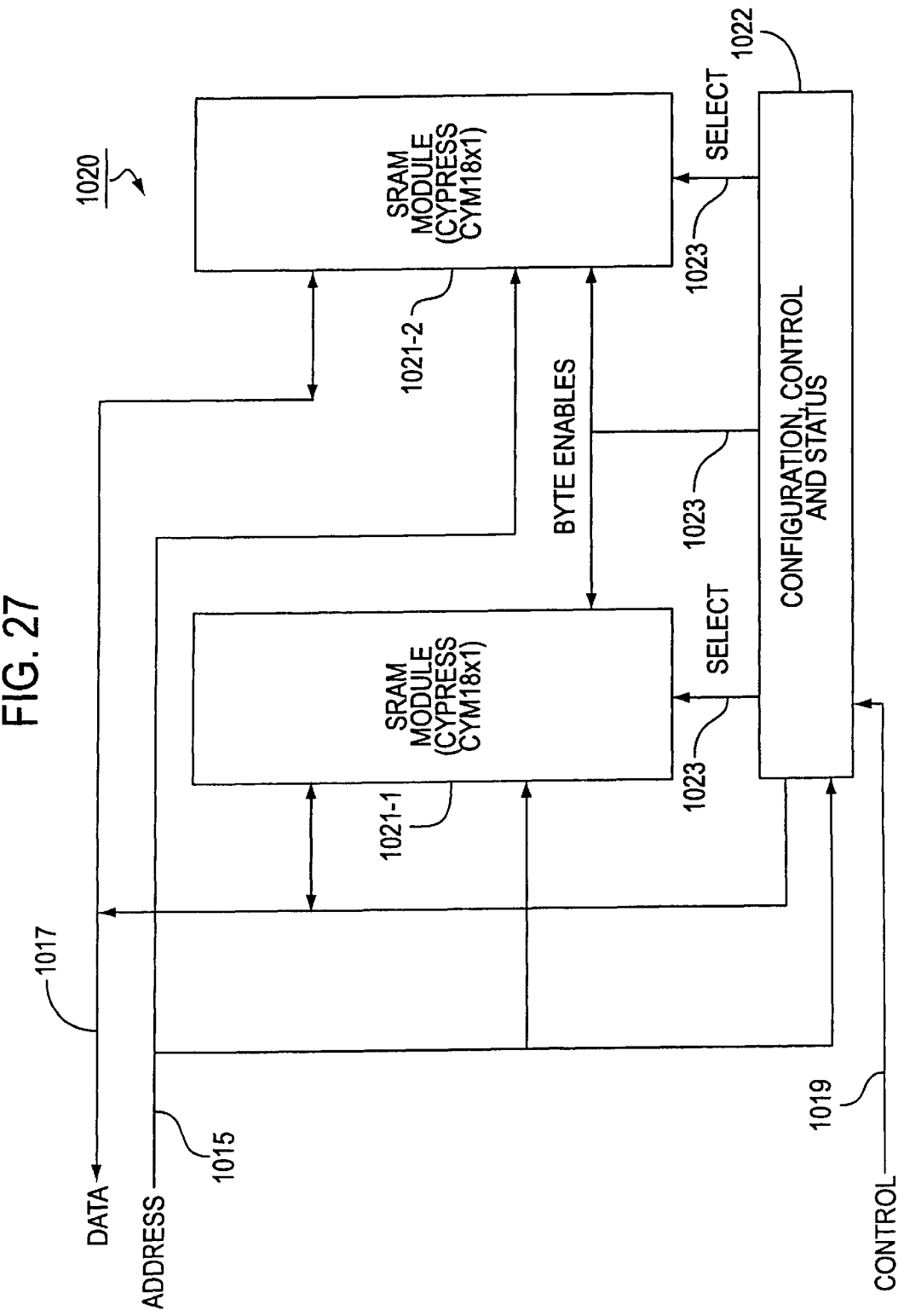
FIG. 27 illustrates a SRAM and control module in a bonder module such as that illustrated in FIG. 21.

FIG. 27 illustrates a SRAM and control module 1020 in a bonder module such as that illustrated in FIG. 21. It includes SRAM modules 1021-1 and 1021-2, and SRAM controller 1022. SRAM modules 1021-1 and 1021-2 store and provide network connection data broadcast over local data bus 1017 in accordance with local bus address information 1015 and control signals 1023 provided by SRAM controller 1023 decoded from local bus control signals 1019.

Figure 28A:
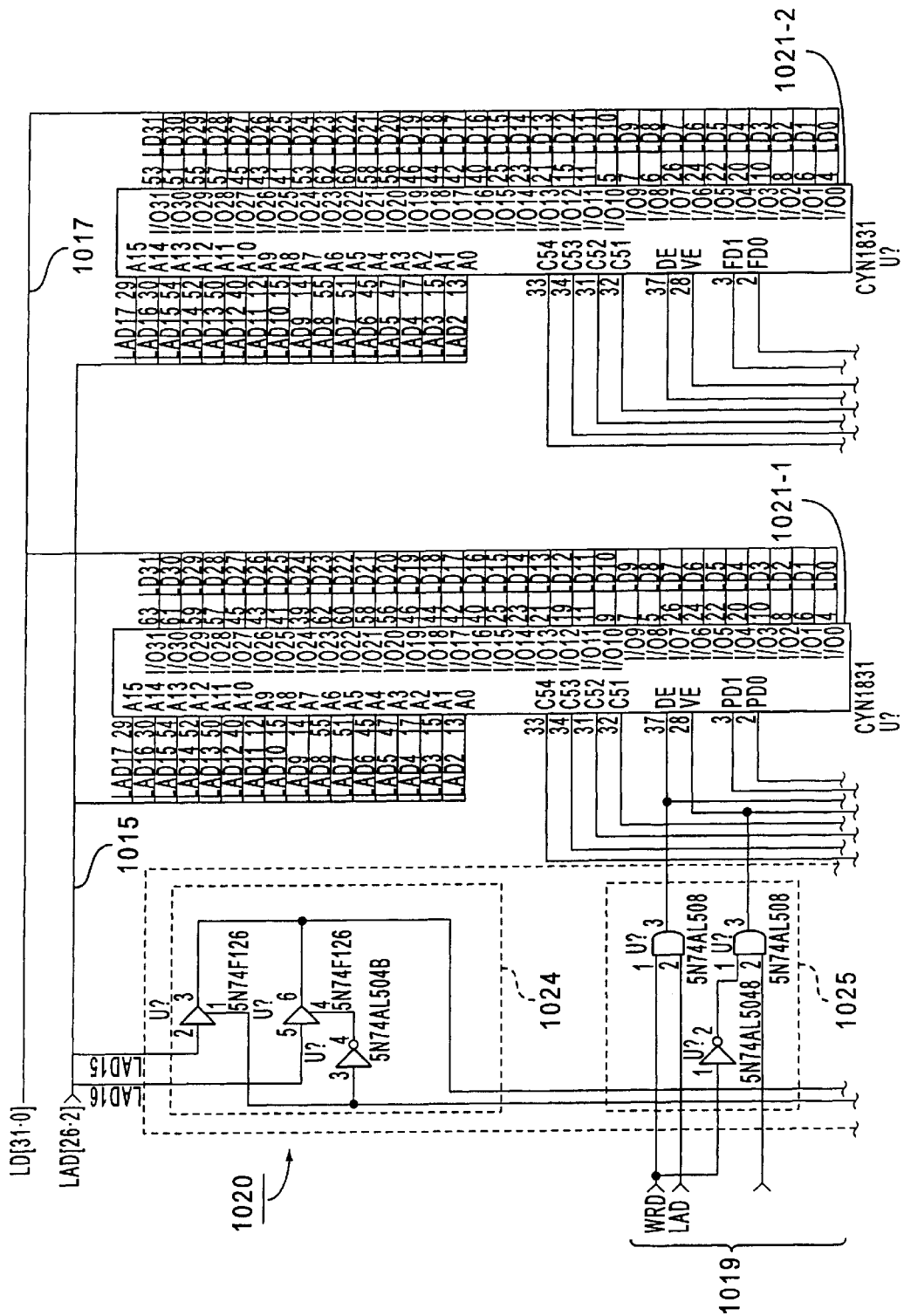
FIG. 28 illustrates SRAM modules in a SRAM and control module such as that illustrated in FIG. 27.
Figure 28B:
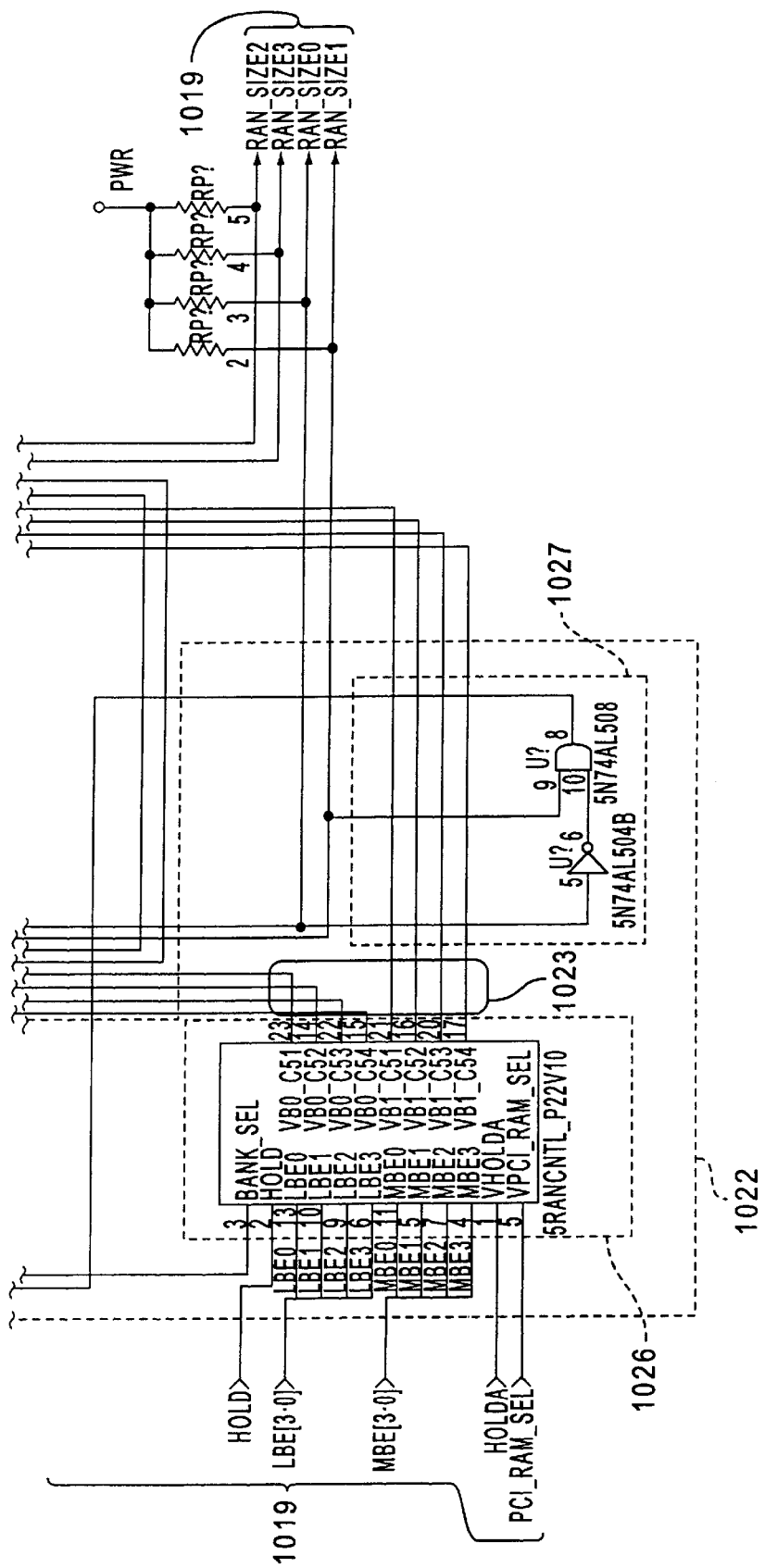

FIG. 28 further illustrates a SRAM and control module 1020 such as that illustrated in FIG. 27. SRAM modules 1021-1 and 1021-2 are preferably CYM18x1 memories made by Cypress Semiconductor of San Jose, Calif. As can be seen, they provide a data path of 32 bits over local data bus 1017 and decode 16 bits of address information over local address bus 1015.

SRAM controller 1022 decodes local bus control signals 1019 and provides control signals 1023 for controlling read and write operations of SRAM modules 1021-1 and 1021-2. It includes bank select module 1024, enable module 1025, SRAM module controller 1026, and byte select module 1027. It is common practice to provide multiple banks of memory so that a computer design may be optimized for a particular application in accordance with the amount of RAM installed. Bank select module 1024 therefore decodes address signals 1015 to tell which bank of RAM is being accessed on any given cycle. Moreover, a particular application may require that data be transferred in units of 8, 16 or 32 bits, (i.e., 1 byte, 2 bytes, 4 bytes). SRAM module controller 1026 therefore determines exactly which type of access is being selected, and generates appropriate control signals 1023 for activating the SRAM modules 1021-1 and/or 1021-2 as desired.

Figure 29:
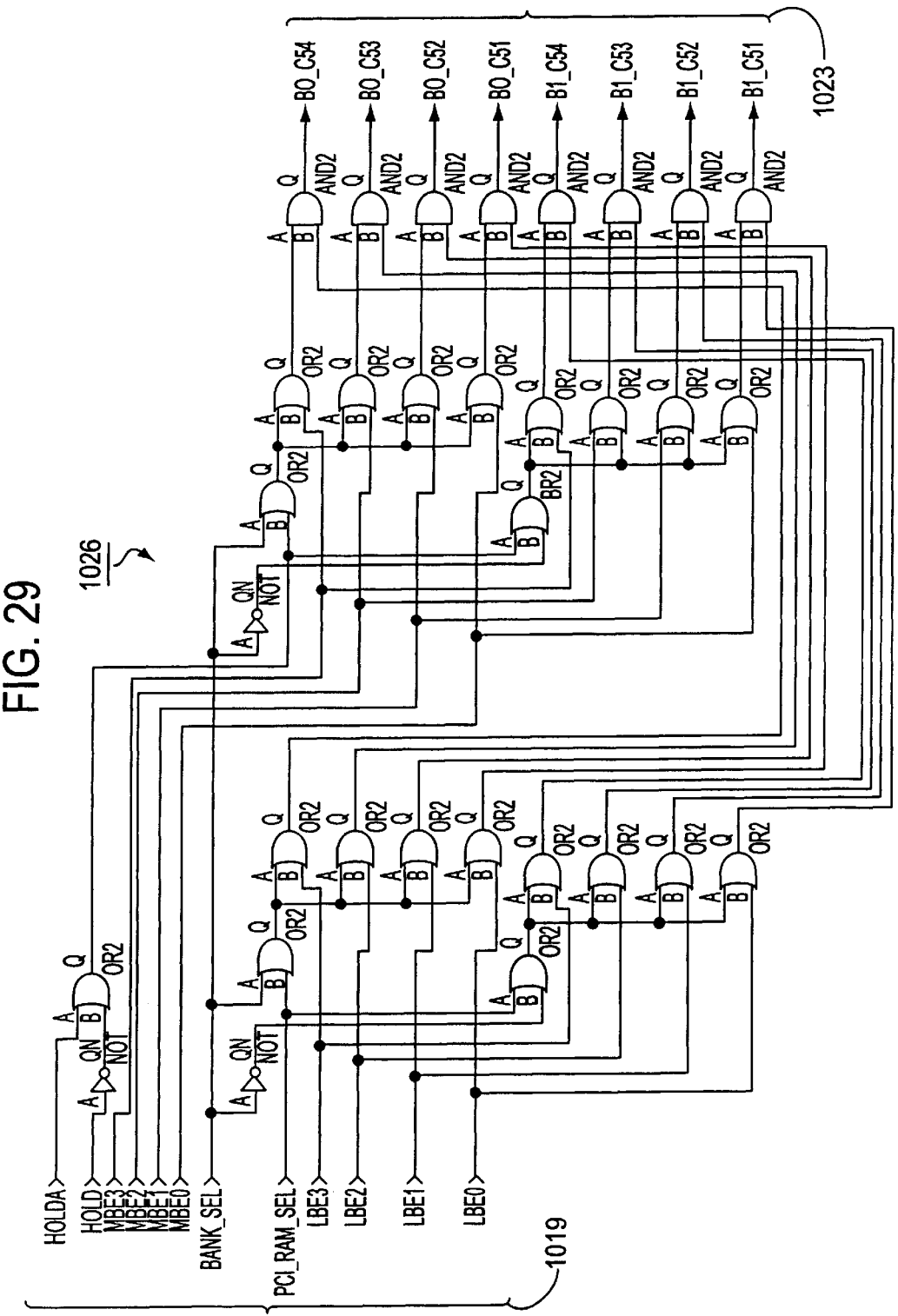
FIG. 29 illustrates a SRAM controller in a SRAM and control module such as that illustrated in FIG. 27.

FIG. 29 further illustrates a SRAM module controller 1026 such as that illustrated in FIG. 28 for generating the appropriate control signals 1023 from bus control signals 1019. The logic components and their operations are well known to those skilled in the art, and as such, further detailed explanation of their operations need not be replicated here.

I.C.4. Bonder B-channel Mux/Demux

FIG. 30 illustrates a B-channel mux/demux 1030 in a bonder such as that illustrated in FIG. 21. As can be seen, it includes a channelizer 1031 and a control address start register 1032. Channelizer 1031 is primarily responsible for mux/demux-ing between 24 channels of data on PCM highway 111 and buffered SRAM data fetched and forked via local data bus 1017 in accordance with address signals provided via local address bus 1015 and frame synchronization signals 1062 provided by line interface unit 1060.

Figure 31A:
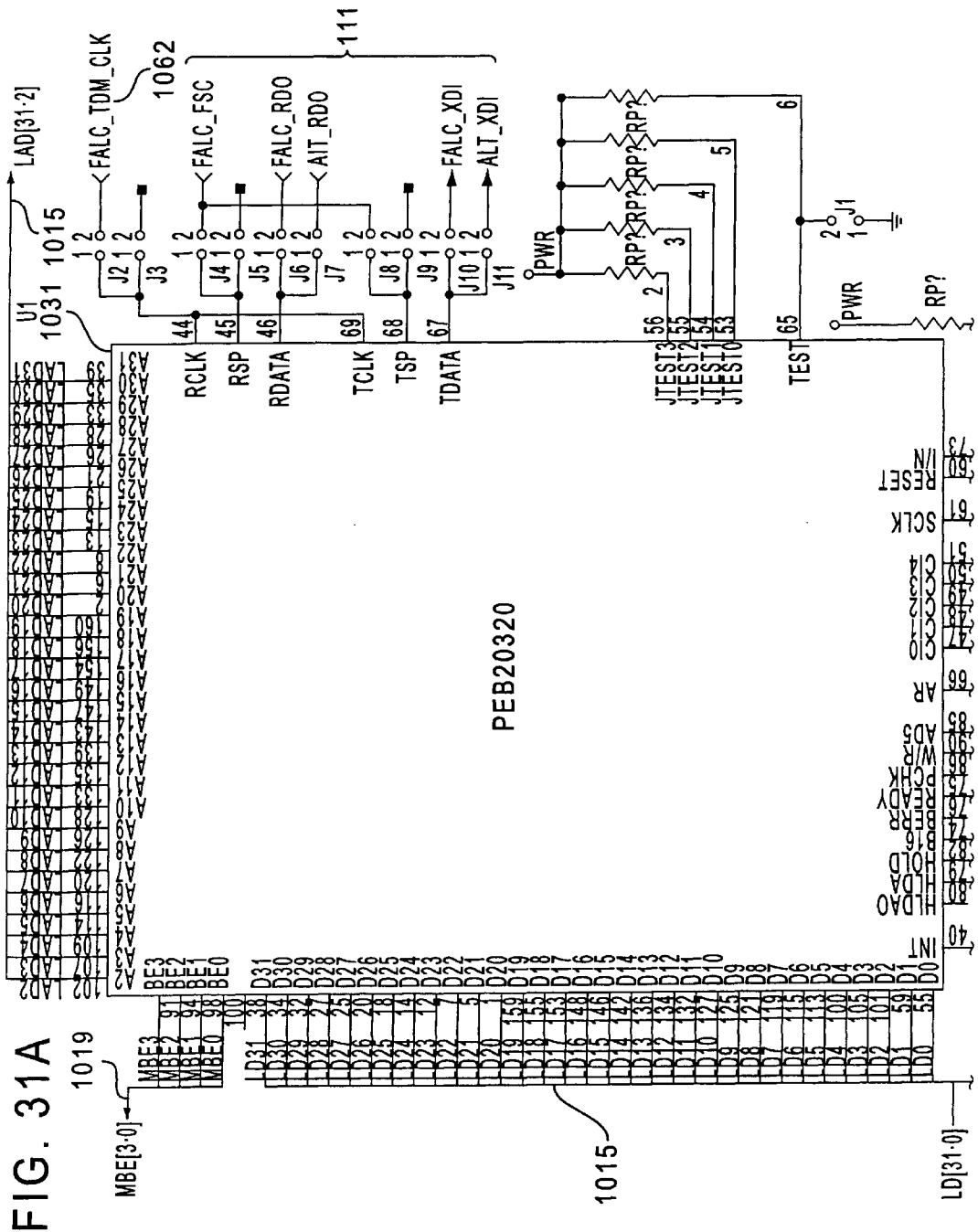
FIG. 31 illustrates a channelizer module in a B-channel mux/demux such as that illustrated in FIG. 30.
Figure 31B:
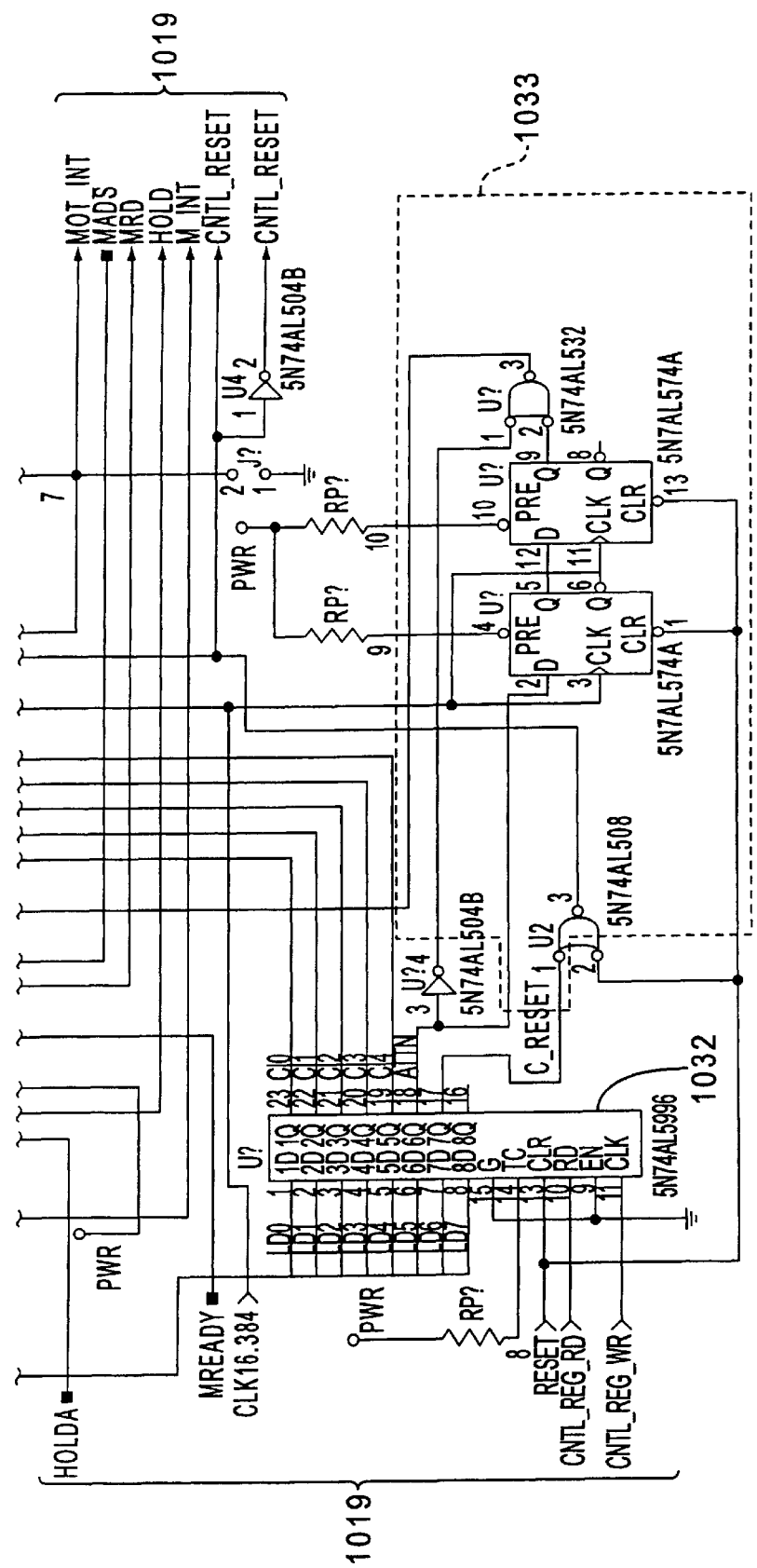

FIG. 31 further illustrates B-channel mux/demux 1030. In this example, channelizer 1031 is primarily implemented by a Multichannel Network Interface Controller for HDLC (MUNICH32), such as a PEB20320 by Siemens Components, Inc. of Germany. Its data, address, and control pins are respectively coupled to local data bus 1017, local address bus 1015, and control bus 1019. It is also connected to PCM highway 111 for receiving and transmitting HDLC formatted data in accordance with frame synchronization clocks 1062. This device is fully software programmable. Control address start register 1032 provides the address at which it is to begin execution upon powering up.

Figure 32:
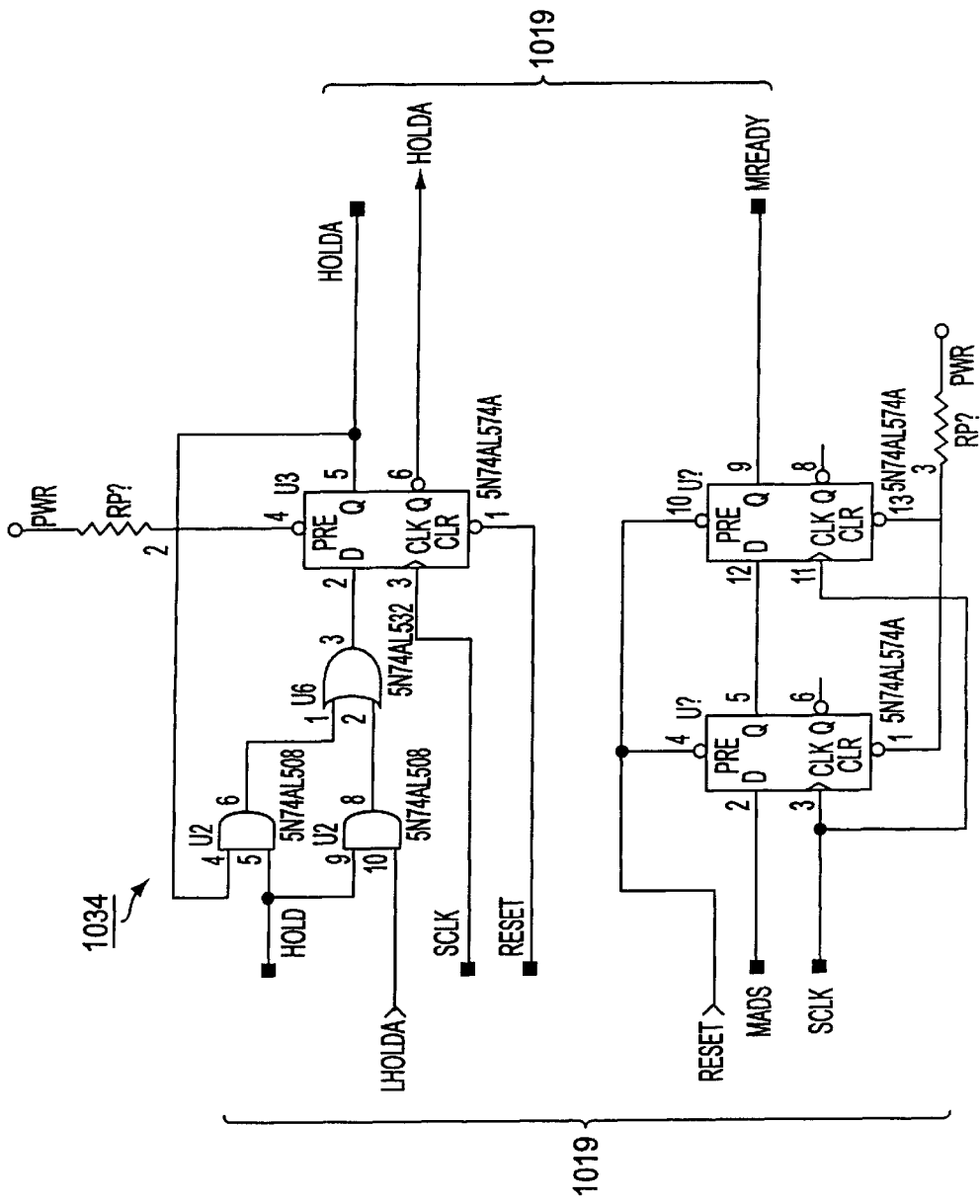
FIG. 32 further illustrates a channelizer module in a B-channel mux/demux such as that illustrated in FIG. 30.

FIG. 32 illustrates an arbiter 1034 for use in a B-channel mux/demux 1030 such as that illustrated in FIG. 30. Either the host computer, via the PCI bus, or the channelizer 1031 may access the RAM at any time, but they are not permitted to do so at exactly the same time. Arbiter 1034 receives requests from these devices via local bus control signals 1019 and permits only one device at a time to access memory. Moreover, if one device is using the bus, and the other requests it via control signals 1019, arbiter 1034 generates appropriate signals telling the other device to hold momentarily.

I.C.5. Bonder TDM Switch

Figure 33:
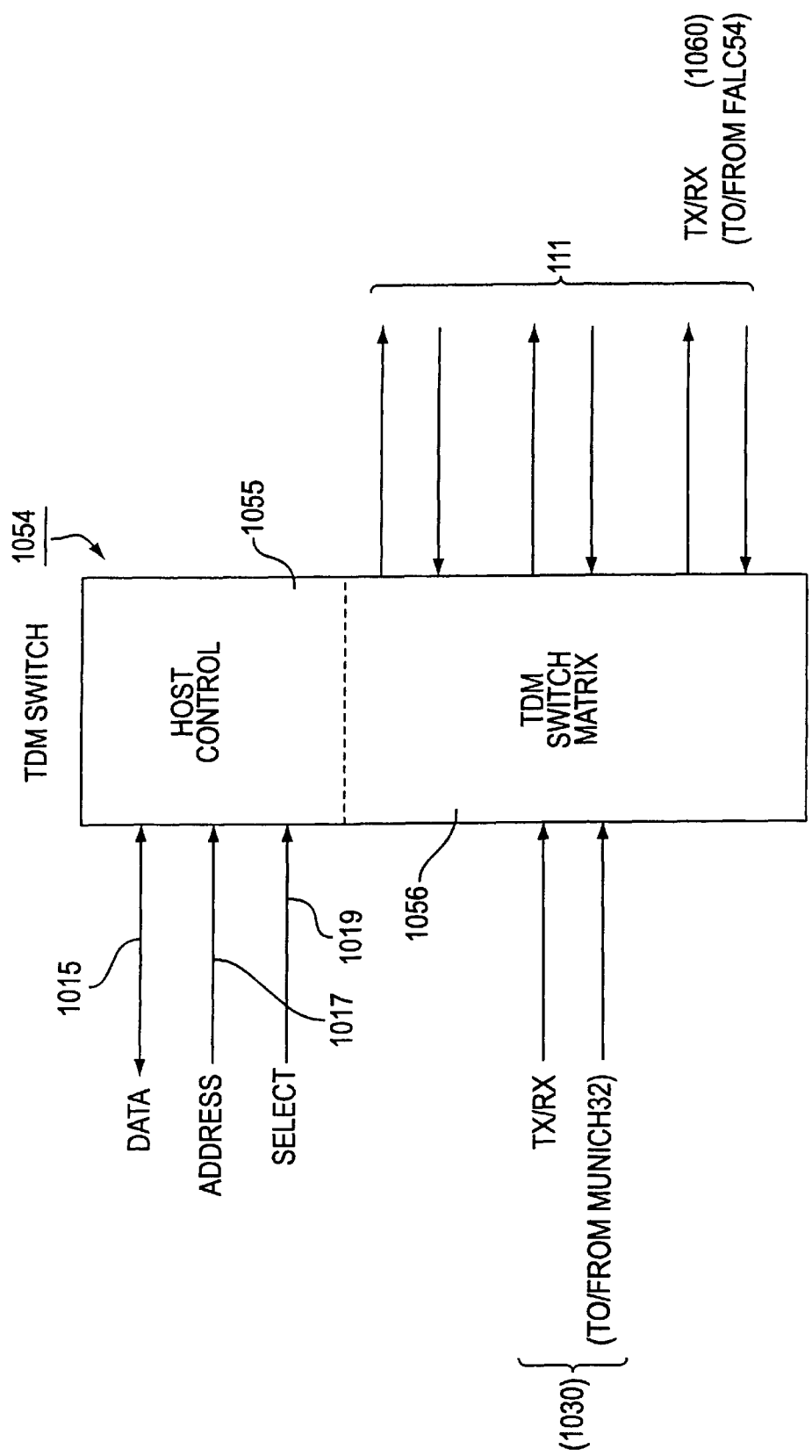
FIG. 33 illustrates a TDM switch in a bonder module such as that illustrated in FIG. 21.

FIG. 33 illustrates a TDM switch and clock controller 1054 in accordance with the embodiment of the invention illustrated in FIG. 21. It includes a host control section 1055 and a TDM switch matrix 1056.

Host control section 1055 receives data, address and select information from CPU 116 via PCI bus 118 and local bus 1080. The preferred embodiment uses a TDM bus and switching format known in the art as Multi Vendor Interface Protocol (MVIP).

TDM switch matrix 1056 multiplexes, to/from PCM highway 111 under control of host control section 1055, broadband network traffic data received/sent from/to the LAN via packet switch 112, SRAM 1020, and B-channel mux/demux 1030 into data sent/received to/from the broadband network city node via line interface unit 1060.

TDM traffic can be sent as either serial or parallel data streams. In the preferred implementation, it is sent as serial, and is sent at the rate of 2.048 million bits/second. As is known, data is identified, or addressed, on a TDM bus based on its temporal location in the TDM complex. Host control 1056 contains accurate clocks which count the passing bits. When it is desired to move bits from one connecting device (e.g. line interface unit 1060) to another (e.g. B-channel mux/demux 1030) the bits are momentarily stored in a buffer within switch matrix 1056 and then read out at the precise instant expected by the receiving device. Thus, each device connected to TDM switch and clock controller 1054 knows when to listen or transmit so as move data from one device to another.

I.C.6. Bonder Line Interface Unit

Figure 34:
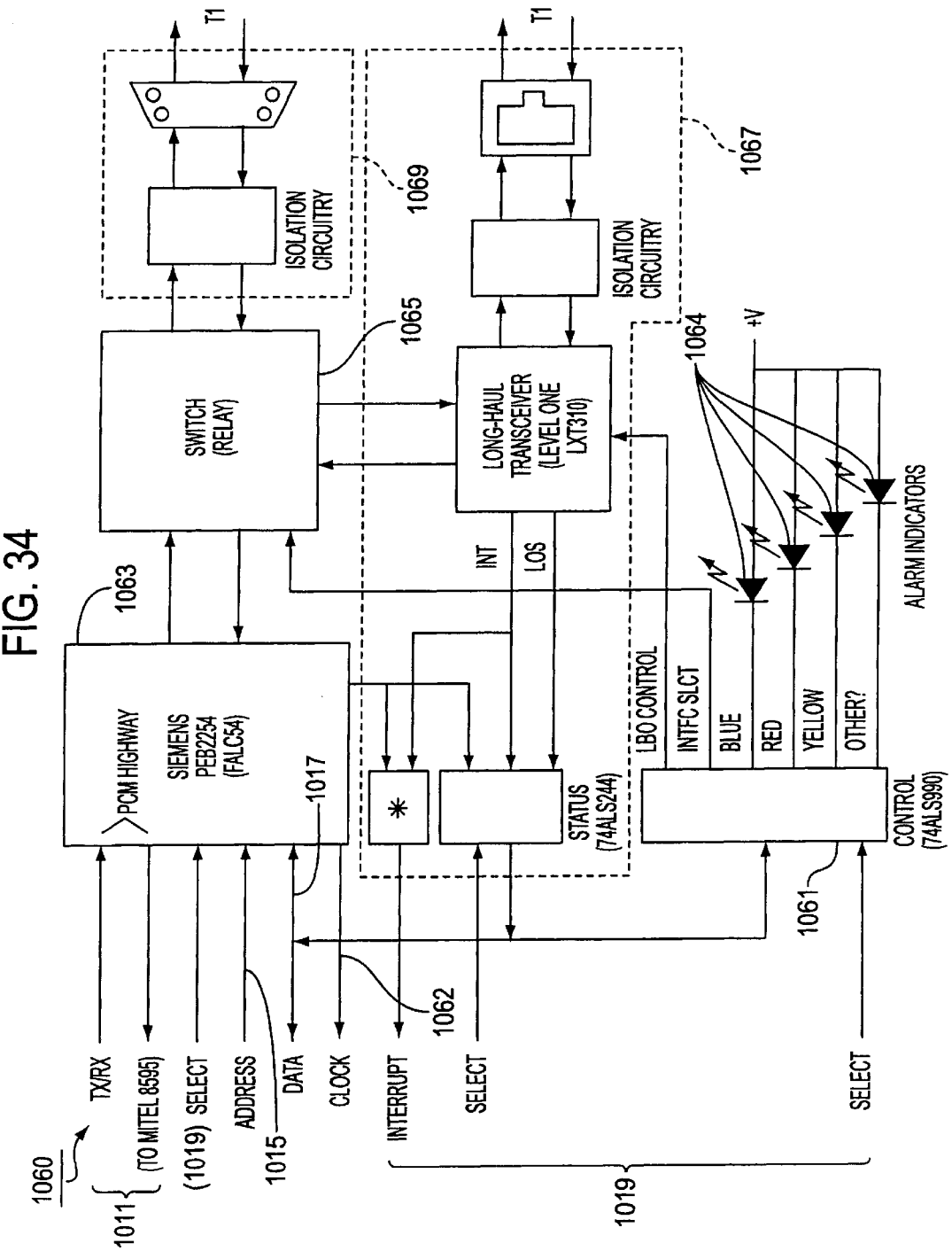
FIG. 34 illustrates a line interface unit in a bonder module such as that illustrated in FIG. 21.

FIG. 34 illustrates a line interface unit 1060 in accordance with the embodiment of the invention illustrated in FIG. 21. It includes LIU controller 1061, frame controller 1063, CSU/DSX switch 1065, CSU interface 1067, and DSX interface 1069. Interfaces 1067 and 1069 directly interface the premises switch with the T1 line connected to the city node. LIU controller 1061 controls the activation of alarm indicators 1064 in accordance with predetermined conditions.

Figure 35A:
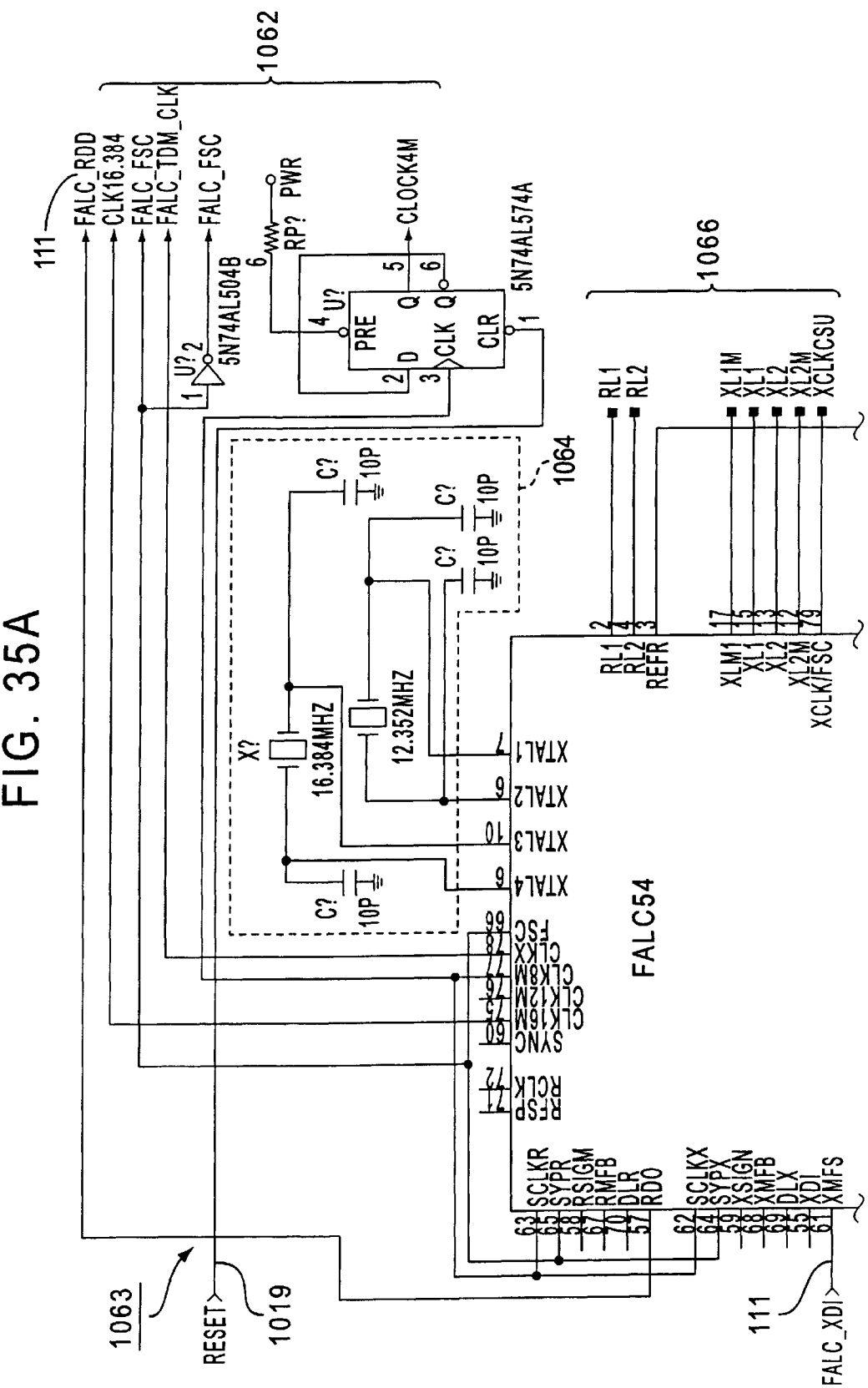
FIG. 35 illustrates a framer and line controller in a line interface unit such as that illustrated in FIG. 34.
Figure 35B:
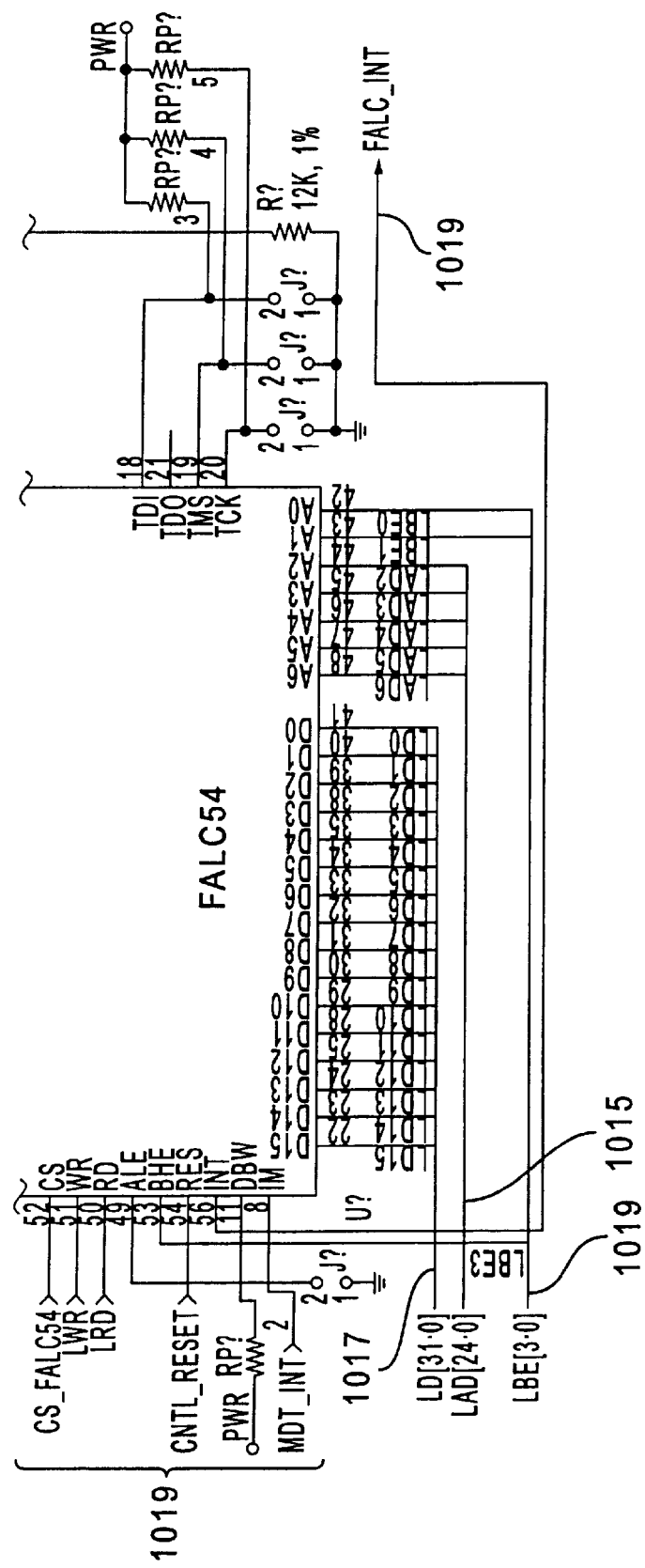

FIG. 35 illustrates a frame controller 1063 in a line interface unit such as that illustrated in FIG. 34. In this example, frame controller 1063 is primarily embodied by a Framing And Line Interface Plus Signaling Controller (FALC54) chip number PEB 2254, manufactured by Siemens Components, Inc. of Germany. One of its operating modes is in accordance with the well-known Primary Rate Interface (PRI). It includes connections to local address bus 1015, local address bus 1017, and local control bus 1019, as well as to PCM highway 111 via TDM switch 1050. It also includes switch connectors 1068 for receiving and transmitting traffic data from/to the broadband network connections via interfaces 1067 and 1069 under the control of CSU/DSX switch 1065.

As further illustrated in FIG. 35, frame controller 1063 receives locally generated clocks from clock generator 1064. Frame controller 1063 can output frame synchronization clocks 1062 based on the locally generated clocks. More typically, however, the FALC54 chip automatically detects the clock embedded in the signal from the T1 line and slaves itself to that clock.

Figure 36A:
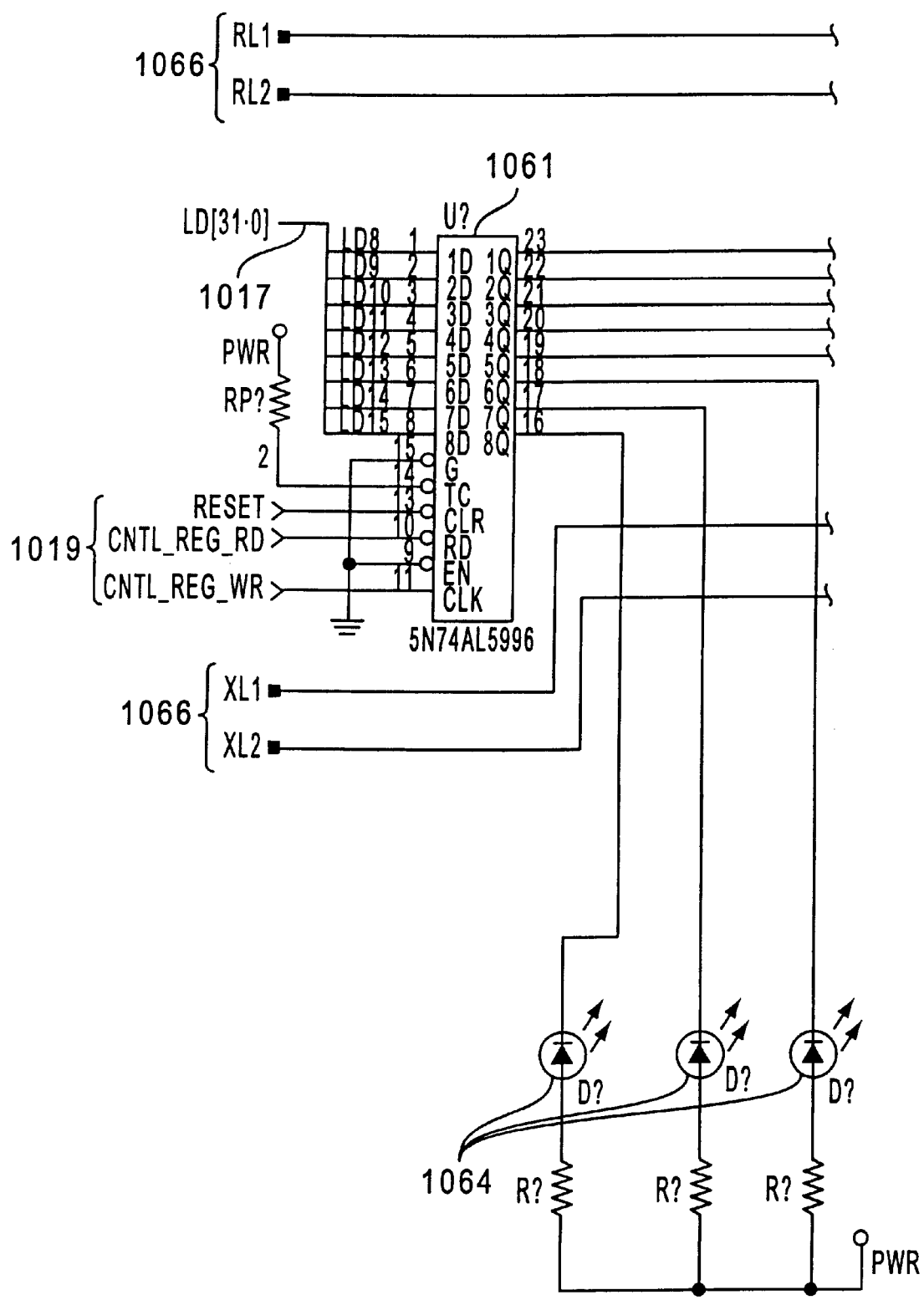
FIG. 36 illustrates an interface type switch in a line interface unit such as that illustrated in FIG. 34.
Figure 36B:
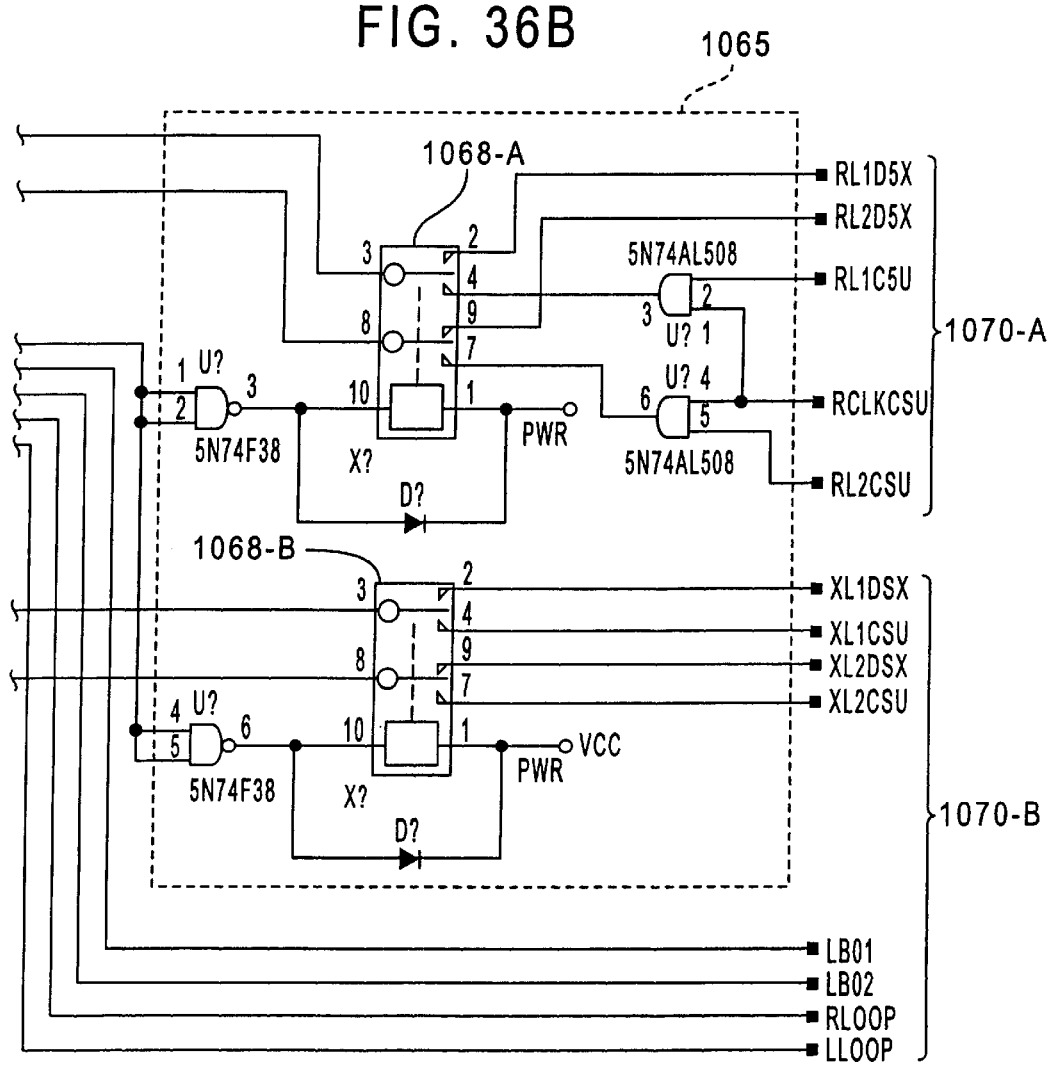

FIG. 36 illustrates a LIU controller 1061 and CSU/DSX switch 1065 in a line interface unit such as that illustrated in FIG. 34.

LIU controller 1061 receives signals via local data and control buses 1017 and 1019. Such signals are controlled by CPU 116, and include selection signals which command CSU/DSX switch 1065 to control a network transmit/receive path. These are decoded by LIU controller 1061 and used to generate control signals that are output to appropriately configure CSU/DSX switch 1065.

Signals received by LIU controller 1061 also include signals that are decoded to generate outputs for activating alarm LED's 1064. The preferred embodiment of the present invention defines three alarms. A red alarm occurs when no signal is detected on the T1 line. A yellow alarm occurs when the far end of the T1 line signals that it has lost signal. A blue alarm indicates there is a signal present, but that there are errors in framing (i.e., signal timing). In addition to activating the appropriate LED's, premises switch 110 reports all these alarm conditions to the network control system server and its associated customer/network management software so that managers of the broadband network can act on alarm conditions as they occur.

As further illustrated in FIG. 36, CSU/DSX switch 1065 includes relays 1068-A and 1068-B that are controlled by selection signals from LIU controller 1061. In accordance with these selection signals, transmit and receive paths are established between frame controller 1063 via switch connector pads 1066 and CSU interface 1067 and DSX interface 1069 via interface connector pads 1070-A and 1070-B, respectively.

Figure 37:
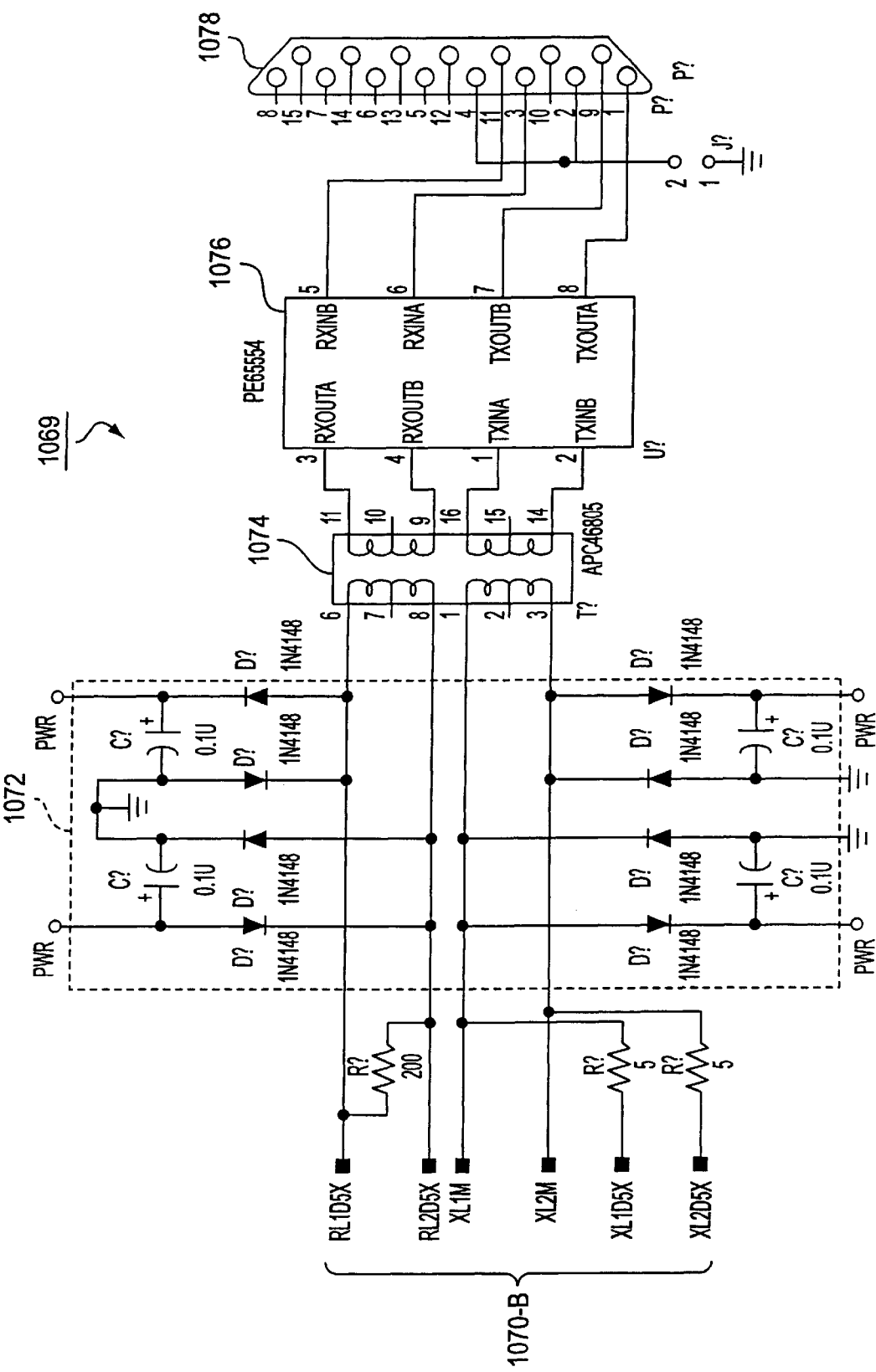
FIG. 37 illustrates a DSX interface in a line interface unit such as that illustrated in FIG. 34.

FIG. 37 illustrates a DSX interface 1069 in a line interface unit such as that illustrated in FIG. 34. It includes DSX isolation circuitry 1072 for isolating interface connector pads 1070-B from the T1 line via DSX connector 1078. It also includes line transformers 1074 and 1076 for protection from potentially lethal voltages. Such protection is standard in the art for many types of telephone lines and is provided as a safety feature.

Figure 38A:
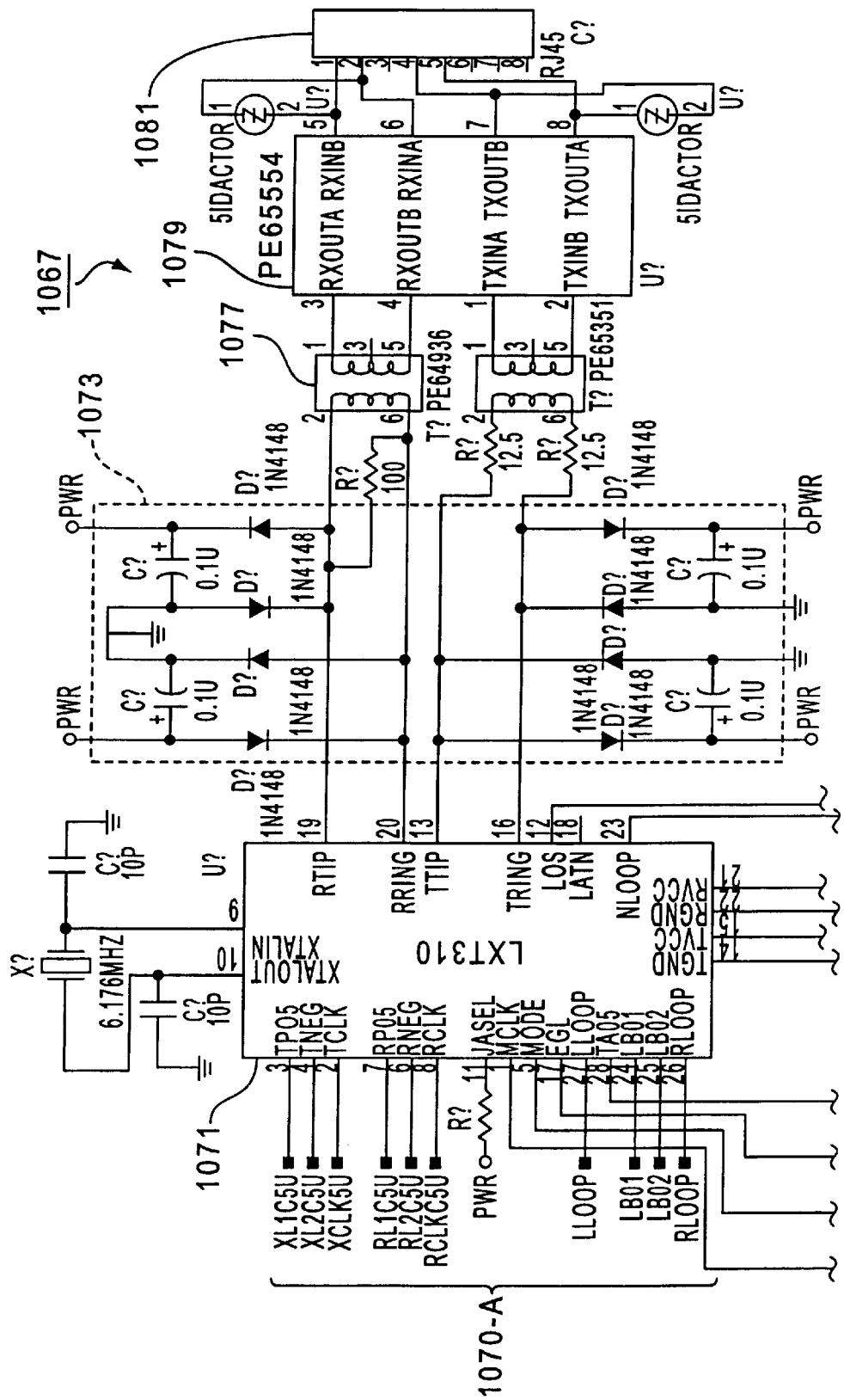
FIG. 38 illustrates a CSU interface in a line interface unit such as that illustrated in FIG. 34.
Figure 38B:
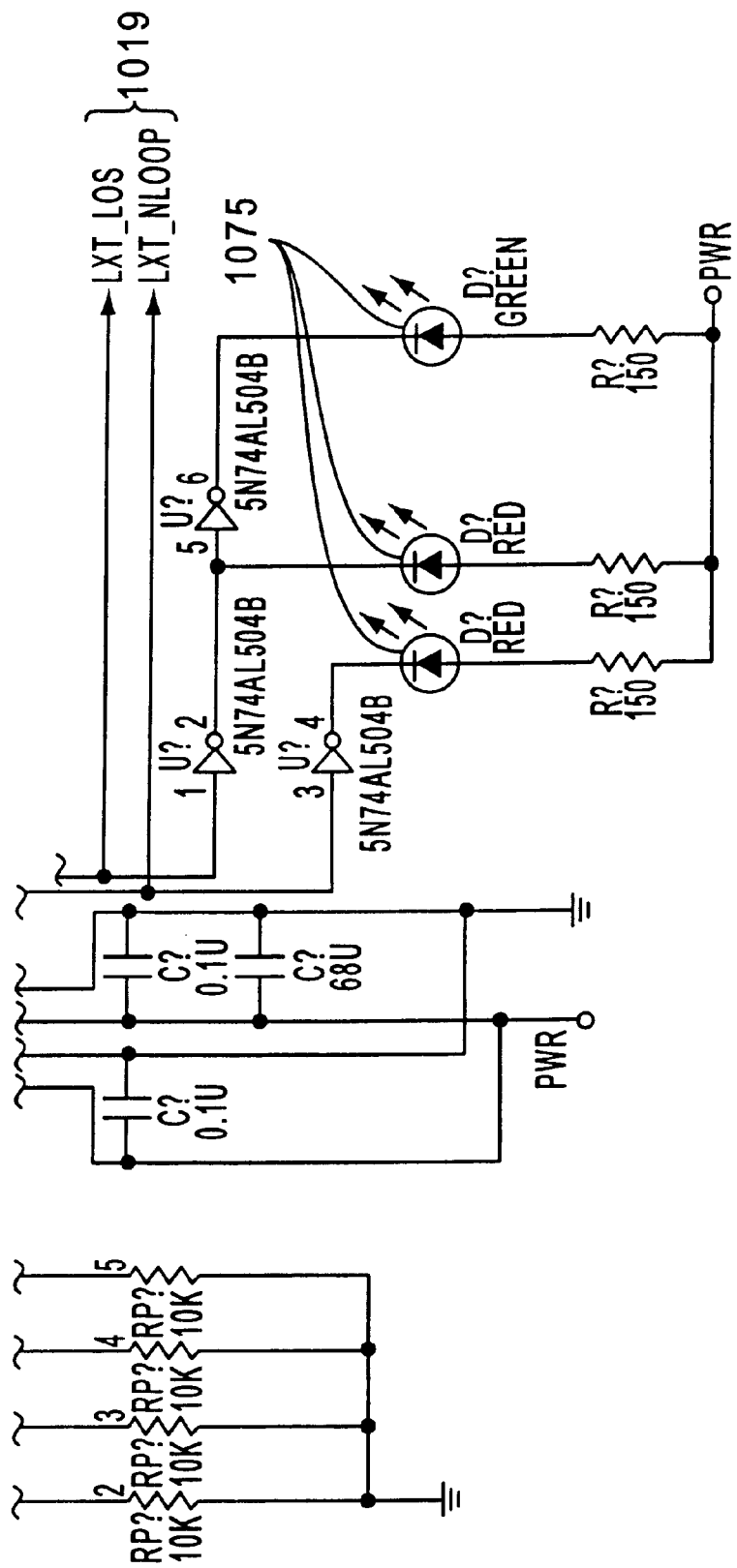

FIG. 38 illustrates a CSU interface 1067 in a line interface unit such as that illustrated in FIG. 34. It includes CSU isolation circuitry 1073 for isolating interface connector pads 1070-A from the T1 line via CSU connector 1081. It also includes long haul transceiver 1071, alarm LED's 1075, and line transformers 1077 and 1079. Elements 1073 and 1079 provide protection from dangerous voltages, as explained above. In long haul transceiver 1071 is, in effect, an amplifier which allows the device to operate over longer wires (up to 12,000 feet) than would otherwise be possible. The alarm LEDs 1075 perform similar functions as LEDs 1064 as described above.

I.C.7. Routing Function

Routing function 113 illustrated in FIG. 19 includes functionality of conventional routers, and provides additional functions.

Conventional routers dispatch packets to ports according to the IP address embedded in the packet and a port/address routing table.

Routing function 113, on the other hand, maintains an expanded table such as the following:

| Dest. IP address | Port | Owner | Security |
|---|---|---|---|
| Signaling Network | 1 | All Registered | All Registered |
| Internet Access | 2 | All Registered | All Registered |
| A-B Video | 3 | A | A |
| A-B Audio | 4 | A | A |
| A-B Data | 5 | A | A |
| . . . | . . . | . . . | . . . |

The table assignments for signaling network data and Internet access are preferably performed upon initialization and are rarely changed. However, the table assignments for circuit-switched connections are determined and transmitted by network control system server 40 to premises switch 110 when a connection is being set up, and the assignments last only as long as the connection lasts.

The owner field of the table is keyed to the source IP address of the data, and the security field of the table is keyed to the source Ethernet address. The notation "All Registered" in the owner and security fields of the table denotes that all registered workstations and workstation interfaces in the LAN are permitted to use the signaling network and Internet access of the broadband network. Data packets from unregistered workstations, such as, for example, workstations 102 that are not configured for the broadband network, will be discarded by the routing function.

The purpose of the routing function's above-described table is to prevent unauthorized access to the services of the broadband network. Otherwise, anyone sending a data packet having the IP addresses for broadband network services could infiltrate the network. When a data packet is received from packet switch 112, routing function 113 inspects the destination IP address in the header. If the destination IP address matches one of the table entries, routing function 113 further compares the source IP address and source Ethernet address to the table entries and drops the packet if they do not match. Otherwise, the packet is forwarded to bonder 114 for transmission.

I.C.8. Bonding Function

Bonding function 123 illustrated in FIG. 19 maintains a table such as the following:

| Port | Channels |
|---|---|
| 1 | $\{B_1\}$ |
| 2 | $\{B_2\}$ |
| 3 | $\{B_3\}$ |
| 4 | $\{B_4\}$ |
| 5 | $\{B_5\}$ |
| ... | ... |
| n | $\{B_a\}$ |

The sets of bearer channels $\{B_1\}$ to $\{B_n\}$ need not consist of consecutive bearer channels or bearer channels multiplexed on the same T1 line, for example.

Broadband network data through premises switch 110 is assigned a port and a corresponding set of bearer channels. The port assignments for signaling network data and Internet access are preferably performed upon initialization and are rarely changed. However, port assignments for circuit-switched connections are determined and transmitted by network control system server 40 to premises switch 10 when a connection is being set up, and the assignments last only as long as the connection lasts.

Data associated with the signaling network or Internet access can be fixedly assigned a respective port number, and then the set of bearer channels can be variably changed on an as-needed basis. Alternatively, the set of bearer channels can be fixed.

I.C.9. Network Address Translation Function

The network address translation function 119 illustrated in FIG. 19 insures that broadband network data is forwarded appropriately. In the example of the invention described herein, it implements the NAT protocol that is fully described in Internet RFC 1631. However, other translation procedures are possible. The unique aspect of the network address translation function of the present invention is the use of the temporarily-assigned IP addresses used by the parties in a circuit-switched connection. This provides security, in that it insures that only the intended parties in a connection have access to the bandwidth reserved for that connection, and it also provides stability, in that some IP addresses may actually be reassigned by a local network, for example, during the connection.

When a broadband network circuit-switched connection is set up, network control system server 40 assigns a temporary IP address pair for each data flow in the connection. That is, for example, if a connection is a teleconference between A, B, and C, having video, audio, and formatted data streams, network control system server 40 assigns a temporary IP address pair for the video data flow between A and B, the audio data flow between A and B, the formatted data flow between A and B, the video data flow between B and C, the audio data flow between B and C, the formatted data flow between B and C, the video data flow between A and C, the audio data flow between A and C, and the formatted data flow between A and C. Each party in the teleconference, including workstations, workstation interfaces and premises switches, are given the temporary IP address pair assignments for the flows.

FIG. 39(A) illustrates the operation of the network address translation function of the present invention. In this example, a connection is established between users associated with workstations 100-A and 100-B. Premises switch 110-A receives data from workstation 100-A and/or workstation 140-A, and rewrites A's own IP address with the temporary IP address assigned to A for the connection. When the data is received at premises switch 110-B, the premises switch rewrites the temporary destination IP address with B's own IP address.

An example of the changes in a data header undergoing the network address translation function illustrated in FIG. 39(A) is shown in FIGS. 39(B), 39(C) and 39(D), where A is A's own IP address, B is B's own IP address, and IP-A and IP-B are the temporarily-assigned IP address pairs for the connection.

The network address translation function is preferably symmetrically applied to packets flowing in both directions over the switched connection. This insures that, for each party in each switched-circuit connection, there exists one unique address (ethernet address plus IP address) for that party's involvement in the connection. Without the network address translation function, the premises switch would not be able to guarantee the ability to correctly deliver a packet to its proper destination.

I.C.10. Network Command Translation Function

The purpose of a network command translation function 121 such as that illustrated in FIG. 19 is to translate and handle network commands received over the signaling network 30 via bonder 114. As will be explained in more detail in the switch commander section, it is desirable to have all switch resources in the network present a uniform interface for the purposes of routing and establishing a circuit-switched connection. The premises switch is considered a switch resource like any other switch resource in the network in this model of the invention.

As will be explained in more detail below, the standard interface presented between all switch resources in the network and the network control system server includes an intermediate token set. The purpose of the network command translation function is to translate incoming intermediate tokens into operations appropriate for the premises switch, and to output intermediate tokens in the format expected by the network control system server.

Figure 40:
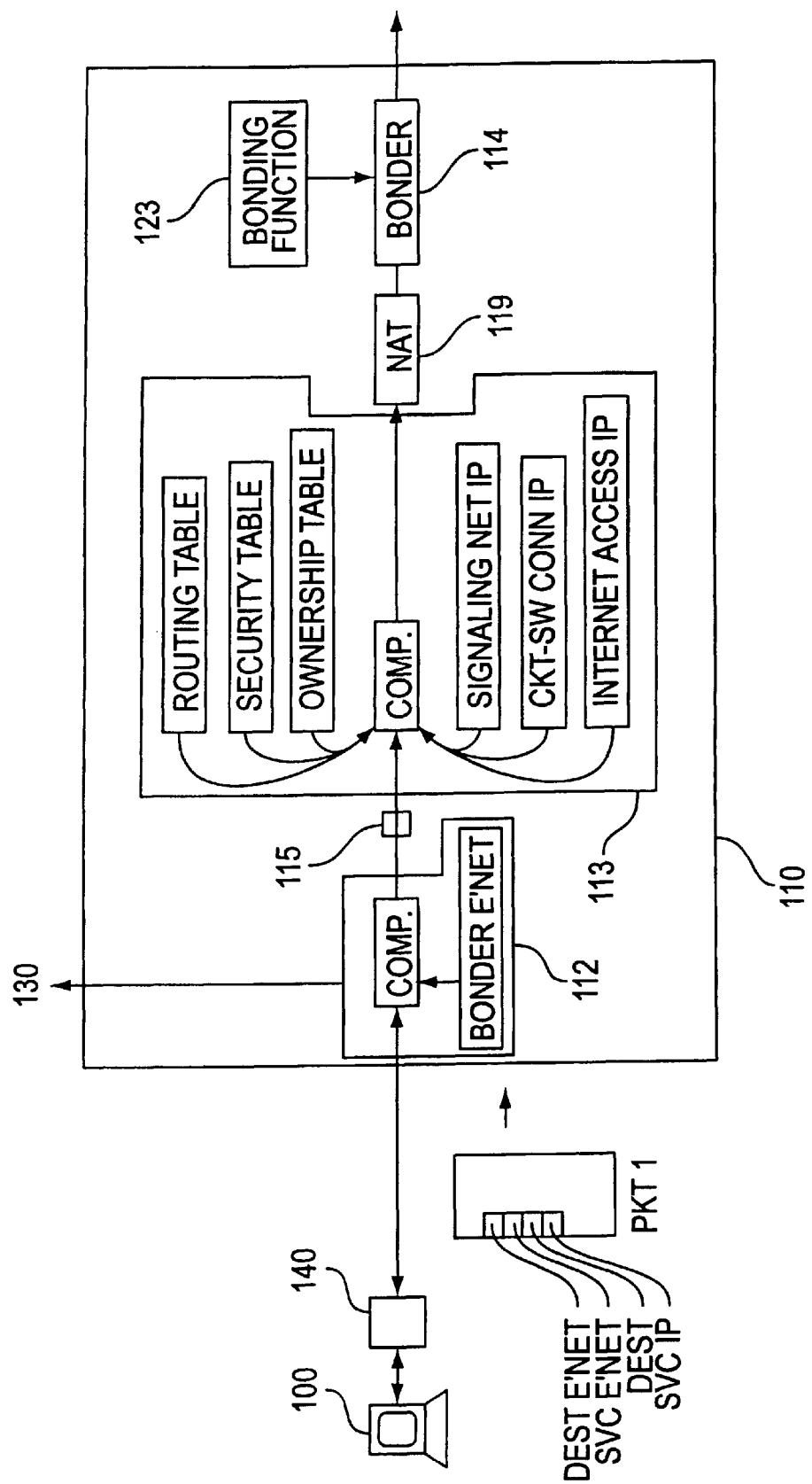
FIG. 40 illustrates the flow of LAN packet data destined for the broadband network in a local node such as that illustrated in FIG. 2.

Some of the important functions supported by the intermediate token set include:

1. Set up a group of bearer channels and connect them
2. Start a broadband network connection
3. End a broadband network connection 4. Tear down a crosspoint connection
5. Report error conditions and status
6. Provide provisioning information
7. Provide an audit trail I.C.11. Premises Switch Data Flows FIG. 40 illustrates the flow of local node 50 LAN data associated with the broadband network. Packet switch 112 of premises switch 110 must distinguish packets that should be forwarded to bonder 114 for network transmission. To this end, when premises switch 110 is initialized, it is configured with an Ethernet address assigned to the bonder. This address is associated with the port from the packet switch 112 to network interface card 115, and remembered by packet switch 112 so that it can properly direct all packets destined for the broadband network. In a similar manner, when workstation interfaces 140 start up they either have been pre-configured or they have the means to determine the Ethernet address of bonder 114 in their local node 50's premises switch 110.

Moreover, workstation interfaces 140 are all configured with or have the means to determine the IP address assigned for the signaling network and for Internet access.

When a broadband network connection is set up, premises switch 110 is informed by the network control system server 40 of temporary IP addresses that it should "advertise" (bind) as the destination EP address for all flows related that particular switched circuit connection. These temporary addresses are stored in routing function 113's routing table, along with the ports assigned to the flows. Network control system server 40 also supplies the information regarding the users in local node 50 that are authorized to use that connection. This information is preferably keyed to the users' IP and Ethernet address, which are stored in routing function 113's ownership table and security table, respectively.

Packet switch 112 is normally configured in such a manner that if it has not previously heard an advertisement for a network address presented to it by a packet, it will by default forward that packet to the packet switch 112's link to LAN router 130. Therefore, in either the case where the user provides their own Internet connection (via their LAN) and a packet is bound for the Internet, or the case where the packet is bound for a computer or other network device on LAN 120, packet switch 112 will take the default action which is to forward the packet to LAN router 130 for further routing and processing.

Packets that are forwarded from the packet switch 112 to bonder 114 within premises switch 110 can have three possible destinations. First, the packet can be destined for the Internet. Such packets arriving at routing function 113 have a destination IP address assigned for Internet access (Dest IP=Internet Access IP). Routing function 113 then inspects the packet's source Ethernet (Src E'Net) and IP address (Src IP) to determine if the user sending the packet is authorized to use the broadband network. If so, the packet is routed to the appropriate port of the bonder module Internet access. In this instance, for example, the packet is transmitted over a nailed-up TCP/IP connection from the premises switch to a packet router located in city node 10 with no further checking or processing. The Internet access router in the city node in turn provides a means for these packets addressed to the Internet to actually reach the Internet.

Second, the packet can be destined for signaling network 30, such as messages relating to managing a switched circuit connection. In this case, the packet Pkt1 has been addressed to the IP of the signaling network (Dest IP=Signaling Net IP). Routing function 113 compares the packets source Ethernet and IP addresses with values stored in the security and ownership tables corresponding to signaling network access, and forwards the packet to the appropriate bonder port if the originating user is authorized.

An important feature of the preferred embodiment is that the network control system server 40 will only accept packets addressed to the network control system server from routers directly connected to the signaling network itself. Packets addressed to the signaling network and coming from any other network will be intercepted by the network control system server 40 and discarded. Thus, someone trying to use the signaling network from an unauthorized source, such as the Internet, will be denied access to the signaling network and all elements connected to it, including the network control system server and premises switches. Even more importantly, a user of the Internet can have no direct connection to TCP/IP traffic carried on a switched circuit connections within the broadband network, thereby providing an inherently high level of security that is novel in the art.

Finally, packets Pkt1 can be destined for a connection over the circuit-switched broadband network (Dest IP=Ckt-Sw Conn. IP). When a circuit-switched connection is being set up, information sent over the signaling network 30 to the network control system server 40 from the premises switches 110 involved at both the originating and terminating ends of the connection includes the IP and Ethernet addresses of the originating user workstation 100 and its associated workstation interface 140 and the terminating user workstation 100 and its associated workstation interface 140. These IP and Ethernet addresses are sent to the network control system server 40 by each premises switch 110. The network control system server 40 then forwards these received IP and Ethernet addresses to the corresponding premises switches 110 involved in the particular connection. The network control system server 40 additionally assigns a unique temporary set of IP address for each data flow in the connection. The IP and Ethernet addresses for both parties to the connection are sent to both of the premises switches involved in the particular connection, where they are preserved only for the duration of the connection and used for the network address translation function described above.

Premises switch processing of packets destined for switched-circuit connections proceed as follows, with reference to FIG. 40. First, routing function 113 compares the source Ethernet and IP address of the packet with the Ethernet and IP address stored in the security and ownership tables, respectively. The authorized user for the particular data flow can be either the workstation interface 140 or the workstation 100, depending on which one has the media resources to properly handle the flow, or both for connections that involve the use of media resources belonging to both units, as in the case of a connection that contains both video and some shared data application. The particular Ethernet address with which the premises switch is to screen packets is provided to the premises switch 110 by the network control system server 40 when setting up the connection. If these addresses do not match, the premises switch 110 will reject the packet. The premises switch can thus insure that only the parties involved in the particular connection are allowed to use the switched bandwidth provided for that connection. This security feature is important because if the premises switch did not do this comparison, then once a switched-circuit connection was established anyone trying to send a packet to the IP address of the called party could do so, thus depriving the parties in the switched-circuit connection the exclusive use of the bandwidth in the switched connection that they are paying for.

If the source IP and Ethernet addresses match, then each premises switch involved in the connection uses their network address translation function to rewrite both the destination address of outbound packets being sent from the premises switch and the source address of incoming packets being received by the premises switch.

The above descriptions assume that the data traffic is unicast. Although unicast is preferred for such data traffic as shared data applications, Video/Audio traffic preferably uses IP Multicast. Most of the above descriptions also apply to multicast traffic. There are some notable exceptions, however.

In addition to the unique, temporary IP addresses that are provided for each segment of a connection, a temporary multicast group address is also generated by the network control system server during connection setup. This multicast group address is provided to the workstation interface 140 as well as to the premises switch 110 at setup time. Unlike the temporary IP addresses, however, the multicast group addresses are universally used for segments of a connection. For example, in a 3-way connection between parties A, B, and C (assuming a single connection segment. If multiple segments, just repeat this for each segment) there would be 3 pairs of connection IP addresses assigned: one pair for the connection from A to B, one for B to C, and one for A to C. But, there would only be one multicast group address assigned. This is all that multicasting requires as multicast allows a packet sent to a single group address to be received by multiple parties in a group. It's a send once, read multiple method for transmitting information to a number of parties. If unicast was used, then for each packet, two separate write operations would be required.

Workstation interfaces 140 write audio/video traffic to the multicast group, not to the IP address of the other workstation interface(s) involved in the connection.

The workstation interface 140 and premise switch 110, as part of their connection setup processing, in addition to the functions already described, announce their membership in the multicast group (i.e., they join the group). This membership announcement is remembered by the IP stack so that when packets addressed to the group are seen by either the workstation interface or the premises switch, the IP stack knows that these are packets that the workstation interface and premise switch want to receive.

Multicast packets do not go through the NAT process described above. NAT is only needed for unicast traffic (web browsing, shared apps, etc).

I.C.12. Premises Switch Server Front End

It should be apparent from the above that an important feature of the premises switch is its ability to originate and terminate broadband connections. It should be further apparent that various functionalities of the workstation interface and the premises switch can be combined and divided in many alternative ways for different applications. This would allow, for example, the premises switch to act as a front end for servers or other intelligent network elements which do not have workstation interfaces connected to them (e.g., video web servers or ISDN (BRI or PRI) network gateways). This could be accomplished by including in the premises switch some of the same software functions as are employed in the user workstation and workstation interface, particularly connection management components.

An example of how the premises switch can be configured to originate and terminate connections for servers and/or network gateways is described below. It is important to note, however, that this example is merely illustrative of the various different ways the premises switch can be configured to accomplish different functions.

For video web servers, the premises switch can act as the terminator for all calls placed to the web server. This could be accomplished by including connection management software running as a process in the premises switch, in addition to special video server interface software. This software receives requests for playback of specific video titles which has been requested by the connection management software (via SDP) by selecting the special URL of the video we server. The video web server then sends a message to the video server to begin playing the requested title.

In this configuration, the destination address for the video output from the video server is defined as the IP address assigned by network control system server 40 for the video portion of the broadband connection. In addition, a control channel for relaying video management information such as pause, stop, fast forward, etc., is established between the user workstation and the video server. This control channel can be run either over the public Internet or over a separate broadband connection, which can be defined in the SDP request for the broadband connection.

II. City Nodes

Figure 41:
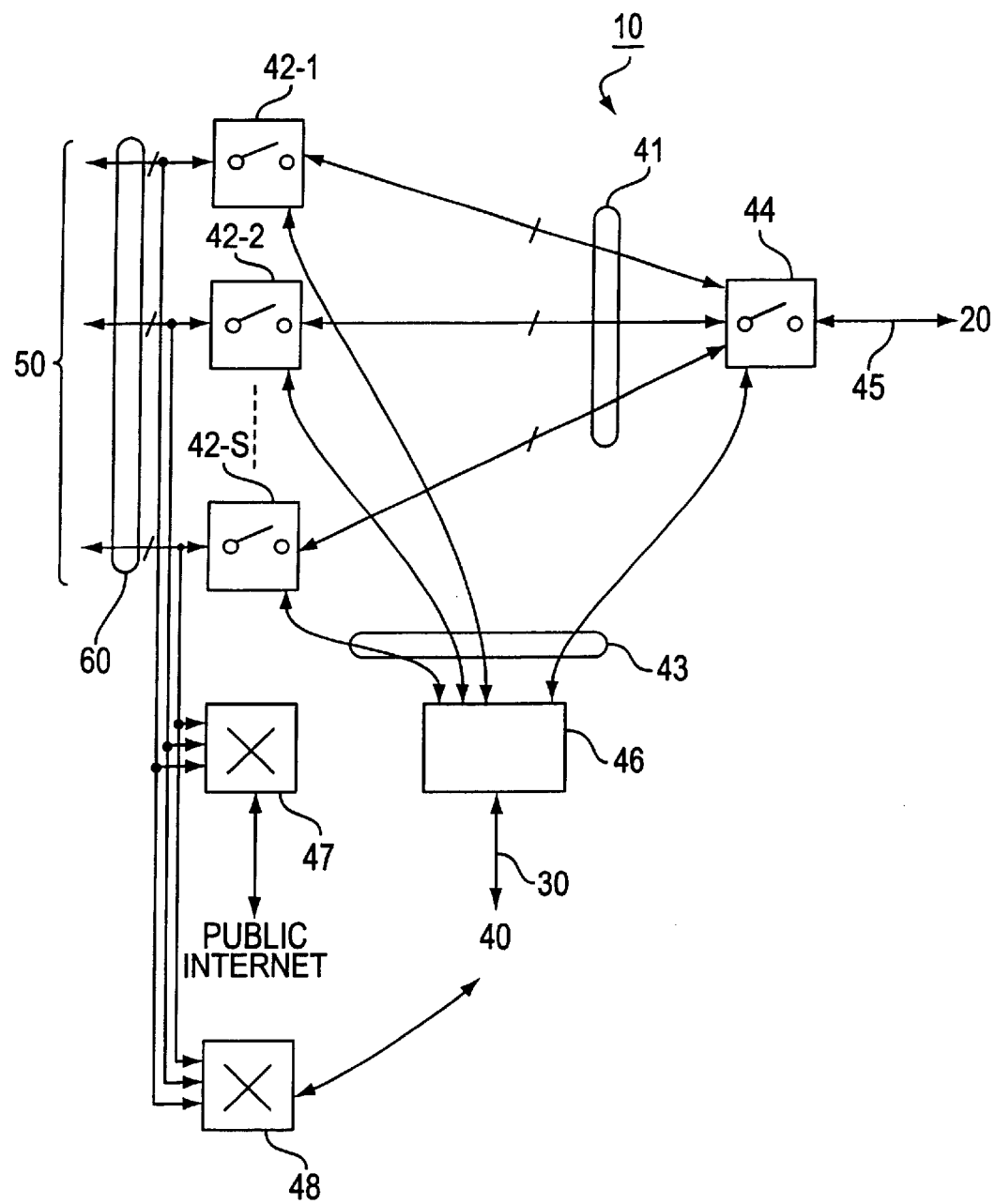
FIG. 41 illustrates an embodiment of a city node in accordance with the network illustrated in FIG. 1.

One embodiment of a city node 10 according to the present invention is shown in FIG. 41. It includes bearer channel switches 42-1 . . . 42-s connected to trunk switch 44 via trunk lines 41. Bearer channel switches 42-1 . . . 42-s are each also connected to one or more bearer channels 60, which are in turn connected to one or more local node 50. Trunk switch 44 is connected to the existing PSTN transport infrastructure 20 via trunk lines 45. Switch commander 46 is connected to each of the bearer channel switches 42 and trunk switch 44 via switch control lines 43. Switch commander 46 is further connected to the broadband network control system server 40 using signaling network 30. It should be noted that only certain ones or all of the bearer channel switches 42 in the city node can be connected to switch commander 46. Furthermore,-it should be noted that bearer channel switches may be of different types and manufacture other than standard PSTN. Bearer channel switches may actually switch physical or virtual channels. They may switch using TDM, ATM, SONET, ISDN or packets. It is one of the objects of the present invention, and new in the art, that a user's particular multimedia communication traffic can be carried transparently end-to-end using different types of underlying switching and data transport methodologies even on different segments of a given connection between two or more users under the common control of the network control system server 40. Furthermore, there may be more than one trunk switch 44 in the city node 10, and certain ones or all of them can be connected to switch commander 46.

It should also be noted that in this embodiment, city nodes 10 and local nodes 50 are physically located in different sites. However, this is not necessarily so. Certain elements of a local node 50, such as workstation interfaces 140 and premises switches 10, may also be located on the same premises as the city node 10.

In the example of the city node 10 of the invention illustrated in FIG. 41, bearer channels 60 are standard 64 kbps channels (i.e., DS0), 24 of which are multiplexed on a standard T1 carrier (i.e., DS1), trunk lines 41 multiplex 24 bearer channels, and higher capacity trunk lines 45 multiplex 672 bearer channels, i.e., DS3. Accordingly, bearer channel switches 42 preferably have a switching granularity of 1 bearer channel, and are able to cross-connect any number of up to 24 bearer channels of trunk line 41 (i.e., it is a "I/O switch" as known in the art). Furthermore, trunk switch 44 preferably has a switching granularity of 1 trunk line 41, that is, a DS1 line, and is able to cross-connect 24 bearer channels at a time from trunk line 45, which multiplexes 672 bearer channels (i.e., it is a "3/1 switch" as known in the art).

However, it should be noted again that the present invention also provides for transporting and switching multiple bearer channels of multimedia communication traffic as virtual bearer channels carried and switched as virtual bearer channel circuits over asynchronous communication transport facilities and switches such as ATM, and packet routers and switches that are capable of supporting guaranteed quality-of-service for switched virtual circuits.

As further illustrated in FIG. 41, city node 10 further includes Internet access router 47 for routing Internet data packets between the public Internet and broadband network users via bearer channels 60, thus providing Internet access to broadband network users without a local Internet connection. City node 10 also includes signaling network access router 48 for routing packets between the signaling network 40 and connected local nodes 50.

II.A. City Node Switches

Typically, switches 42 and 44 are existing switches owned by, and located in, the central office facilities of various telephone service providers, and are leased for use by the broadband network. Preferably, they are digital cross-connects (i.e., DACS, for example an AT&T DACS IV), but they can also be ATM switches, or end-office or tandem POTS circuit-switches. To support the different types of switches mentioned above the switch commander software is preferably equipped with the particular control protocol translation software that is required by a specific type and/or brand of switch to be controlled. Although the details of these control protocols are often specific to particular brands and/or types of switches, the general functionality provided by these control protocols are common to all switches (e.g. connect port x to port y, disconnect port x from port y, report that requested connection failed for reason n, etc.). The switch commander acts as a translator between the specific detailed control signals required by a particular brand and/or type of switch and generic control signals for controlling any kind of switch. Switch commanders and the network control system server communicate with each other using the private signaling network 30 to actually establish or remove switched circuit pathways with the required amount of bandwidth for a particular user requested connection, regardless of the particular type of switches actually used in particular segments of a user's connection.

Typical cross-connect switches have two to four control ports for external control and testing. These ports are normally used to provide administrative control and testing of switch functions, interfaces to network management and alarm systems, and (in the case of a typical cross-connect switch) access for technicians to manually connect and/or disconnect cross-connections between bearer channel ports on the switch. Switch interface lines 43 preferably attach to at least one of these control ports or indirectly through an existing network management system already in use by a particular carrier.

II.B. Switch Commander

Switch commander 46 controls cross-connect switches 42 and 44. The commander serves as the interface between network control system server 40 and switches 42 and 44. Primarily, switch commander 46 works to queue and translate commands sent between signaling network 30 (preferably TL1 X.25 commands, but often commands that are proprietary to a particular switch) and the particular command language of the underlying switches. It also collects auditing and billing information about switch operations so the carrier can bill and audit broadband network charges appropriately for the use of a switch that is part of its infrastructure.

II.B.1. Switch Commander Configuration

Figure 42:
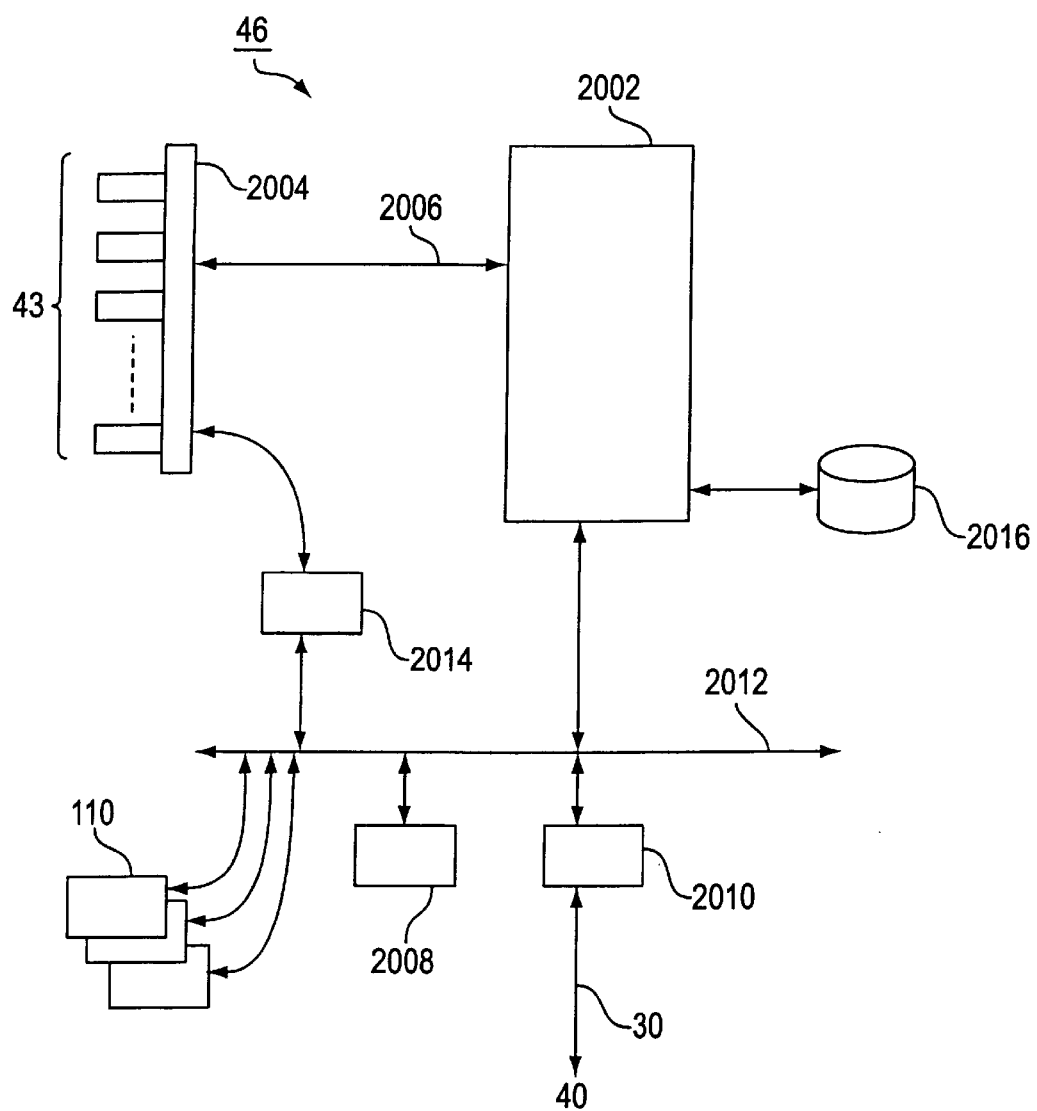
FIG. 42 illustrates a switch controller in a city node such as that illustrated in FIG. 41.

An example of a switch commander 46 in a city node 10 such as that illustrated in FIG. 41 is illustrated in FIG. 42. It includes a command controller 2002 that communicates switch commands to switches 43 attached to switch ports 2004 via port lines 2006. In this illustrated example, switch commander46 also includes a local network 2012, a router 2008 and a signaling network interface 2010. Signaling network interface 2010 communicates with the network control system server 40 via the signaling network 30. Premises switches 110 that are physically located at the city node may interface with a switch commander 46 via local network 2012. Moreover, switch commander 46 includes an auditing database for storing billing and auditing files relating to broadband network connections made via this particular city node 10. A carrier interface 2014 is further provided so that the carrier can directly access and control the switch ports 2004, and can access the billing and auditing files stored in auditing database 2016 via local network 2012 and command controller 2002.

It should be apparent that the above components can be implemented in many known ways. However, it is preferable that command controller 2002 is a SPARCstation running Solaris 5.5.1 (trademarks of Sun Microsystems, Inc.), that switch ports 2004 are X.25 ports, and that local network 2012 is an Ethernet. Command controller 2002 also preferably provides a telnet session to carrier interface 2014 for accessing auditing database 2016, for example.

In the preferred embodiment, switch commanders are implemented on both Sparc and X86 platforms, and use TCP/IP in general, and Telnet specifically, to communicate with switches 43. Switch commanders generate their own audit information that is stored in auditing database 2016 that can be used for comparison with carrier records corresponding to the controlled switch itself. Switch commanders can also receive status information from the underlying carrier's network management systems. Most importantly, the status information includes alarm information that is used both by the network control system server 40 directly (for routing around problems) as well as in the customer support system as a part of network management information which can be acted on by managers of the broadband network.

Alternatively, switch commanders may be located in an ATM-based environment. In this case, the switch commander may also include an ATM network interface card and an Ethernet network interface card for access by the carrier. Or, the switch commander can include a Cisco 2500 or 7xx class card-based router, plus an outboard ATM CSU/DSU. This provides flexibility, as well as firewailing and routing capabilities.

As another alternative, switch commanders may be physically located at the site of the network control system server 40. In this case, X.25 is carried over leased lines to the appropriate DACS to be controlled, while the switch commander itself is accessed via the network control system server's own Ethernet. If such configurations of switch commanders are provided, an Internet subnet may also be provided with appropriate firewalls and security so the carrier providing DACS switching services can be provided with access to billing and auditing records from the switch commander.

II.B.2. Switch Commander Operation

Figure 43:
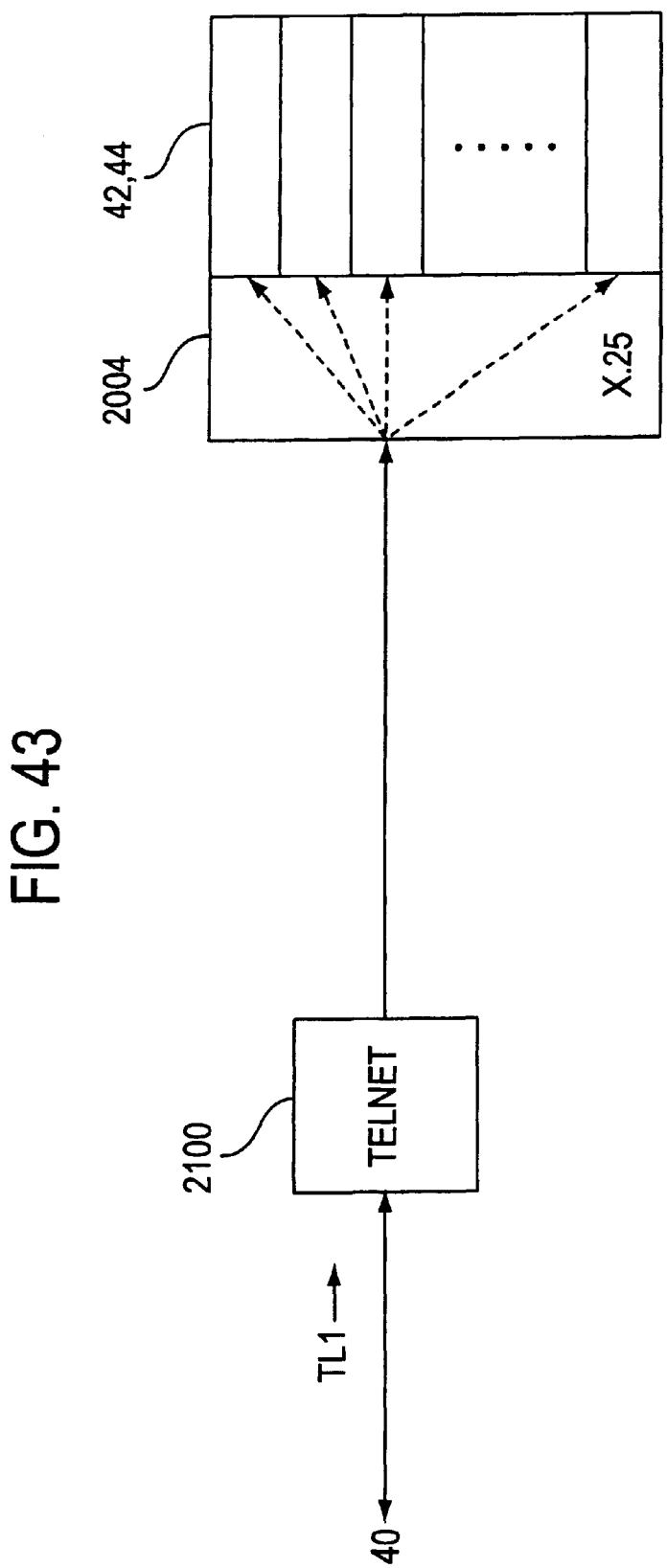
FIG. 43 is a passthrough function diagram of a switch controller such as that illustrated in FIG. 42.

FIG. 43 illustrates a passthrough function of a switch commander 46 such as that illustrated in FIG. 42. As illustrated in FIG. 43, according to one aspect of the invention, the switch commander provides pass-through of command-line TL1 commands from a teinet session 2100 to an X.25 TL1 port 2102 on the underlying DACS cross-connect switch (assuming that TL1 is the command language of the DACS cross-connect switch). It should be apparent that this pass-through must use the normal facility naming scheme for the DACS cross-connect switch and must use the same transaction ID space for TL1, etc. As such, the switch commander is preferably able to act as a completely passive passthrough.

According to another aspect of the invention, the switch commander can provide partitioning of the underlying switch resources of the city node 10 that have been leased to the broadband network or another virtual carrier by the real carrier. These switch facilities 2150 include, in addition to switches 42 and 44, trunk lines 41 and 45 and bearer channels 60, which are all ultimately under the switching control of switches 42 and 44. A partition is a collection of one or more of these facilities. In particular, a partition represents the subset of the total ports available on a cross-connect switch that are assigned for use by the broadband network, leaving the remaining ports available for use by the real carrier. Facilities 2150 can be physical or virtual. That is, a 3/0 switch is a physical facility, whereas a single DS0 in the 3/0 switch is a virtual facility. Both are facilities available for use by the broadband network because both can be assigned for use in establishing circuit-switched connections by the network control system server at will by accessing the control ports on the 3/0 switch.

Figure 44:
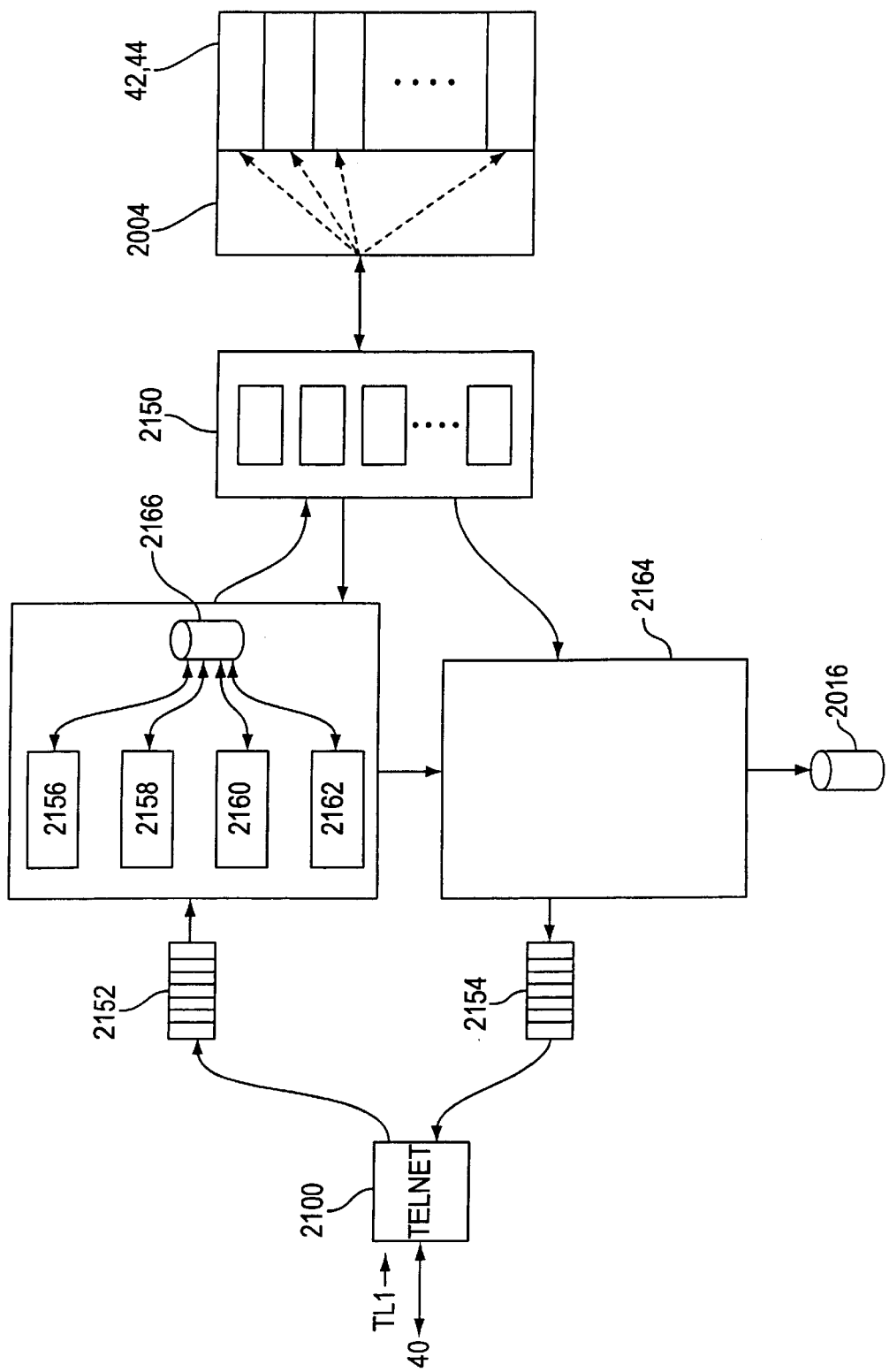
FIG. 44 is a partitioning function diagram of a switch controller such as that illustrated in FIG. 42.

FIG. 44 illustrates the partitioning function of a switch commander such as that illustrated in a FIG. 42. As illustrated in FIG. 44, in addition to providing telnet session 2100, the switch commander includes input queue 2152, output queue 2154, a provisioning interface function 2156, a partition-specific facility naming function 2158, a partition security function 2160, a partition-specific TL1 command function 2162, and an output handling function 2164.

Partition provisioning interface function 2156 stores and manages information in partition database 2166 relating to which switch facilities 2150 are parts of which partitions. There are no specific technical limitations on the number of partitions which can be supported. Practically, however, managing large numbers of partitions becomes unwieldy. Therefore, in cases where switches are heavily partitioned, multiple switch commanders are preferably provided.

Partitions are maintained by the broadband network's provisioning system, which is described in more detail in the network control system server section. The provisioning system allows a broadband network operator to enter information about switches and facilities into a central database that provides information needed by various components of the network control system server 40. The most notable of the components that require such information are the switch shadows and facility translation functions in the network control system server, as well as the switch commander itself. Partition information is then loaded by the switch commander at startup time by accessing the provisioning database within the network control system server 40 via the signaling network 30.

The switch commander and provisioning system need to have the same facility maps because if they do not agree, then either the network control system server 40 will try to switch facilities that it is not authorized by the facilities' carrier to switch, or the network control system server 40 will not make full use of all the facilities which the carrier has made available for use by the broadband network. The two systems. are kept in agreement by means of an electronic exchange of information between the carrier's network management and provisioning system and the network control system server's provisioning system. This exchange of information can be performed using the switch commander as an interface.

Partition-specific facility naming function 2158 permits underlying physical facilities to be named with variable naming schemes (e.g., to consolidate a fragmented namespace, or to use non-T1.238 names). The names of facilities within a partition may be the normal physical (or virtual) facility name offered by the DACS cross-connect switch. However, since the broadband network may name facilities in a scheme that is not compatible with the underlying switches, it may be necessary to map these facility names into the naming utilized by one or a plurality of the DACS cross-connect switches. Alternatively, such mapping may be performed by the network control system server 40, in which case a switch commander would only recognize facility names consistent with the underlying DACS. Switch commanders are programmed to know how to talk to a particular switch, in terms of commands which can be sent to the selected switch ports 2004. The network control system server translates the facility names into their switch-specific format through a facility translation function and provides the switch commander with requests which include facility names in the native form for the specific type of switch that the switch commander. is controlling.

Partition-based security function 2160 provides a mechanism for ensuring that the definition of a particular partition can not be modified by the actions of the users of other partitions. In this regard, it should be noted that partitions may share several facilities 2150, particularly physical facilities such as switches 42 and 44. If the underlying DACS cross connect switches, for example, can only process so many connections per second, then any virtual carrier can freeze out any other one simply by executing connections fast enough itself. Preferably, the security function prevents such a denial-of-service attack.

It should be further noted that the switch commander preferably reports all events to output handling function 2164 for alerting the network control system server 40. For example, all OOS/MOS/etc., events must be reported, and any event referring to a facility that is associated with any partition must also be delivered to the software function in the network control system server that maintains that partition. For example, in a pure 1/1 switch, if a particular DS1 was to lose synchronization, then that DS1's OOS event would need to be delivered to the physical-layer carrier and to whichever virtual carrier's partition included that DS1. However, in a 3/1 switch, the DS3's themselves can go out of service, and so can the underlying DS1s. It's conceivable, even probable, that two virtual carriers would own DS1s in any given DS3. So if that DS3 fails, it is important to deliver the OOS indicators for each of the DS1s to the software functions maintaining the appropriate partitions.

Output handling function 2164 further translates errors, warnings, acknowledgments, complete notifications and other responses, translates them from the switch command language, if necessary, and relays them back to network control system server 40 via output queue 2154. All actions and events are recorded in auditing database 2016.

Partition-specific TL1 command function 2162 supports the ability of the network control system server 40 via signaling network 30 to enter TL1 commands specific to each partition. That is, function 2162 takes TL1 commands received from network control system server 40 via input queue 2152, determines, from database 2166, and in cooperation with naming function 2158, which facilities are associated with that partition, translates the commands, if necessary, to the token set appropriate for each facility, then ensures that the translated to commands are sent to the appropriate facilities 2150.

Moreover, the switch commander unifies its non-passthrough TL1 environment. That is, the TL1 presented at the partition interface will not change between underlying switches, even though they may work on different command languages and control interfaces. Also, a "unified" physical-layer TL1 interface (that is, one that does not use partition-based naming and has access to all ports) will be provided. This limits the transparency of the switch commander, but is necessary to make virtual carriers a reality. Each model of DACS that is supported by the switch commander has its own model-specific driver that handles the restrictions or particular physical or datalink requirements of that specific DACS.

The command protocol between the switch commander and the network control system server 40 via telnet session 2100 is preferably based on TL1 commands, but it preferably also allows for some additional information to be passed, particularly for relay to the premises switches 110.

Alternatively, the command language protocol may be based on protocols other than telnet (X.25, etc). Moreover, the switch commanders may provide SNMP- or CMIP-based management, along with support for SNMP or CMIP proxy of the DACS itself by the switch commander.

It should also be noted that many of the functions provided by the switch commander depend on the abilities of the switch facilities of the particular city to node 10. For example, some facilities may be high performance switches, such as AISwitches made by Applied Innovation, Inc. of Dublin, Ohio, to interface to the control ports of their DACS cross-connect switches. The AISwitch is a high performance, highly available terminal concentrator designed for central office environments. As such, it can be configured so that someone connecting on an X.25 port gets a telnet session to some TCP/IP machine, or vice versa, or any combination of such serial, X.25, full OSI, or TCP/IP protocols that work in that fashion. It recognizes TL1 message sets as one of its terminal interfaces, over any of TCP, X.25, or full OSI. In that fashion, it already implements many of the provisioning functions of the switch commander described above. In addition, it could be configured to hand-off X.25-based management sessions from OSs to the switch commander via telnet, thus supporting some transparencies that a stand-alone switch commander wouldn't necessarily support.

Moreover, some carriers may not permit access into the X.25 net that directly controls the underlying switches. Rather, these carriers only provide access via a service that bandwidth providers access via a LAN. One such system is CNC, provided by Teleport Communications Group. The switch commanders in this case would have the ability to interact with CNC and translate network control system server commands into the command set of CNC.

II.B.3 Switch Commander Software

The switch commander software module is essentially a translator. The basic functions are:

1. Take commands from the network control system server 40 and translate them to an intermediate token set
2. Take the intermediate token set and translate that to carrier commands for the underlying switches
3. Send those commands to the carrier via the protocol required by the carrier.
4. Take information items, including errors, warnings, acknowledgements, complete notifications and other responses from the carrier and translate them to an intermediate token set
5. Handle those other information items appropriately. Either:
   a. Translate them to network-specific information and send to the network control system server 40 for FYI or action, or
   b. Send them to the network control system server directly without change
6. Monitor the carrier for alarms and for its nightly provisioning information dump
7. Capture that information and send it to the network control system server without translation
8. At each action taken, write a copy of the activity to a disk file as an audit trail When the switch commander is associated with a switch resource in a carrier using a CNC system, there is one pair of processes for each DACS or "switch" controlled through CNC. One of the pair is bidirectional and is used for switching. The other is unidirectional (from CNC to the switch commander) for alarms. There is one pair of hard queues for communicating with the network control system server 40. One queue will be for sending, and the other will be for receiving. There is one network-to-switch commander connection set per carrier, and one switch commander-to-network connection set per switch for each carrier. The switch commander understands which CNC system it speaks to by means of a startup configuration file, and will talk to CNC via telnet port 23. The hard queues are set up by using a configuration file parameter.

When the switch commander is acting as an audited passthrough system only, it does not act on the information. The communication protocol with the network control system server 40 is TL1 based and may simply be TL1. The intermediate token set is based on the functions to be accomplished. The switch commander preferably employs enough RAM to keep the token set locked in memory along with some stacks and other information, so as to eliminate paging out, thereby keeping response times minimal.

Some of the important functions supported by the intermediate token set include:

1. Set up a group of bearer channels and connect them
2. Start a broadband network connection
3. End a broadband network connection
4. Tear down a crosspoint connection
5. Report error conditions and status
6. Provide provisioning information from the carrier to the network server
7. Provide an audit trail It should be noted that the network command translation function of the premises switches preferably presents the same interface to the network control system server as that provided by the switch commanders, including the above function set and intermediate token set, so that setting up a connection is uniform from the viewpoint of the network control system server.

III. Network Control System Server

Network control system server 40 preferably includes functionality of conventional large-scale SCPs typically used in ISDN or ISDN-flavored systems, such as participating in a connection-setup protocol to decide which switching components, trunks, and slots to use to complete a connection. Importantly, however, network control system server 40 differs from conventional SCPs in at least three ways:

1. It is scalable to handle large numbers of simultaneous connections from a single center.
2. It is based on TCP/IP protocols rather than ITU protocols.
3. It is intended to set up TCP/IP connections, and thus it also participates in TCP/IP routing table management.

For reliability and stability, network control system server 40 actually comprises one or more farms of computing equipment which each calculate circuit-switched connection routes, control switching and user terminal equipment, and provide network provisioning, monitoring, and management.

Each farm is located at one physical data center; these data centers may be dispersed globally. Any subset of the broadband network may be served by one or more farms; a farm may serve more than one subset of the broadband network. At any given time, only one farm is controlling any one subset of the broadband network; however, in the event of failure, other farms automatically take over management of the missing or out-of-contact data center.

In the preferred implementation, the software processing entities described below each run on disjoint subsets of each farm. However, this is not a requirement of either the invention in general, or of the preferred embodiment. It is possible for all these entities to be implemented on a single hardware device. In all cases and embodiments, however, the fundamental messaging model used for communication between entities is preferably based on Internet protocols well known in the art, such as TCP/EP and multicast UDP/IP.

Figure 45:
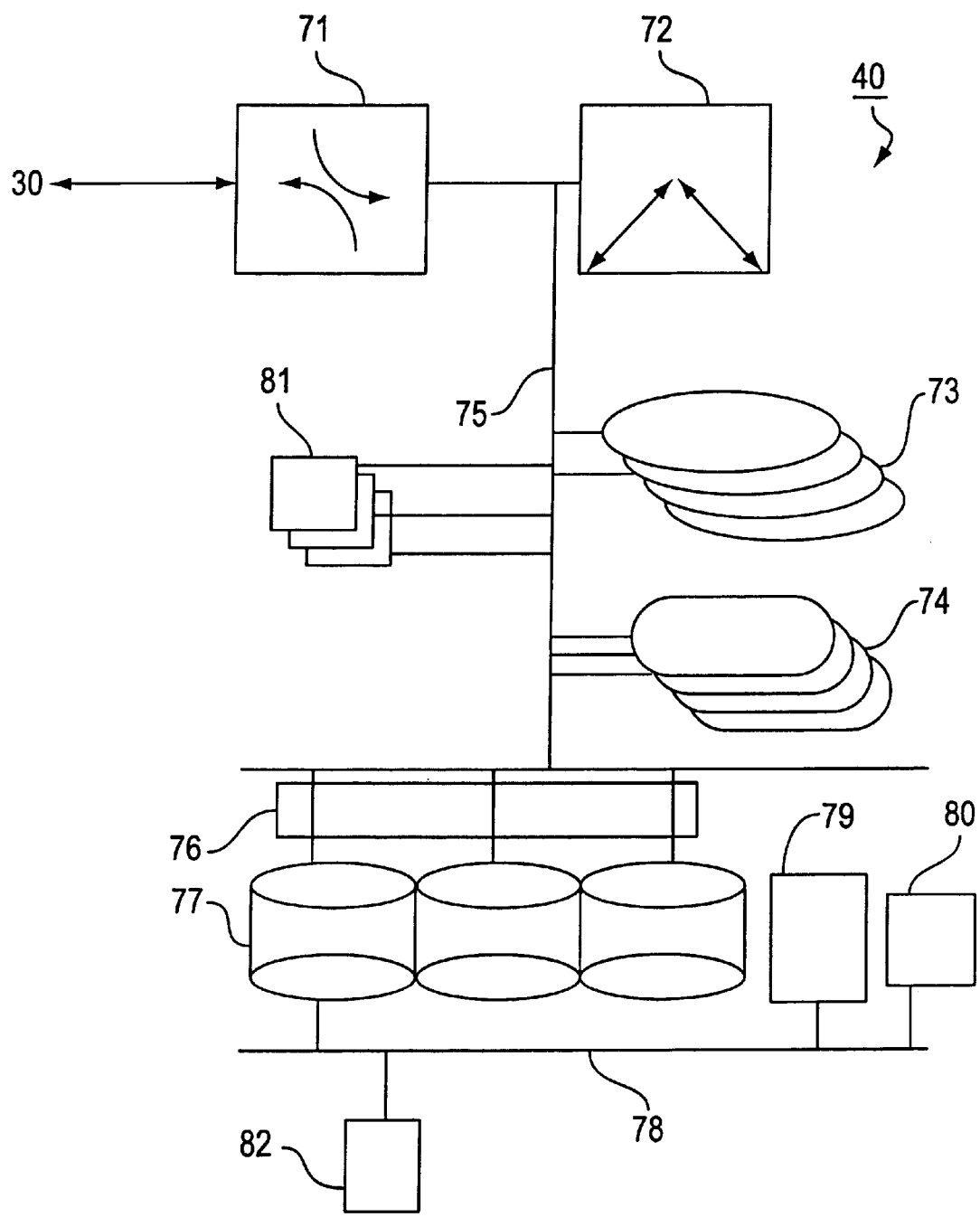
FIG. 45 illustrates an embodiment of a network control system server in accordance with the network illustrated in FIG. 1.

An embodiment of one farm in a network control system server 40 according to the present invention is shown in FIG. 45. As can be seen, it includes a router 71, a director 72, route controllers 73, switch monitors 74, a database server 76, and signaling network interfaces 81, all connected on a high speed local network 75. The database server 76 provides access to disk array 77. Disk array 77 is also attached to low speed local network 78 for maintenance and billing. Also attached to low speed local network 78 are provisioning manager 79, graph calculator 80, and billing management component 82. Signaling interfaces 81 provide communications to all network elements connected via signaling network 30 and router 71. Signaling interfaces 81 and route controllers 73 are shown as a plurality of elements to clarify the aspect that there may be more than one of each active at a time. The number of switch monitors 74 corresponds to the number of switch facilities in the network, but each have the same functionality and preferably present the same interface to other elements of the network control system server.

In the embodiment illustrated in FIG. 45, router 71 is a Cisco System 7xx made by Cisco Systems of San Jose, Calif., director 72 is a redirector made by Cisco Systems, high speed local network 75 is a 100 baseT Ethernet, route controllers 73, switch monitors 75 and signaling interfaces 81 are software processes running on Unix boxes, database server 76 is a parallel database manager made by Oracle Systems, Inc. of Redwood City, Calif., disk array 77 is a high-availability disk array, provisioning manager 79, graph calculator 80, and billing management component are software processes respectively running on standalone computers, and low speed local network 78 is a 10 baseT Ethernet. It should be apparent, however, that various substitutions and modifications can be made to this embodiment in terms of how each component is implemented via hardware or software, or combination of the two.

III.A. Network Control System Server Route Management

In contrast to traditional route management systems, such as those used in traditional telephone networks which are specific to the types of circuits and switching being controlled, the route management subsystem of network control system server 40 maintains a route database in disk array 77 that stores information about all circuit facilities and switches in a uniform fashion, regardless of what type of transport or switching mechanisms are actually used for any given connection or route. In the present invention, circuits are modeled at two levels of abstraction: the physical level, which is required for monitoring network failures, supporting billing, and remunerating bandwidth providers, and the network level, which is required for identifying the routing protocols to be used in the setup of an end-to-end connection. All routing decisions are made at the network level (as they are currently done in the Internet, for example). However, routing decisions in the broadband network may include setting up entirely new Internet subnets to isolate the bandwidth available for one application or set of users from others in a dynamic fashion.

There are three ways in which the network control system server routes traffic: circuit-switch routing, packet-switch routing, and reserved-circuit packet-switch routing. The network control system server controls the particular way in which a given set of traffic will be routed at any given time.

The underlying circuit-switch routing and packet-switch routing decisions are then implemented by the various network elements, including DACS switches (or other types of physical or virtual circuit switches), premises switches, and city node signaling network access routers. Packet-switch routing tables are transferred among city node signaling network access routers and the Internet via conventional Internet routing protocols.

Every user in the broadband network has a network user name and at least one routable phone number. The routable phone number is derived from the IP address of the user's premises switch 110, and the MAC address of the user's workstation 100. These are combined as:

n:n:n:n:n:I:I:I:I:M:M:M:M:M:M where I is the IP address of the user's premises switch, M is the MAC address of the user workstation, and n is a prefix. Together, this forms a 128-bit address which is designed to form a legal IPv6 addressing scheme.

Since the IP address of the premises switch is included in the broadband network user's routable phone number, this number can be used to readily to determine the route between any two users in the network with any intermediate number of city nodes when a connection is requested between the two users, or by precalculating a list of routes, as will now be explained in more detail.

Figure 46:
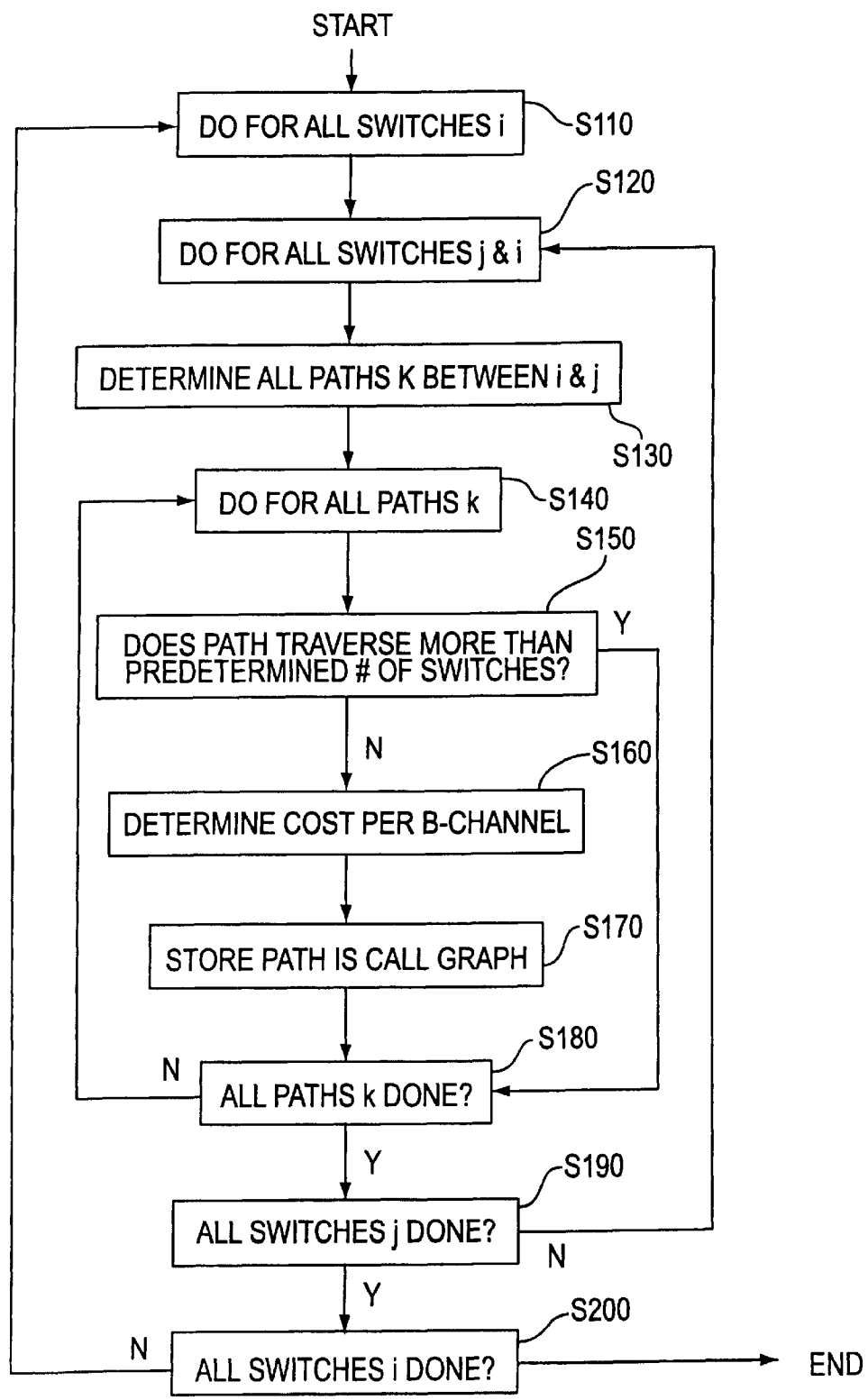
FIG. 46 is a flowchart showing a process for building call graphs in a graph manager of a network control system server such as that illustrated in FIG. 45.

As illustrated in FIG. 46, graph calculator 80 pre-computes, between every existing premises switch 110 in the network (S110, S200), all possible paths through all known switch resources (S120, S130, S140, S190, S180), tagging each path with its cost per B channel (S160). If a particular path exceeds a predetermined number of traversed switches (S150), the path is discarded, otherwise it is stored. The resulting list of paths is called a call graph and is stored in disk array 77 (S170).

Each entry in the call graph can have a form such as:

| <Premises Switch 1> | <Premises Switch 2> | Count | Cost | Capacity |
|---|---|---|---|---| where <Premises Switch1> and <Premises Switch> are the adresses of the endpoint premises switches, count is the number of hops in the route, cost is the cost in dollars/kb/sec, and capacity is the bandwidth in kbps.

Preferably, graph calculator 80 re-computes the call graph every time new premises switches and switch resources are added to the network, as described in more detail below.

III.B. Network Control System Server Facilities Management

Bandwidth resources available to the network are managed in terms of facilities. A facility is an independently serviceable connection between any two nodes in the network, meaning that the facility can be taken out of service or put into service independently of any other connections between those two nodes. A facility is node-pair specific; if, for example, a DS1 connects two nodes in the network, but happens to be multiplexed onto a DS3 by multiplexers that are not visible to or controllable by the switching resources of the network, the DS1 is a broadband network facility. Facilities information is stored in disk array 77 via the provisioning manager 79, as explained in more detail below.

Facilities are named globally in the broadband network. That is, both ends of a circuit know the same wire by the same network name, and both ends of the wire can be determined from that name. If a facility is multiple access, the entire reachability graph of the facility will be encoded in the database.

A large amount of information is cross-referenced for each facility for network management purposes. For example, a single DS3 facility (from the network's point of view) may actually be a leased line composed of segments from more than one carrier. In that case, each carrier's circuit ID and switching facility numbers are recorded with reference to the DS3 in order to maintain the overall DS3 facility.

A) A facility may be hierarchical. That is, a DS3 facility may have DS1, DS0, SMDS, or ATM components related to it; therefore, the different components of which the facility is composed are recorded in the database. Accordingly, a command which switches up these different components of such a facility can provide the full path to the specific component within the facility that is desired to be used. For example, if a connection requires B channel number 3 of DS1 number 7 on a DS3 facility named AXC1000932, the path to the circuit is AXC1000932/7/3.

Preferably, switch names are encoded into facility numbers for point-to-point links, and a reserved entry may be used for SMDS rings and other multiple-access facilities. In other words, a facility A:C:nnnnnnn might represent a connection between switch A and switch C. This makes snooping the gozinta a little easier, at the expense of larger tables and more difficult provisioning rules.

Components within a facility can be expressed in ranges. A circuit range is a range of components within a single facility. However, although ranges of components within facilities are expressible; ranges of facilities are not. For example, AXC1000932/7/3-23 describes a 20-channel allocation of some channel called 7 of some facility named AXC1000932 (for example,. a DS3). An expression such as AXC1000932-AXC1000940, however, is an impossible formulation because it expresses a range of facilities (i.e., all nine facilities numbered AXC1000932 to AXC10009490). This restriction helps to maintain the independence of facilities from each other.

Figure 47:
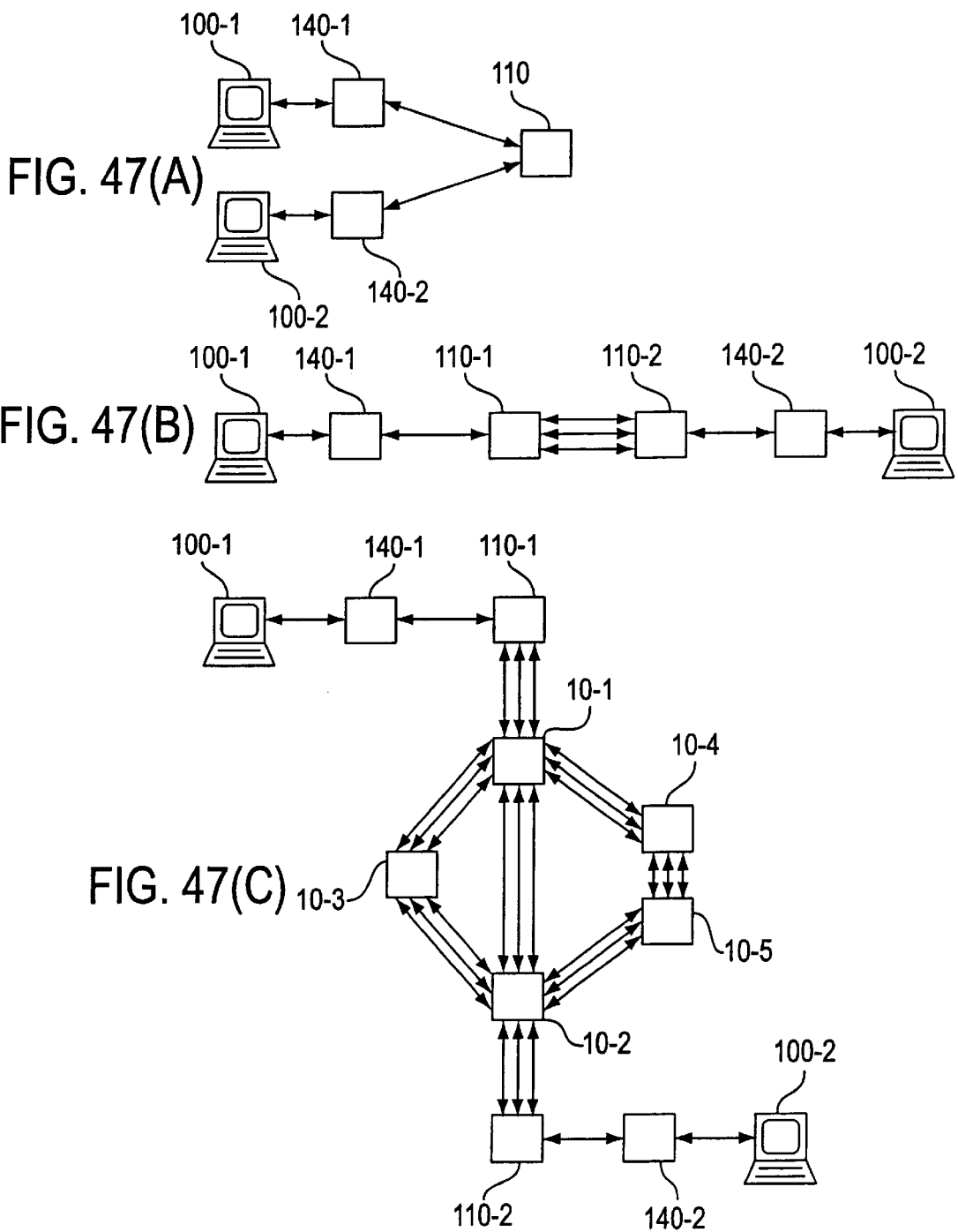
FIG. 47(A) through FIG. 47(C) illustrate the levels of facility management complexity in a network control system server such as that illustrated in FIG. 45.

FIG. 47 illustrates the levels of complexity of facilities in (not necessarily exclusive) examples of the broadband network according to the invention.

FIG. 47(A) is a minimalist configuration of two network user workstations 100-1 and 100-2 sharing a common premises switch 110 via respective workstation interfaces 140-1 and 140-2. In this example, the two users may or may not be commonly connected to the same LAN. In any event, there is no "facility" in this example because there is only one premises switch, and so there are no connections between nodes for the network to manage. Moreover, the bandwidth available between the two users is fixed in terms of the respective connections between the users and the premises switch.

FIG. 47(B) illustrates a configuration of two network user workstations 100-1 and 100-2 respectively connected to two premises switches 110-1 and 110-2 via respective workstation interfaces 140-1 and 140-2. The two premises switches are directly connected to each other via one or more connection or "facility," which may have fixed or variable bandwidth.

FIG. 47(C) illustrates a configuration of two network user workstations 100-1 and 100-2 respectively connected to two premises switches 1101 and 110-2 via respective workstation interfaces 140-1 and 140-2. The two premises switches are respectively connected to city nodes 10-1 and 10-2, which are connected to each other via one or more connection or "facility," each having fixed or variable bandwidth. The two city nodes 10-1 and 10-2 may be further connected to one or more other city nodes such as 10-3, 104, and 10-5 via other connections or "facilities" managed by the broadband network.

III.C. Network Control System Server Provisioning

The provisioning manager 79 of network control system server 40 collates information from various carriers (bandwidth providers that may be providing underlying switching or transport capability to the broadband network), along with manually input information, to create uniform capabilities for both Internet service and other telephony services.

The provisioning manager 79 cooperates with the graph calculator for performing call graph and path calculation. This provides the other subsystems in network control system server 40 with pre-calculated circuit routing paths and costing information. The availability of such pre-calculated and costed paths at circuit connection time speeds up the processing for creating on-demand switched circuit connections substantially. This pre-calculation and costing of possible switched circuit paths is novel in the art.

Provisioning management is done using the same data model as used in the graph calculator 80. Collections of circuits are identified with an Internet subnet address, and thus correlated into a large, uniformly addressed group of circuits.

Grouping circuits into Internet subnets is an important feature of the invention and allows a uniform routing schema that is independent of the type of connection that needs to be established (i.e., packet-switched or circuit-switched). This frees the network from the constraints imposed by conventional circuit routing and switching techniques, that are based on telephone numbers.

Figure 48:
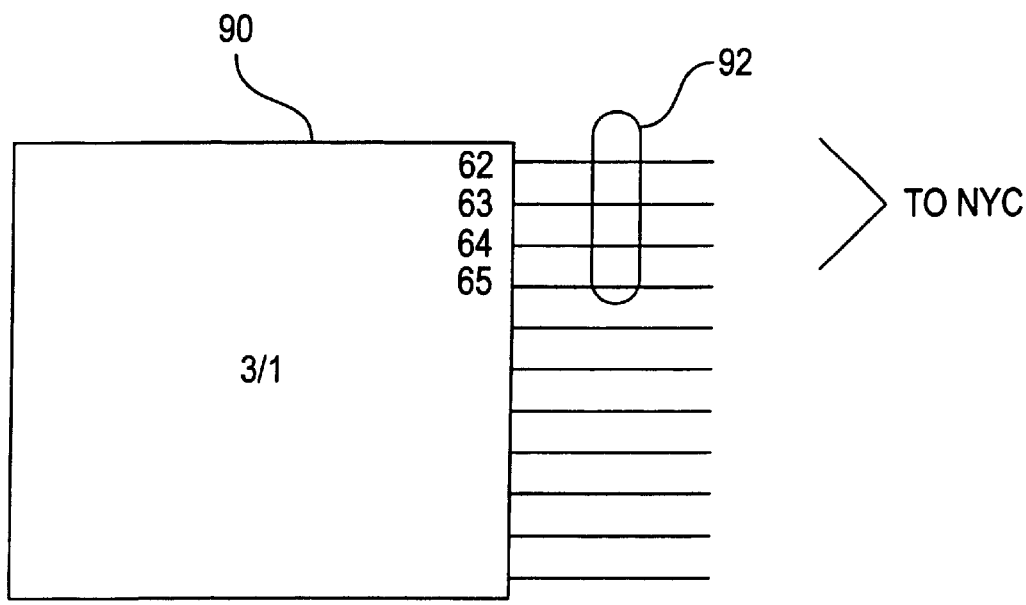
FIG. 48 illustrates the identification of circuits in terms of Internet subnets in accordance with the principles of the invention.

FIG. 48 further illustrates this feature. In this example, switch 90 is a 3/1 switch, and trunk group 92 is a collection of DS1 facilities having a common destination (e.g. New York City). Conventionally, trunk group 92 would be identified by a number, stored in a trunk group table with the listing of individual facilities contained therein, and the trunk group number associated with a phone number (e.g. area code 212). To route a connection through this switch would require looking up the trunk group number, then looking up the circuit number of the particular facilities belonging to that trunk group.

In the present invention, on the other hand, trunk group 92 is identified with an Internet subnet address (e.g., 192.168.3.0/30, where 30 is the subnet net mask, as is well known in the art). The facilities information stored for this subnet could be as shown in the following table:

| Subnet | Bandwidth Range | Facility |
|---|---|---|
| 192.168.3.0/30 | 0–1535 | 62 |
|  | 1536–3071 | 63 |
|  | 3072–4607 | 64 |
|  | 4608–6143 | 65 |

It should be apparent from the foregoing that defining the switch resources in terms of Internet subnets permits the use of IP-like routing for all types of connections. This feature, coupled with the present invention's signaling network communicating with premises switches and switch commanders as described above, permit connections of any type with variable bandwidth on demand, all with the added user convenience and system simplicity of a uniform interface and control.

Provisioning management information can also be generated manually by users, their sales representatives, carriers (i.e., bandwidth providers, either resellers or sub-contracted bandwidth suppliers), or by network engineering personnel.

The network control system server performs at least two main kinds of network resource provisioning: increasing or decreasing bandwidth between two nodes, and adding whole new routes. The latter, for example, adding the first trunk between two switches, or deleting the last one, is an important change, as is adding a switch. The former type of provisioning, such as adding a new link between already-connected nodes, meanwhile, simply adds to the aggregate capacity for a path; since the call graph does not store the utilization information (that has to be global to all graphs, and is done in the switch monitor databases), adding or reducing capacity is not as difficult.

Adding a new switch, or adding the first facilities between two switches, requires adding the new switch or capacity to all the relevant call graphs. Depending on the number of premises switches in use in the network, this is a potentially large update, and may take quite a while to compute. Preferably, therefore, this task is performed by utilizing a mirrored disk array, so that old call graph information can still be used while it is being updated.

The basic outline for such a task is as follows:
1. Current call graph data is kept in a tablespace that is mirrored by another tablespace in disk array 77, both of which are read-only to the network control system server processes.
2. Graph calculator 80 computes the call graphs, as described above, and such data is stored in the current call graph data tablespace in disk array 77.
3. When new switch resources are added, this information is received by provision calculator 79, which instructs the graph calculator to update the call graphs.
4. Graph calculator 80 breaks the mirror on the call graph tablespace. The "current" call graph tablespace continues to serve the network control system server.
5. Using the updated resource information, graph calculator 80 computes the new graphs. This involves a potentially very lengthy computation. It should be noted that graphs must be limited in length to control the size of this calculation.
6. When the new graphs are computed, graph calculator stores them in the "updated" call graph tablespace.
7. When all graphs have been updated (i.e., one batch of facility updates has been completed), the mirrors are fused again. No new updates are allowed until the mirrors have caught up, at which time the mirror can be broken again, and the process repeated.
8. This cycle can be executed as often as necessary, based on the time it takes to compute the call graph.

It should be noted that the above process can be performed for removing switch resources and for adding or removing premises switches.

III.D. Network Control System Server Call Management

The route controllers 73 of network control system server 40 illustrated in FIG. 45 establish reserved bandwidth for connections within the broadband network. As would be expected of any circuit-switch control environment, route controllers 73 perform two major functions: connection setup and connection teardown. The route controllers of the present invention, however, are differentiated from conventional circuit-switch systems by their use of Internet Protocol internal addressing (as distinguished from normal telephone dialing plan addressing), by their simultaneous evaluation of multiple routes, and by their use of a unique multicasting technique for control of the setup and teardown transactions. These differences enable the route controllers of the present invention to practically and very efficiently combine the capabilities of existing circuit-switched networks with the capabilities of the existing packet-switched infrastructure of the Internet for seamless access and control by an end-user and, as such, make it novel in the art.

The process of setting up or tearing down a switched-circuit connection in the broadband network is accomplished with cooperation of the signaling interfaces 81 and switch monitors 74. There may be more than one kind of signaling interface in a particular embodiment of the invention. That is, each signaling interface 81 may implement a particular signaling protocol, such as the ITU standard signaling protocol Q.931 or other actual and de-facto telephone and Internet signaling standards, as are known well to those versed in the art.

The signaling interfaces, route controllers and switch monitors also use database server 76 available as part of the network control system server 40 to store information in disk array 77 about connection reservations that are established, billing status, and network operations status. Database server 76 and disk array 77 can be implemented in many ways known to those skilled in the art.

III.D.1. Network Call Setup

When a new connection is to be made within the broadband network, the originating workstation interface 140 sends a connection setup request to network control system server 40 over signaling network 30, preferably via TCP. The TCP/IP connection between the originating workstation interface 140 and network control system server 40 lasts until the requested connection is connected or released; if the socket breaks before one of these states is reached, the connection must be released.

Signaling interfaces 81 receive bandwidth reservation requests from network elements which require the bandwidth (typically user workstations 100 or workstation interfaces 140 using software described in Section I). The signaling interface is responsible for contacting any other network elements known to the user initiating a request for a switched-circuit connection (these other network elements are typically other user workstations or information servers such as web servers also connected to the broadband network that will benefit from this bandwidth reservation and subsequent switched-circuit connection), and for executing a message exchange with the other network elements using a predetermined protocol for determining whether the users of those other network elements wish to participate in the reservation of bandwidth for a particular connection.

When a signaling interface 81 receives a request for a circuit-switched connection, a route controller 73 is activated to manipulate the network so as to setup the connection. The particular choice of route controller 73 is made on a load-balancing basis by director 72. Associated with the request is a connection identifier which is selected by the originating user, and is preferably a concatenation of the originator's identifier and the identifier of the terminator selected.

Route controller 73 receives the setup message via signaling network interface 81. The route controller first breaks down the request into individual two-party reservations. That is, for example, if a conference between three or more parties is requested, route controller determines how many individual two-party reservations should be made to create a virtual multicast LAN representing all of the required connections. For each two-party transaction, the route controller looks up the terminator in disk array 77 via database server 76 and high-speed LAN 75 to get the phone number of the selected terminator. Routing is done using the originator and terminator phone numbers, as explained in more detail below.

When the originator and terminator phone numbers are identified, each including their premises switch prefixes, the corresponding connection graph is fetched from disk array 77 and returned to the route controller 73. The route controller then determines a multicast group for broadcasting messages to switch monitors 74 corresponding to all underlying circuits in the call graph, including premises switches, and assigns a multicast address. This multicast group will last until the connection is either connected or released. The route controller 73 alerts each switch monitor and waits for them to all join the group.

After all switch monitors 74 have joined the multicast group, for each switch monitor in the multicast group, the route controller constructs and sends a "Reserve" message stating the list of next-neighbors in the graph, the connection identifier, and the total bandwidth to be allocated. Alternatively, this message can be sent at the same time as the switch monitors are alerted and before all switch monitors have joined the group.

In response to the "Reserve" message, each switch monitor 74 determines if the appropriate output bandwidth is available on each next-neighbor link. If not already done, each switch monitor also simultaneously joins the multicast group for the connection. It then multicasts its answer (which may be a partial allocation; i.e., if 96 channels were requested on outputs from switch A to switch B, and only 72 were available, the monitor for switch A would respond with an answer such as "A-B:72 of 95:circuit-range circuit-range . . . ") back to the route controller 73. The switch monitor must reserve the circuit-ranges selected until the transaction is completed.

It should be noted that the switch monitor can, and should, over-reserve bandwidth in this phase of the connection setup. That is, for example, if the request to switch A is for 96 bearer channels, and both switch B and switch C are identified as neighbors, switch A's monitor may reserve 72 channels to switch B and 96 channels to switch C, if those channels are available for use.

Each switch monitor also broadcasts and collects answers of the form "x-<itself>: . . . " so as to form the potential collection of its own cross-connections.

The route controller, having received the multicast results, prunes the graph and selects the actual path to be used. Once this is determined, the route controller sends an "Alert" message to the originator, and a "Setup" message to the terminator, with the specific IP address and TCP port for the signaling interface for this transaction.

The route controller also sends a "Reserved" message to all switch monitors in the multicast group, containing the complete connection path. Upon receiving this "Reserved" multicast, each switch monitor then releases any reserved bandwidth not needed on the path.

The multicast group should continue to exist for the duration of the setup transaction, so the next step is for the route controller to wait for either a "Release" message from the originator or a "Connect" message from the terminator. If a "Connect" message arrives from the terminator, then "Connect" is sent to the multicast group. In addition, the path selected is written to the disk array 77. Each switch monitor with reserved bandwidth then transmits the correct connect commands to their respective switches so as to physically switch up the connection; as each of these messages is queued, the switch monitor sends a "Connect Sent" message to the multicast group. When all switches have been sent their connect messages, the route controller sends "Connected" to each of the participating switch monitors.

The route controller continues to listen for messages from the multicast group until each switch monitor responds with "Connected." When that happens, the route controller commits the transaction, frees the multicast group, and releases any processor resources it's been using.

When all two-party transactions are committed, each originator and terminator, along with their associated premises switches are given the unique IP addresses assigned to the connection, and the associated premises switches are given the Ethernet addresses for the originator and terminator to authorize them to use the unique temporary IP addresses, at which point the parties can begin sending and receiving data over the established connection.

III.D.2. Network Connection Teardown The teardown of a switched-circuit connection is accomplished by individually removing each participant to a multi-party connection. The connection should be maintained until only one participant remains. The route controller 73, in conjunction with information contained in the original reservation to request, determines if the information that identified the reservation should be freed for later use.

Teardown transactions can be initiated much like setup transactions. The participant that wishes to remove itself from the reservation attaches itself to a signaling interface 81 via router 71 using TCP/IP. This signaling interface then allocates a route controller 73 and informs the route controller of the teardown request.

Teardown transactions can also be initiated by other network management processes, or by failures of the setup procedure. In all cases, the first step is to identify the signaling interface and route controller.

Teardown proceeds in similar fashion to setup. The route controller queries the database server to request information from database 77 to determine the current state of the entire connection. From this information, and from the information saved from the original setup message, the route controller determines which two-party reservations need to be released (that is, for example, for a conference between users A, B, and C, if A wishes to be released, the two-party reservation between A and B and the two-party reservation between A and C would need to be released, while the B to C connection is maintained). It also finds the multicast address that was assigned during setup of those reservations; these multicast identifiers are re-used for the teardown phase. Alternatively, different multicast identifiers could be used.

Route controller 73 then sends unicast messages to each of the switch monitors 74 having underlying switch resources that are involved in each of the identified two-party reservations. Alternatively, route controller 73 broadcasts or multicasts this request.

Each involved switch monitor 74 then joins the multicast group associated with the two-party teardown transaction. When all involved switch monitors have joined, the route controller issues the information necessary to tear down the reservation.

Each switch monitor then communicates, via signaling network 30 and router 71, with the switch commander 46 or other switch or router interface associated with the underlying switch resources to release the reserved bandwidth. When the underlying interface acknowledges the release, the switch monitor multicasts the acknowledgement of released bandwidth. When all switch monitors have acknowledged release, the route controller issues a "release commit" message on the multicast group. Each switch monitor then releases its internal representation of the reservation and leaves the multicast group. Simultaneously, the route controller writes reservation release records to the database server 76 for storage in disk array 77.

The route controller then informs the signaling interface 81 of the completion of the transaction. The signaling interface then releases the route controller 73 for use by other signaling transactions, and informs the participants of the changes in the reservation. The signaling interface then withdraws from its conversations with the participants, as do the participants.

Alternative implementations might streamline this process by providing multiple kinds of teardown transactions, or by combining multiple steps. All alternative implementations use multicast between the route controller and the switch monitors.

III.E. Network Control System Server Billing Management

The network control system server billing management component 82 has access to disk array 77 via low speed network 78. It collects and formats the information recorded therein for output and use according to de-facto standard billing information formats used throughout the telecommunications industry.

The database records relating to network connection events described above are queued for reformatting by database server 76 upon their insertion during the connection teardown processing.

The records include the interfaces (facility or port IDs) of the individual switches or routers used, the quality of service (i.e., the number of bearer channels or amount of bandwidth) requested of them, and the time that the physical commnit, network commit, and release commit phases of the setup and teardown transactions were begun, and when they were completed. Also associated with each reservation is an indication of the type of medium or application for which the requested reservation was used on behalf of the user. For example, one call might consist of reservations for bandwidth relating to video, audio, and application/whiteboard.

All reservation transactions associated with a single connection are correlated into a complete set of billing records for that connection. Of course, these records also include identification of the participants and their roles (originator, terminator, joiner, etc) in the connection and/or conference.

The records can then be reformatted into forms suitable for third-party billing organizations. Supported formats preferably include Call Detail Records (CDRs) and some subset of the Bellcore Automated Management and Accounting (AMA) formats.

IV. Network Connection Operation

Figure 49:
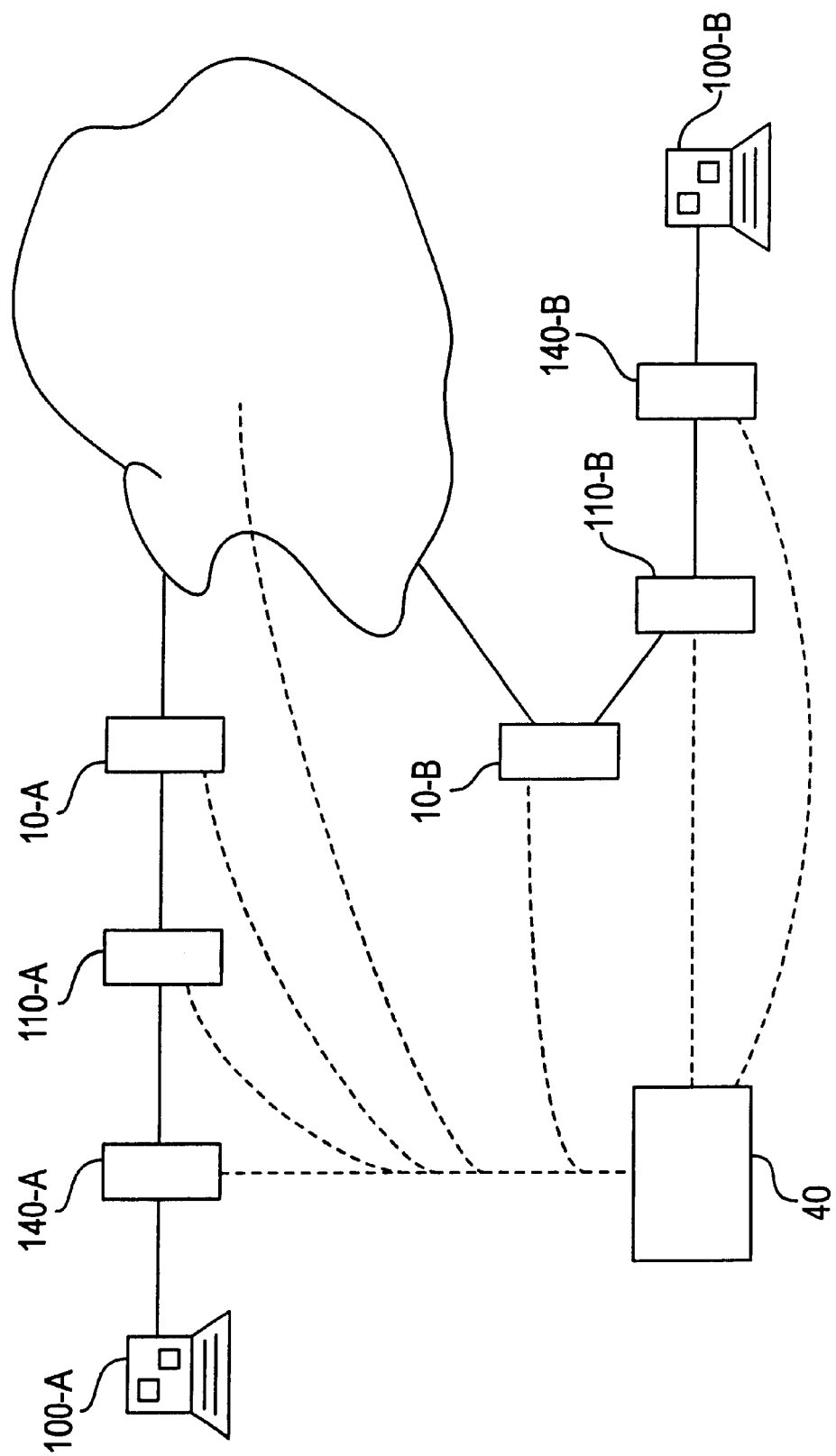
FIG. 49 illustrates the connection topology that results in a connection having bandwidth-on-demand in accordance with the principles of the invention.

FIG. 49 illustrates the broadband network topology and interactions that result in an on-demand circuit-switch connection of variable bandwidth between two broadband network users. The number of participants in this connection is two for the purpose of clarity, however, three or more participants are possible in any given connection, and each participant may have different amounts of bandwidth provided to them (e.g., two participants may be communicating with live video and audio, while a third conference participant listens in and communicates with audio only).

In this example, assume user A in city A wishes to conduct a live videoconference with user B in city B. If user A's workstation 100-A is not already powered up, user A powers up the workstation and activates a Java-capable browser. From the browser, user A accesses a website containing a directory of broadband network users, and locates user B. User A requests a videoconference by selecting user B's name from the directory, and a helper application for the browser alerts the daemon process loaded onto workstation 100-A, which relays a request to workstation interface 140-A.

Workstation interface 140-A intercepts user A's request for a videoconference, sets up streams for the necessary media devices (e.g., camera, microphone, speaker, video display), and formats a request for sending to the network control system server 40 via signaling network 30.

For clarity, a direct connection is represented by the dashed line between workstation interface 100-A and the network control system server to illustrate the parties actually communicating. However, it should be apparent from the foregoing detailed description that the data packet requesting a broadband network connection is sequentially packet-switched and routed through premise switch 110-A and city node 10-A.

Network control system server 40, having precalculated a list of routes between A and B via switch resources under control of the broadband network, broadcasts a request for bandwidth to all the switch commanders with underlying switch resources along all the listed routes, as well as premises switches 110-A and 110-B. The switch commanders and premises switches respond with the amount of bandwidth they have available. Once a route with the required bandwidth has been identified, and the necessary switch resources have been reserved along that route, network control system server 40 rings user B by sending a message to workstation interface 140-B, which establishes a connection with the network control system server and relays the message to workstation 100-B. Software loaded onto workstation 100-B causes a dialog box to appear on workstation 100-B, advising user B that a videoconference call is being requested. If user B indicates acceptance of the call, workstation interface 140-B sets up the necessary media streams and formats a reply to send to network control system server 40 via signaling network 30.

When the reply from user B is received, network control system server 40 instructs the switch commanders who have reserved underlying switch resources for the connection to switch up the connection. When the switch commanders all reply that the connection has been completed, network control system server 40 assigns unique and temporary IP addresses for each data flow in the connection, sends these addresses to workstation interfaces 140-A and 140-B and premises switches 110-A and 110-B, and the videoconference begins. That is, both workstation interfaces begin formatting data received from their cameras and microphones for transmission, and when data is received from the other end, translate the data into signals for driving their video displays and speakers.

Although the present invention has been described in detail with reference to the preferred embodiments thereof, those skilled in the art will appreciate that various substitutions and modifications can be made thereto without departing from the spirit and scope of the invention as defined by the appended claims.

We claim:

1. A network comprising:
    a network control system server that defines a collection of circuits in a circuit-switched infrastructure as an IP subnet, said network control system server using said definition to define a route between two network nodes having respective IP addresses,
    a switch commander that communicates with said circuit-switched infrastructure that causes certain of said circuits in said collection to form a connection in response to a signal, said network control system server supplying said signal in accordance with said route,
    wherein workstations are associated with said two network nodes, said network further comprising a workstation interface associated with one of said workstations that formats digital data received from another of said workstations for presentation to said one of said workstations and formats digital data from said one of said workstations for sending to said another of said workstations,
    further comprising a premises switch that communicates with said network control system server, said certain circuits, and said workstation interface, said premises switch collecting said digital data of said connection originating from said workstation interface and transmitting said originating digital data of said connection on said certain circuits, said premises switch receiving said digital data of said connection sent by said another of said workstations and transmitting said sent digital data to said workstation interface, and
    wherein said one of said workstations is further associated with a local area network, said workstation interface and said premises switch communicating with each other via said local area network, said premises switch having a packet switch for passing through digital data not associated with said connection.

2. A network as defined in claim 1, wherein said network control system server assigns temporary IP addresses for said connection, said one of said workstations and said another of said workstations communicating over said certain circuits via said temporary IP addresses.

3. A network as defined in claim 1, wherein said network control system server assigns temporary IP addresses for said connection, said premises switch having a network address translation function that translates said respective IP address of said one of said workstations into said temporary IP addresses.

4. A network as defined in claim 1, wherein said network control system server assigns temporary IP addresses for said connection, said premises switch having a routing function that permits said one of said workstations to access said certain circuits via said temporary IP addresses.

5. A network as defined in claim 1, wherein said premises switch further includes a bonder module that processes data from said one of said workstations for sending over said certain circuits and processes digital data from said another of said workstations received over said certain circuits for sending to said one of said workstations, said bonder module including a bonding function that assigns said certain circuits to a port for sending and receiving digital data during said connection.

6. A network as defined in claim 5, wherein said certain circuits are comprised of PSTN bearer channels.

7. A premises switch associated with at least one workstation that is adapted to be coupled to a circuit-switched infrastructure, said premises switch comprising:
    means for assigning a first temporary IP address to certain circuits of said circuit-switched infrastructure during a first connection;
    a routing function that permits said one workstation to access said certain circuits of said circuit-switched infrastructure via said first temporary IP address, and prevents said one workstation from said certain circuits via said first temporary IP address not during said first connection,
    wherein said premises switch communicates with said workstation via a local area network, said premises switch further comprising
        a packet switch that passes local area network data not addressed to said premises switch; and
        a bonder module that processes local area network data addressed to said premises switch for sending over said circuit-switched infrastructure and processes digital data from another workstation received over said circuit-switched infrastructure for sending to said at least one workstation via said local area network, said bonder module including a bonding function that assigns said certain circuits of said circuit-switched infrastructure to a first port for sending and receiving digital data during said first connection and assigns certain other circuits of said circuit-switched infrastructure to a second port for sending and receiving digital data during a second connection, the number and arrangement of said circuits assigned during said first and second connections not necessarily being the same.

8. A premises switch as defined in claim 7, further comprising a network address translation function that translates said temporary IP addresses into IP addresses associated with workstations authorized to use said temporary IP addresses.

9. A premises switch as defined in claim 7, wherein said bonder module includes:
    line interface units that are respectively coupled to lines of said circuit-switched infrastructure, each of said lines multiplexing a plurality of circuits;
    a PCM highway that time-division multiplexes digital data received from and destined for said circuits via said line interface units;
    a channel mux/demux coupled to said PCM highway that fragments local area network data for transmission on said circuits and de-fragments digital data received from said circuits into local area network data for sending to said one workstation; and
    a CPU that controls the flow of data between said circuits and said one workstation.

10. A premises switch as defined in claim 9, wherein said lines are T1 lines and said circuits are PSTN bearer channels.

* * * * *